(12) United States Patent
Pallakoff

(10) Patent No.: US 8,373,660 B2
(45) Date of Patent: Feb. 12, 2013

(54) SYSTEM AND METHOD FOR A PORTABLE MULTIMEDIA CLIENT

(76) Inventor: Matt Pallakoff, Mountain View, CA (US)

( * ) Notice: Subject to any disclaimer, the term of this patent is extended or adjusted under 35 U.S.C. 154(b) by 2602 days.

(21) Appl. No.: 10/891,544

(22) Filed: Jul. 14, 2004

(65) Prior Publication Data

US 2005/0012723 A1   Jan. 20, 2005

Related U.S. Application Data

(60) Provisional application No. 60/487,020, filed on Jul. 14, 2003, provisional application No. 60/508,980, filed on Oct. 6, 2003, provisional application No. 60/535,486, filed on Jan. 9, 2004.

(51) Int. Cl.
*G09G 5/08* (2006.01)
*G06F 3/041* (2006.01)

(52) U.S. Cl. ........................ 345/163; 345/173
(58) Field of Classification Search .......... 345/156–184; 715/773, 864
See application file for complete search history.

(56) References Cited

U.S. PATENT DOCUMENTS

| | | | |
|---|---|---|---|
| 6,275,935 B1 * | 8/2001 | Barlow et al. | 713/182 |
| 6,295,514 B1 * | 9/2001 | Agrafiotis et al. | 703/12 |
| 7,236,159 B1 * | 6/2007 | Siversson | 345/173 |
| 2002/0158838 A1 | 10/2002 | Smith | |
| 2003/0095095 A1 | 5/2003 | Pihlaja | |
| 2003/0095105 A1 | 5/2003 | Vaananen | |

* cited by examiner

*Primary Examiner* — Jimmy H Nguyen
(74) *Attorney, Agent, or Firm* — Nathan H. Calvert

(57) ABSTRACT

Mobile devices are described, along with related services, systems, and methods. These devices include displays with pixel dimensions and pixel densities in ranges that are chosen to allow users to enjoy a more intuitive and more "desktop-like" Web or multi-media experience compared to other devices, while still enabling the devices to be pocketsize. Also described are devices with touch sensitive areas on the edges or back that let users efficiently and intuitively control some behaviors of the devices by touching the touch sensitive areas in certain ways. Embodiments of the present invention reduces the need for mechanical controls, which enables keeping the frame around the device's display unusually narrow, thereby permitting larger displays without increasing the overall sizes of the devices.

2 Claims, 20 Drawing Sheets

Fig. 1-A
Front View
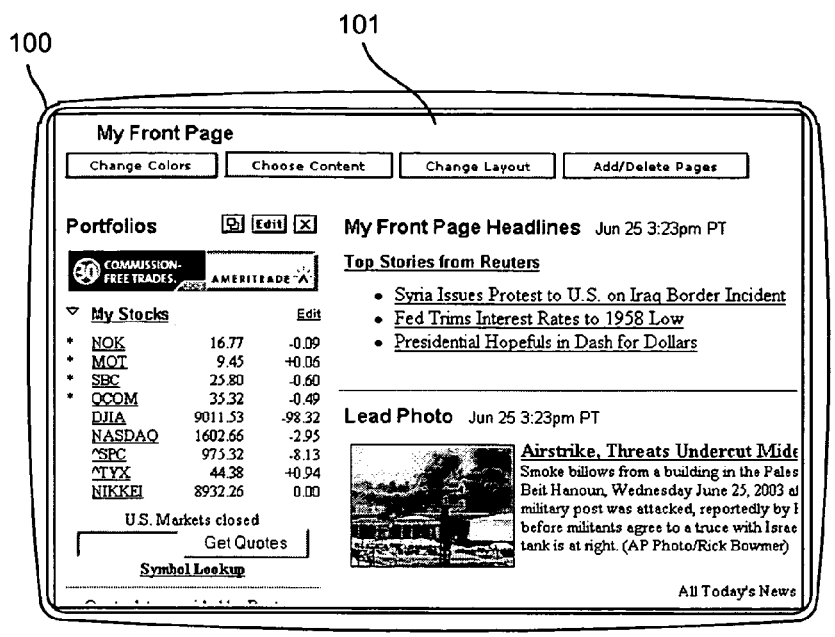
Fig. 1-B
Left Side View
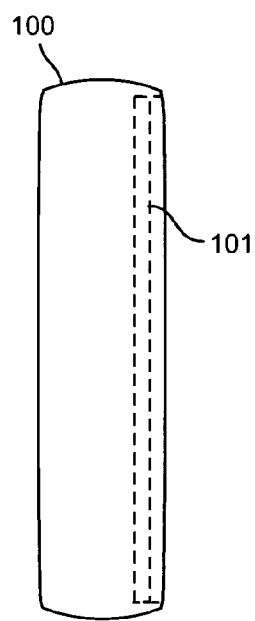

Fig. 2-A
Front View
Fig. 2-B
Right Side View
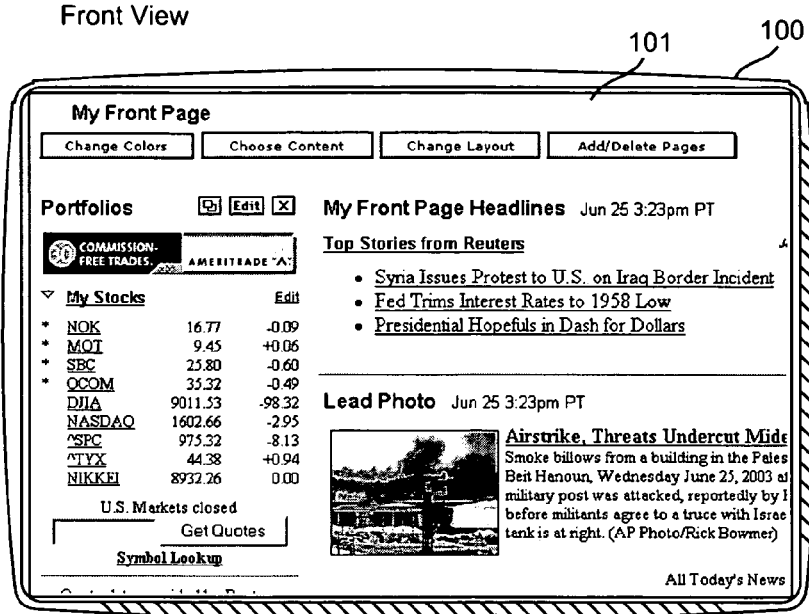
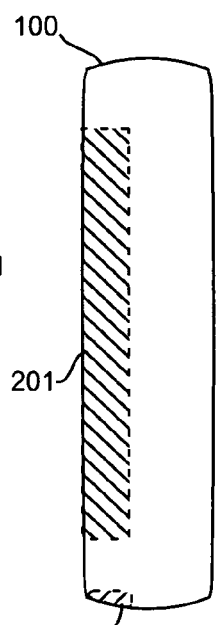
Fig. 2-C
Bottom View
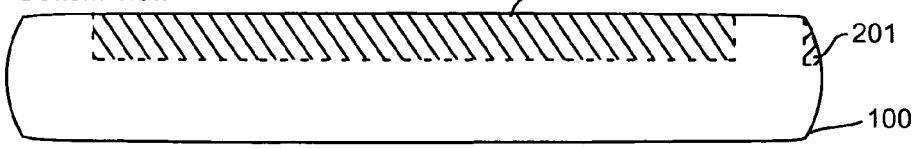
Fig. 2-D
Front View
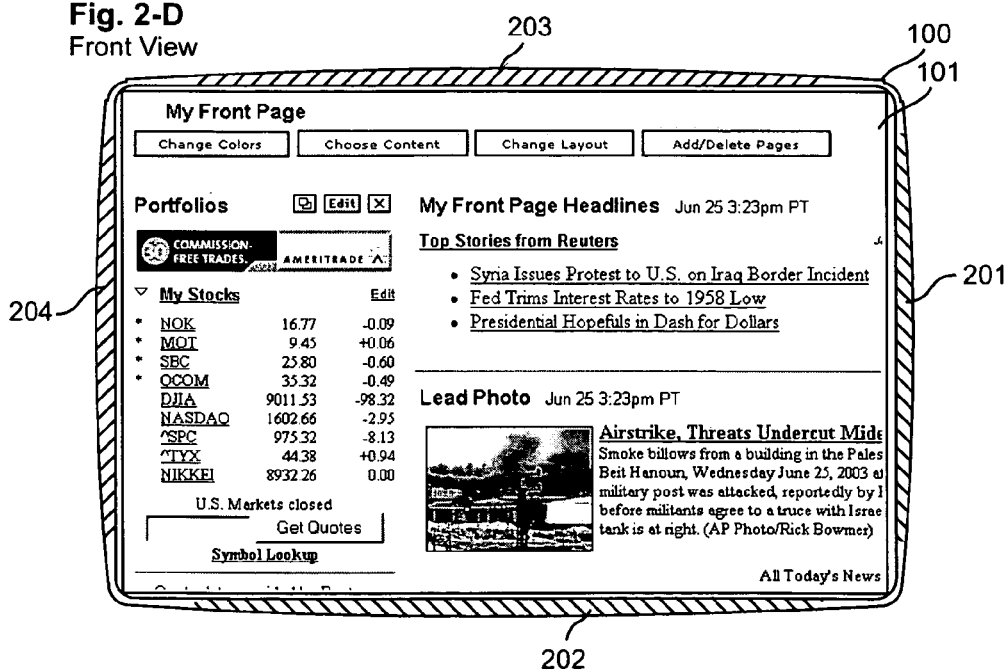

Fig. 3-A
Front View
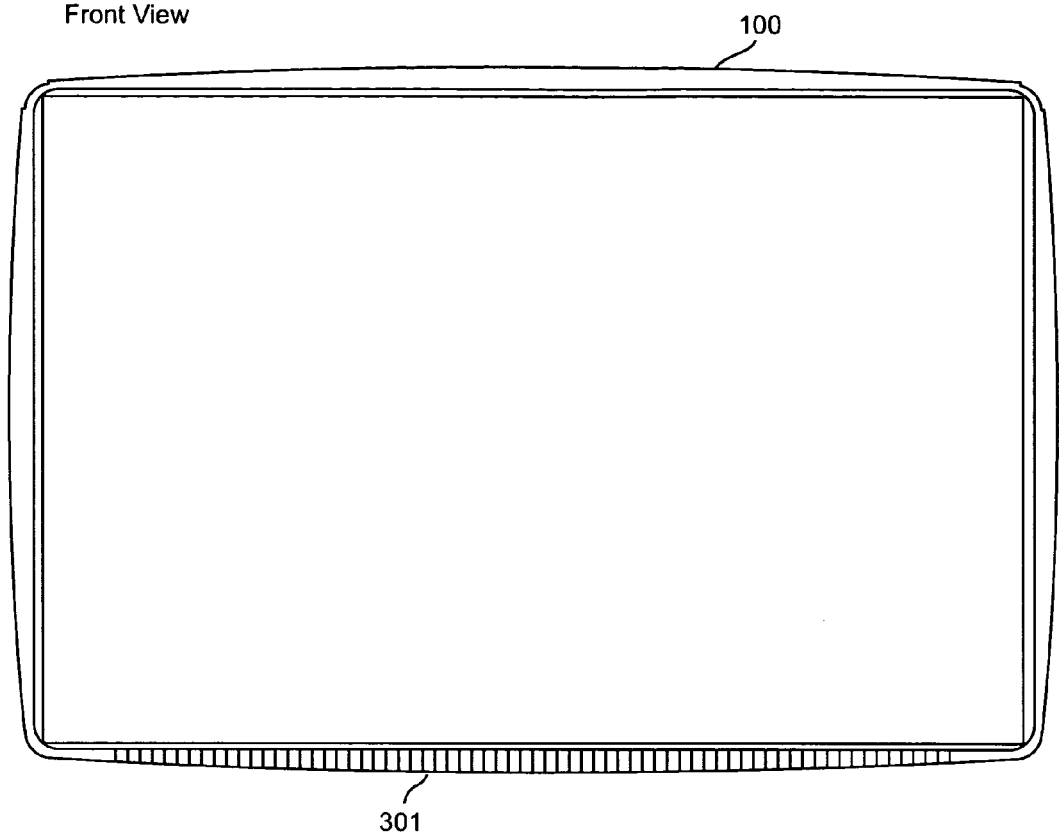
Fig. 3-B
Bottom View
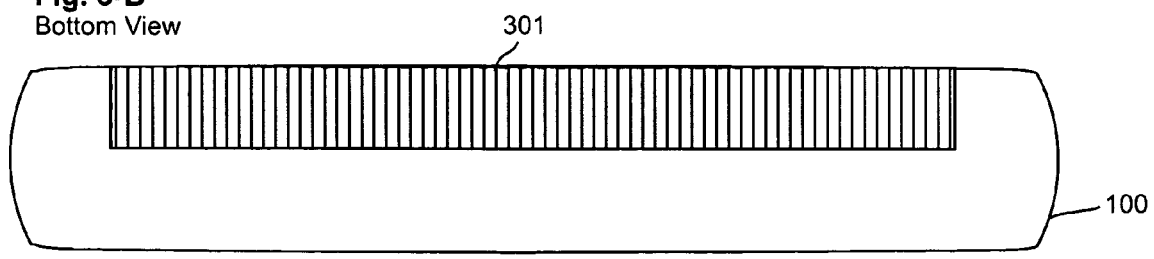

Fig. 4-A
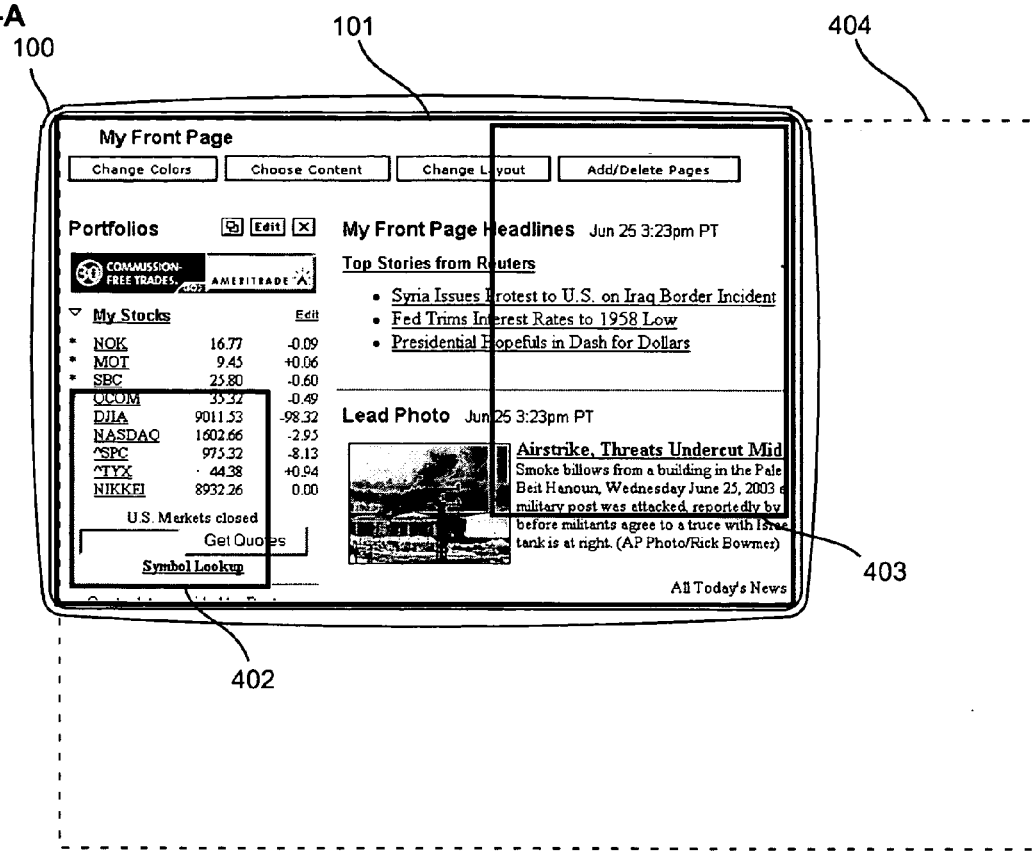
Fig. 4-B
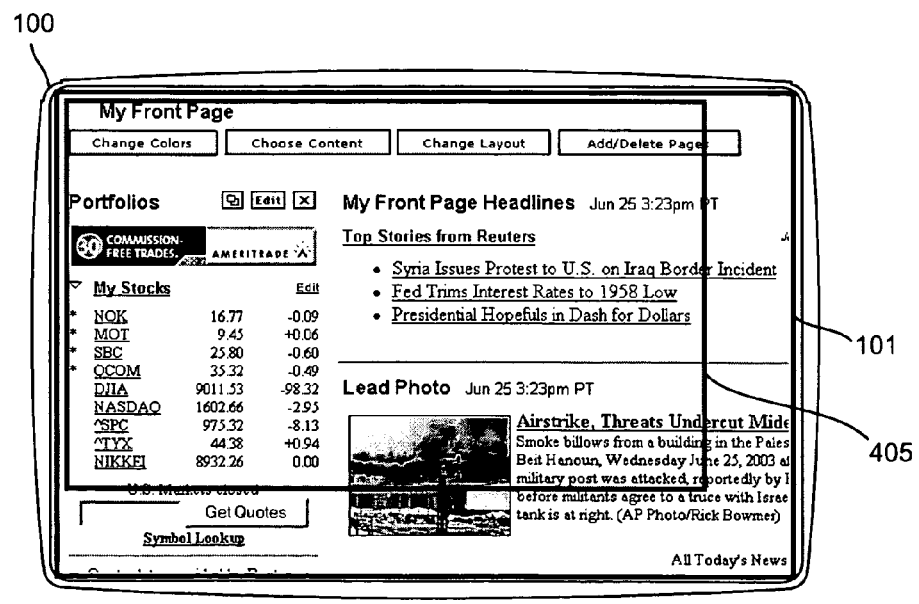

Fig. 5
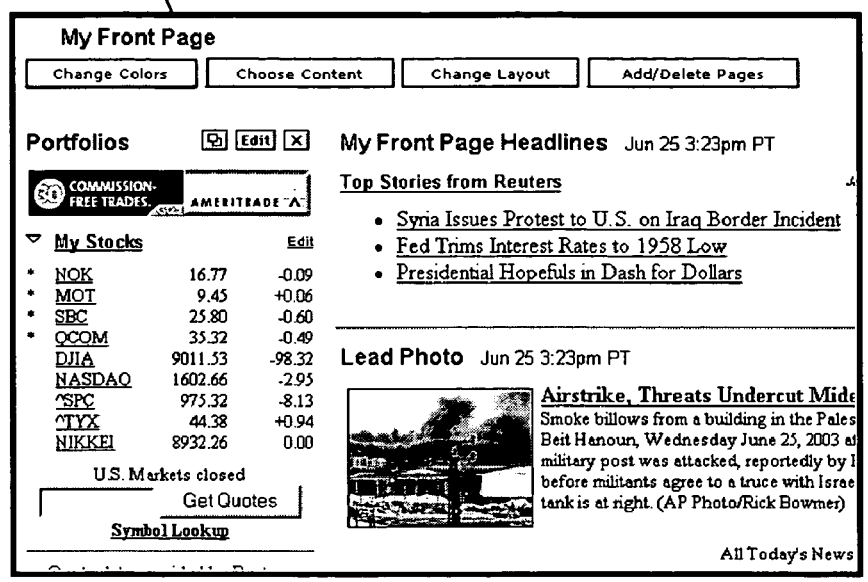
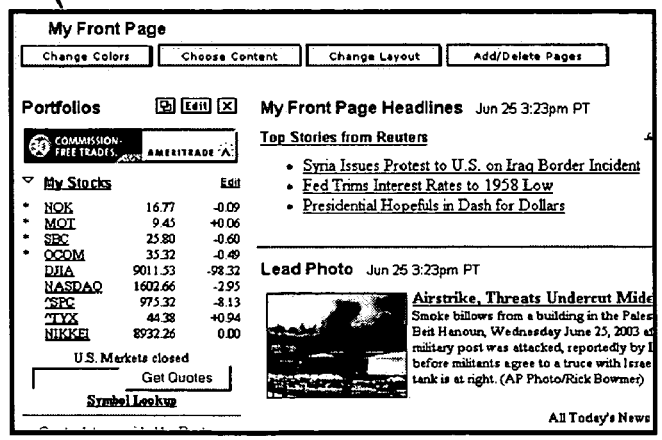

Fig. 10-A
Front View
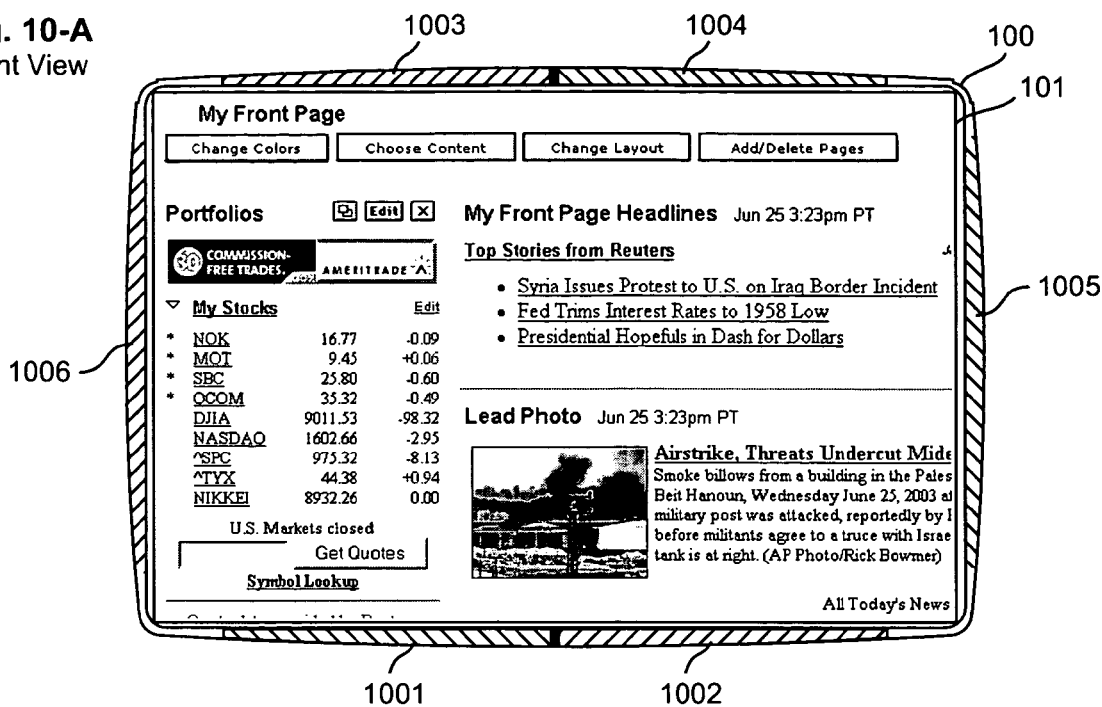
Fig. 10-B
Bottom View
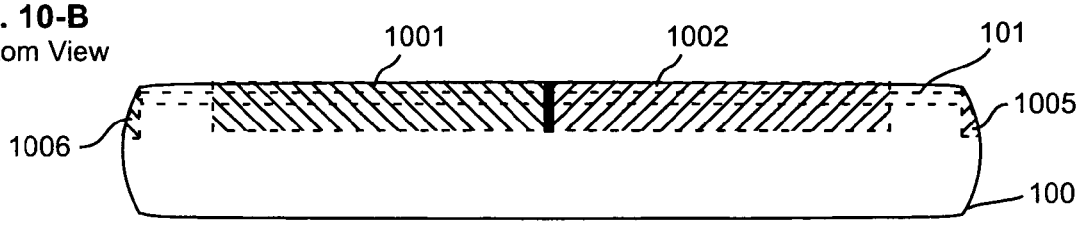

Front View

Fig. 12-A
Front View
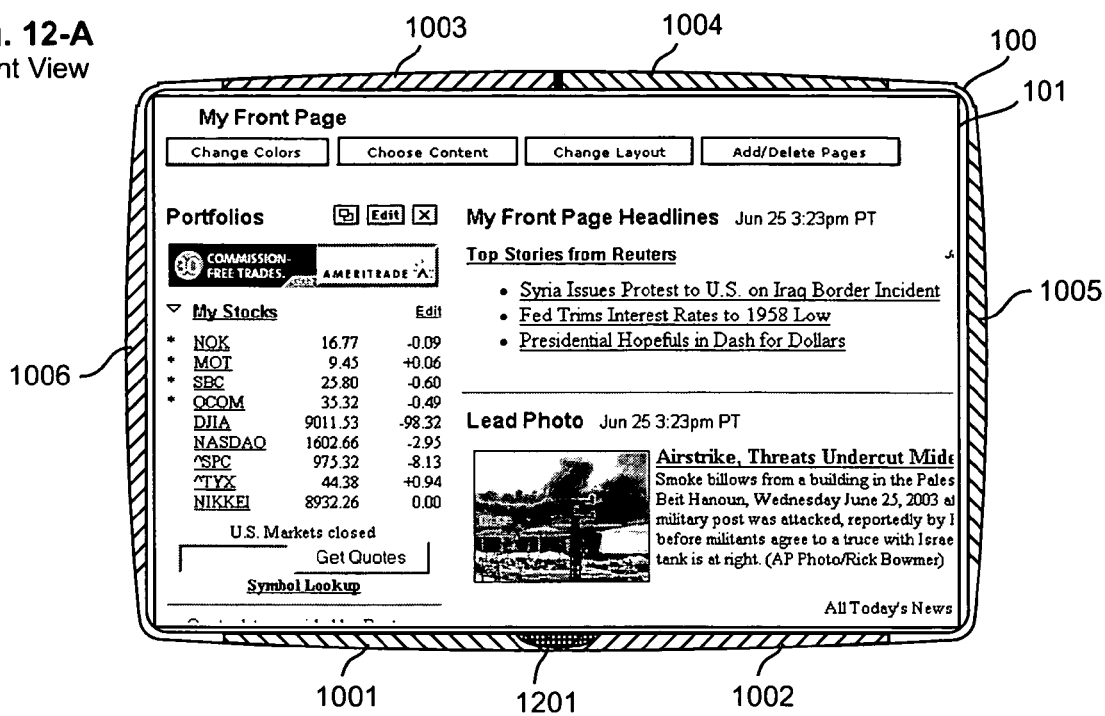
Fig. 12-B
Bottom View
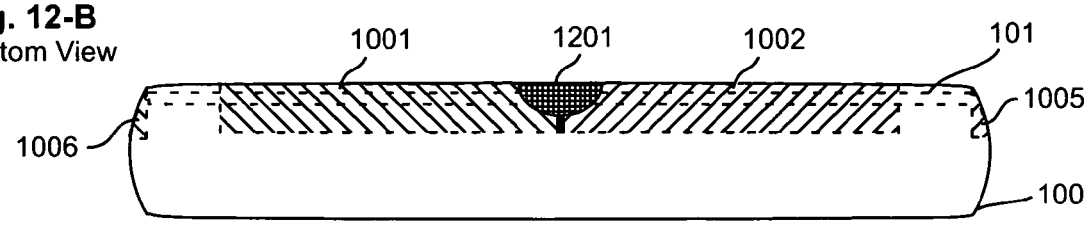

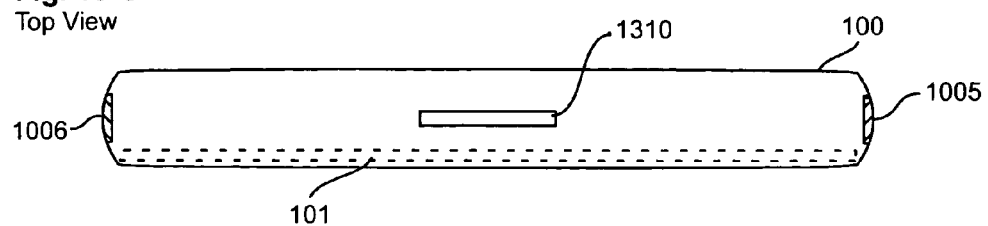
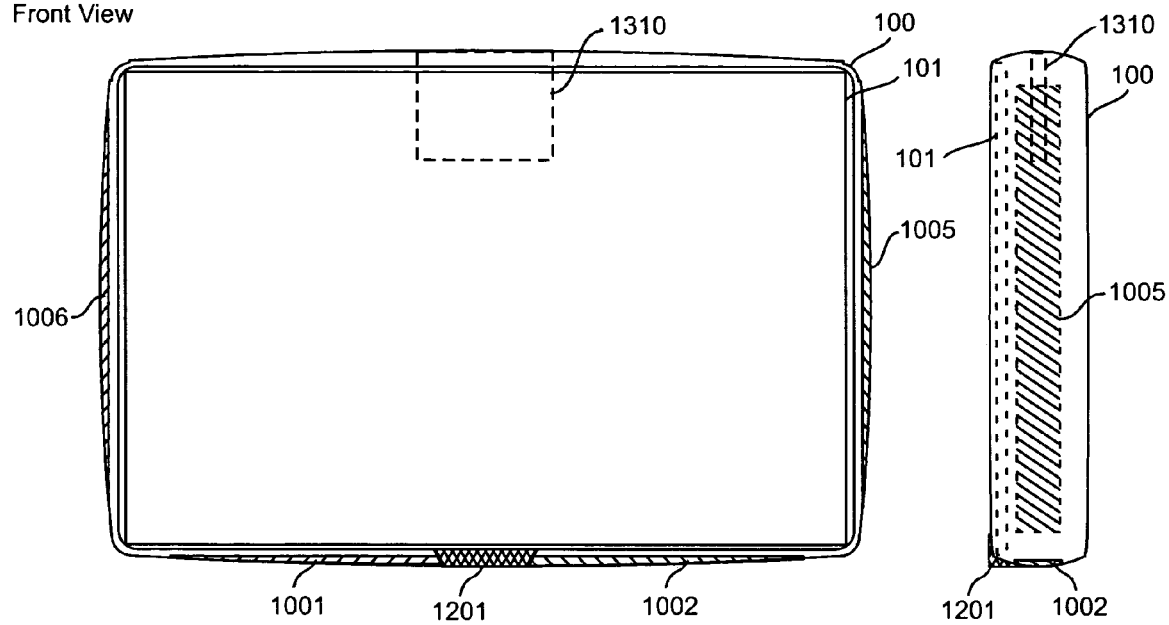
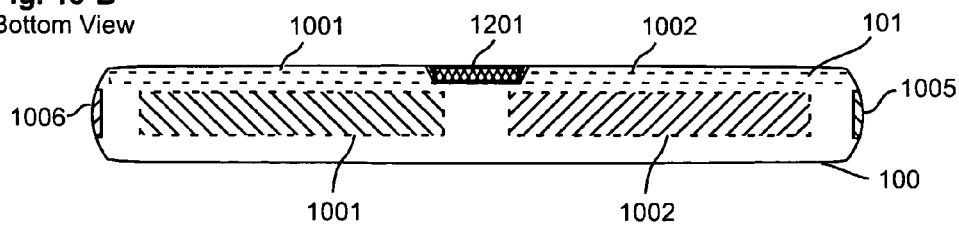

Fig. 14-A
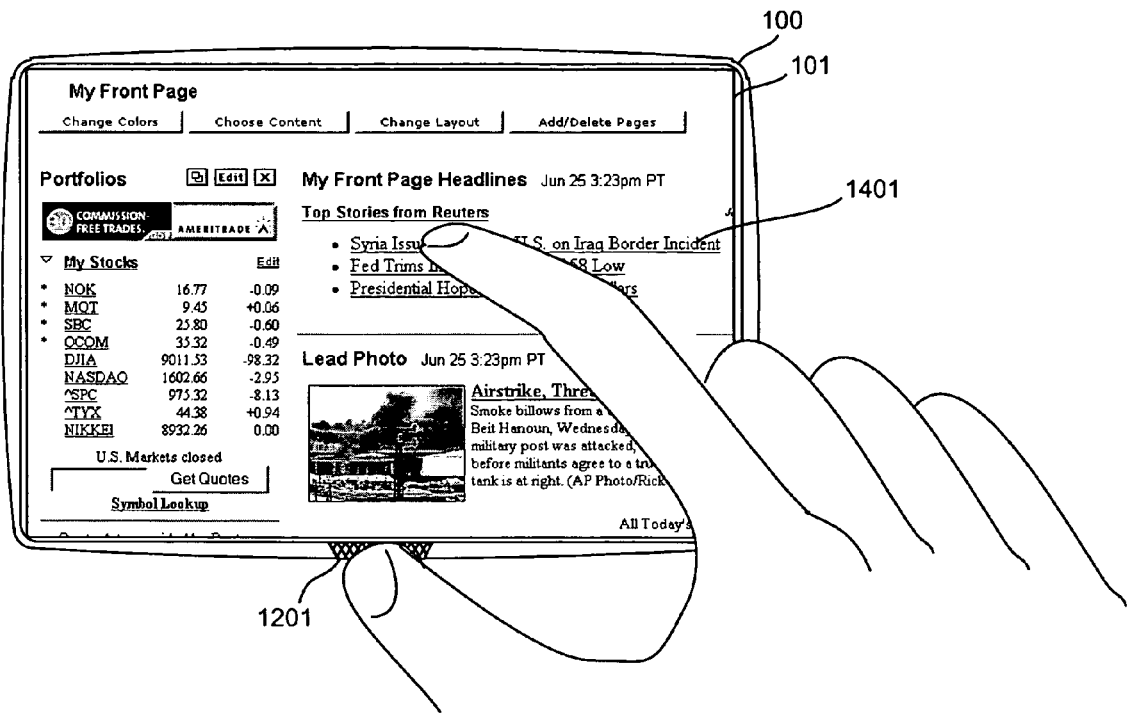
Fig. 14-B
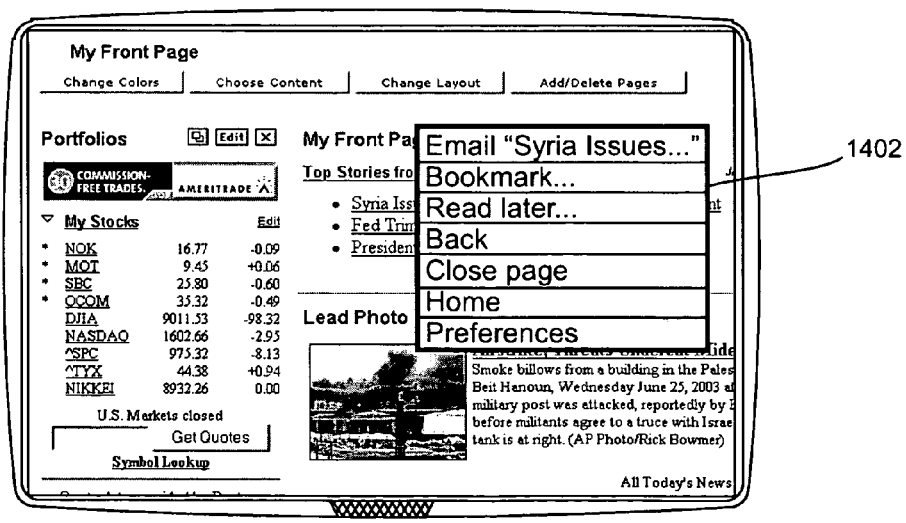

Fig. 15-A
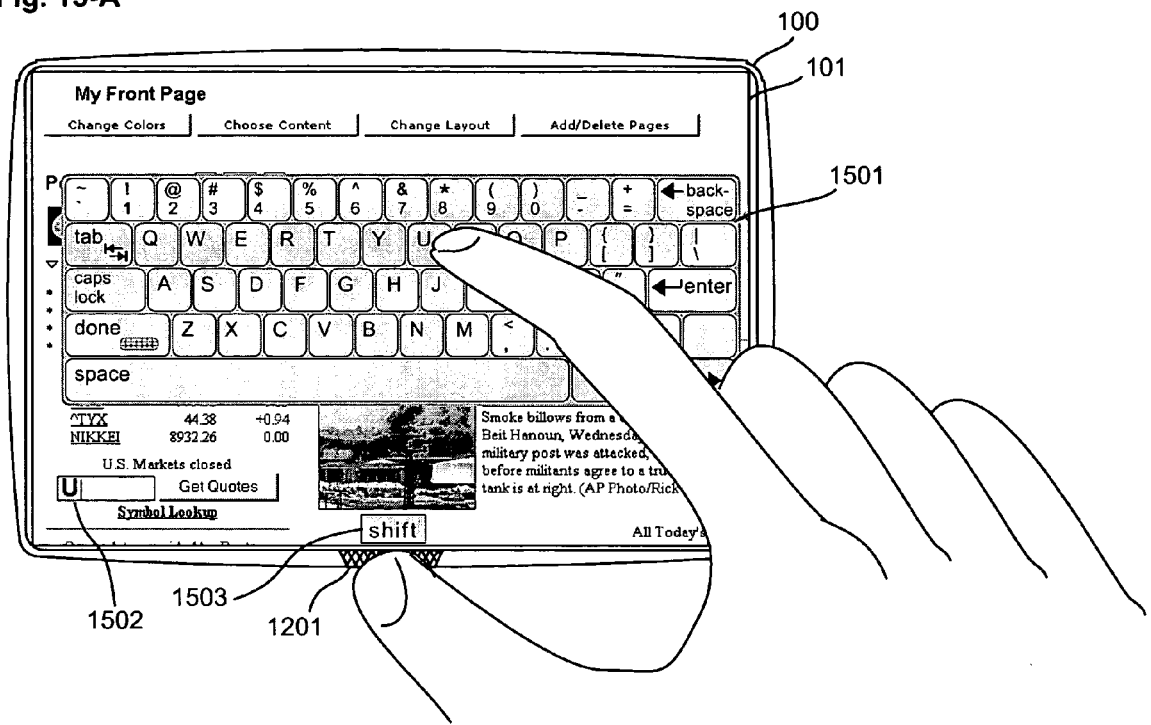
Fig. 15-B
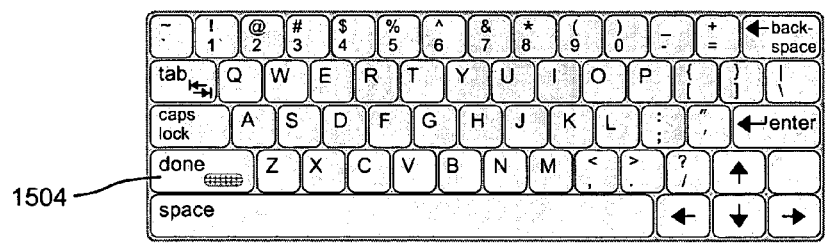

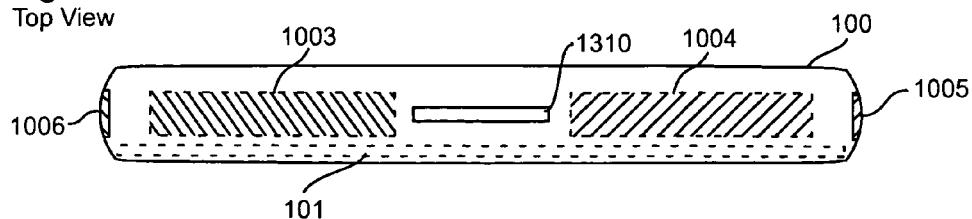
Fig. 16-C
Top View
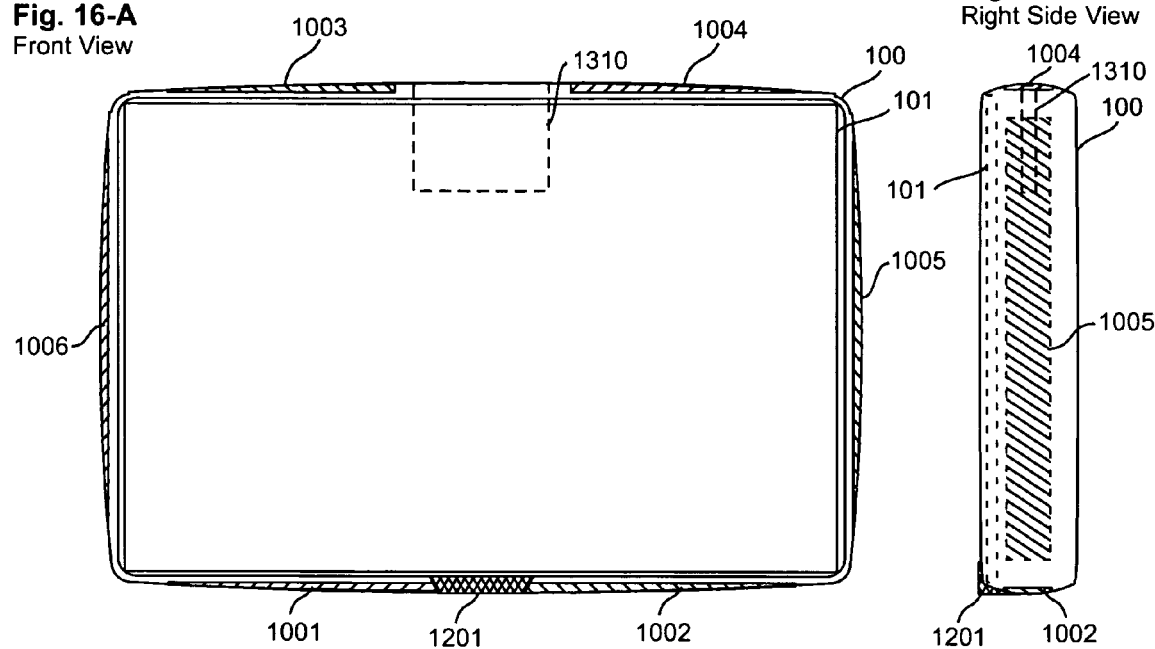
Fig. 16-A
Front View
Fig. 16-D
Right Side View
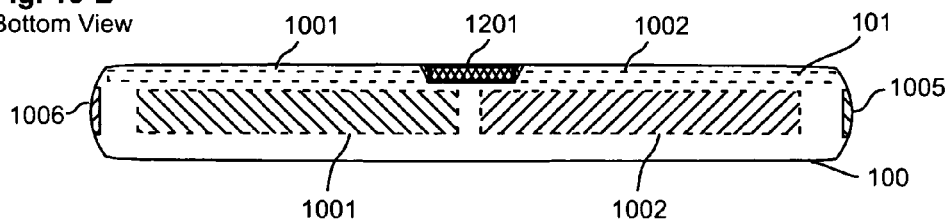
Fig. 16-B
Bottom View

Fig. 17-A
Front View
Fig. 17-C
Right Side View
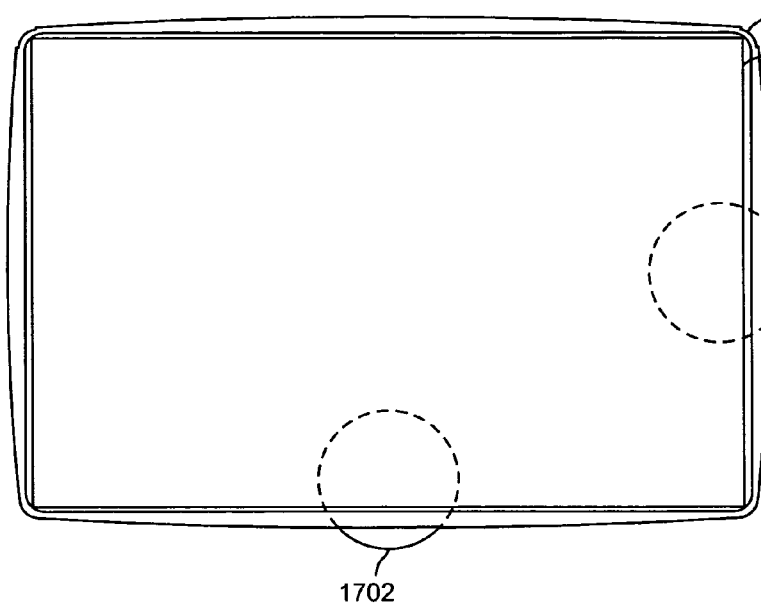
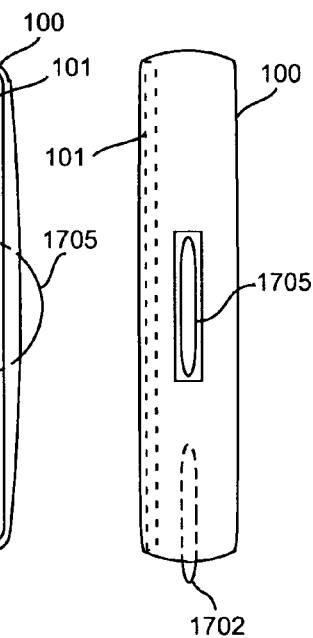
Fig. 17-B
Bottom View
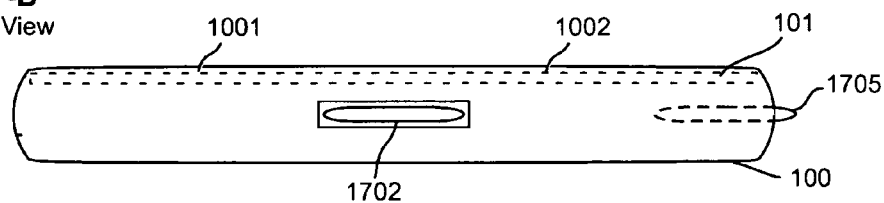

Fig. 18-C
Top View
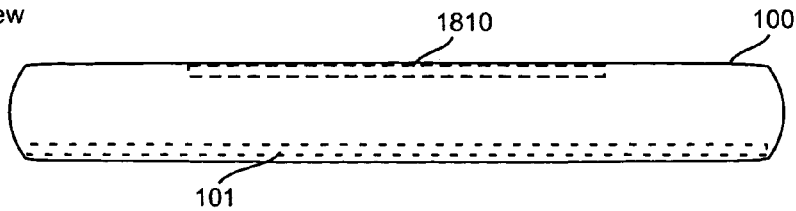
Fig. 18-A
Front View
Fig. 18-D
Right Side View
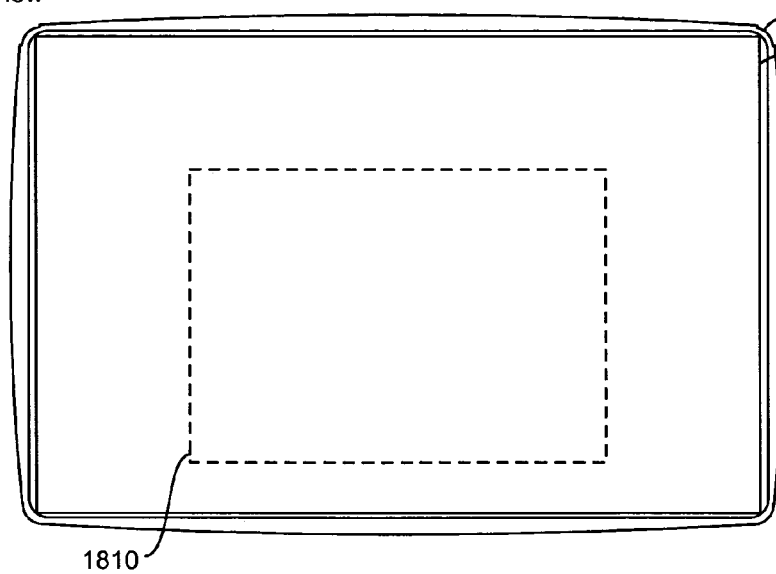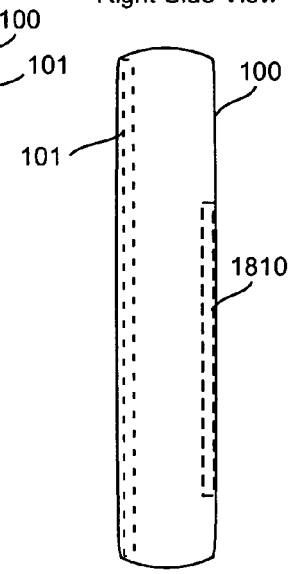
Fig. 18-B
Back View
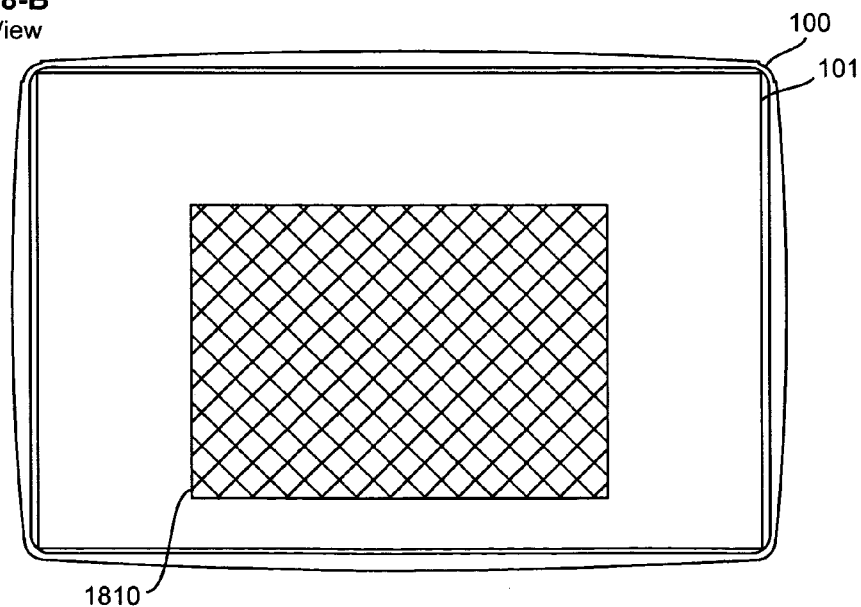

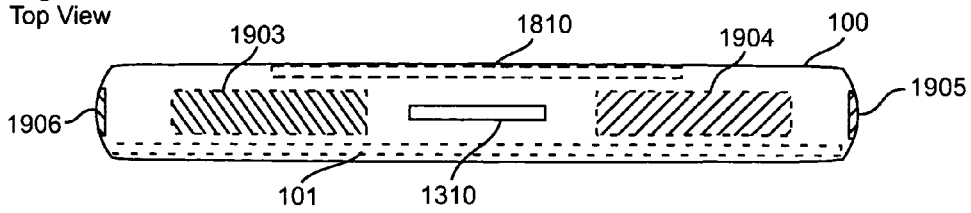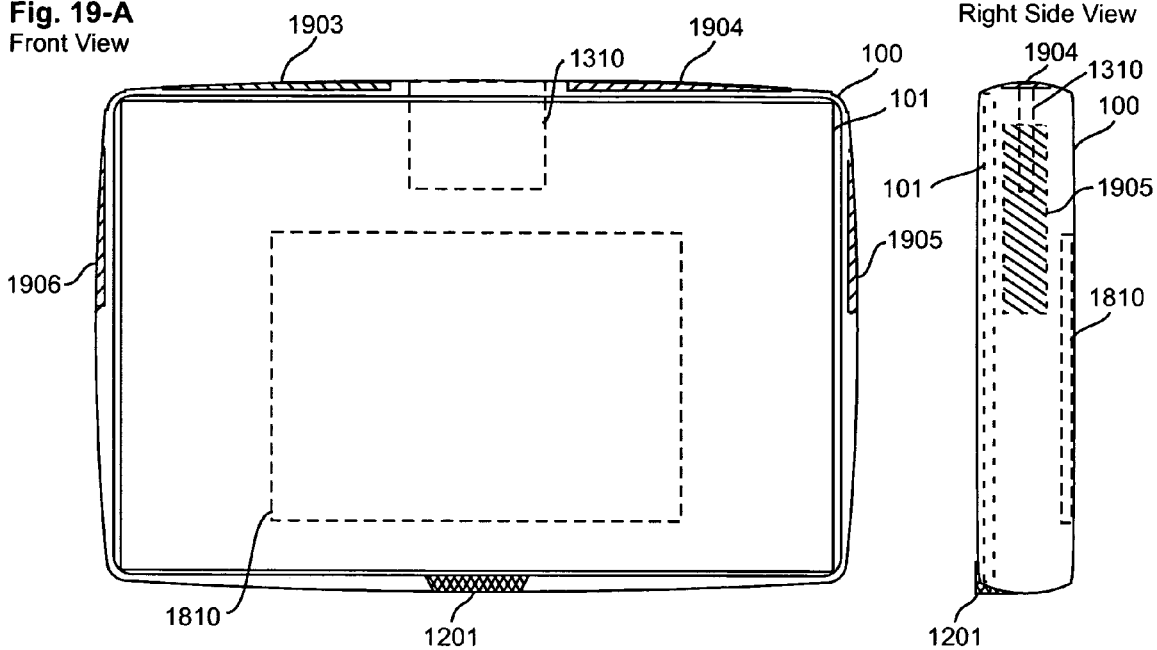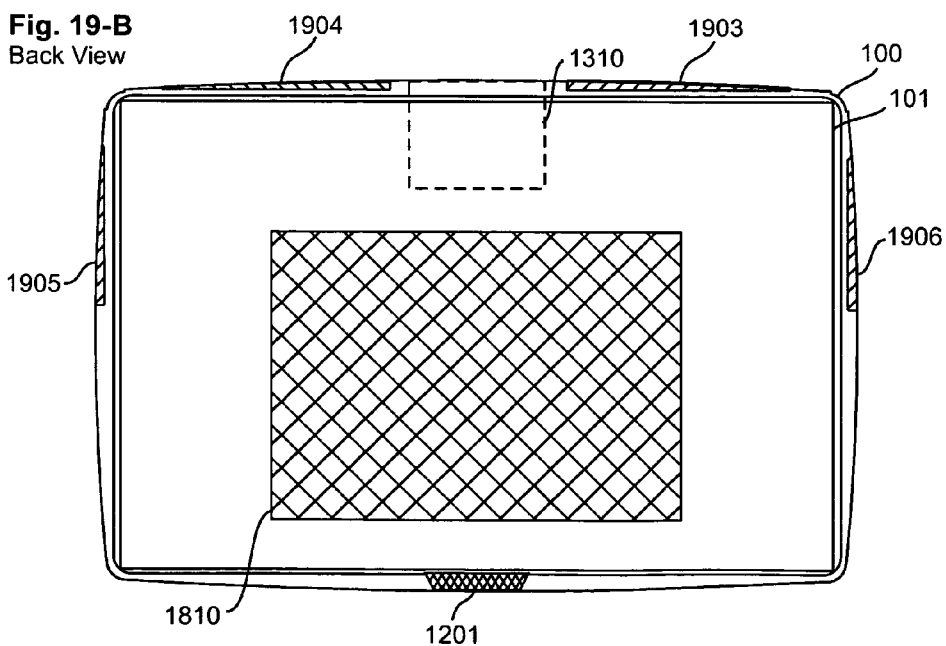

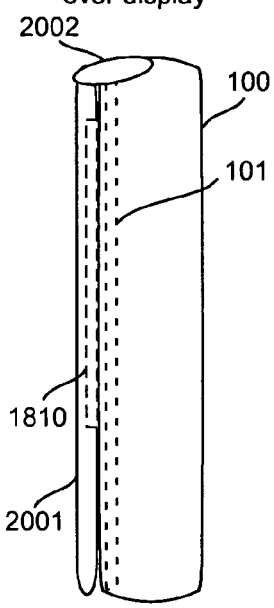
Fig. 20-A
Right Side View
cover closed over display
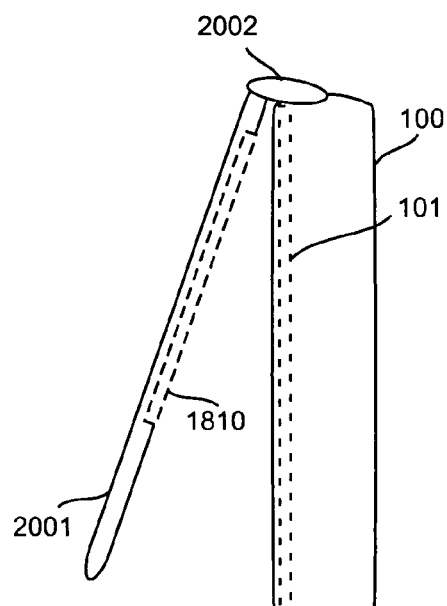
Fig. 20-B
Right Side View
cover partly open
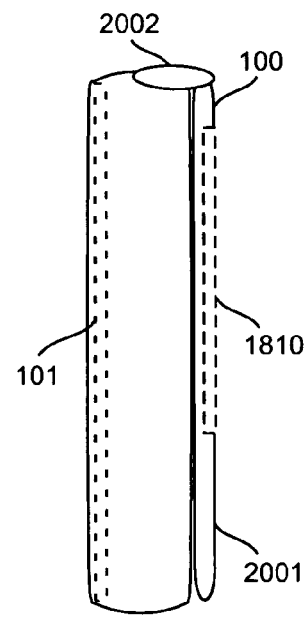
Fig. 20-C
Right Side View
cover open and around back Fig. 21
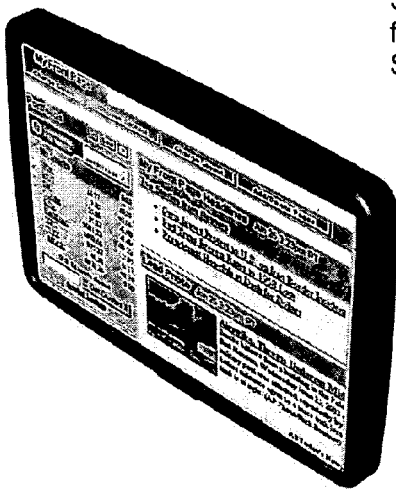
Sept. 2003 industrial design example for MOVE Mobile Systems' Slider concept.
View from upper right
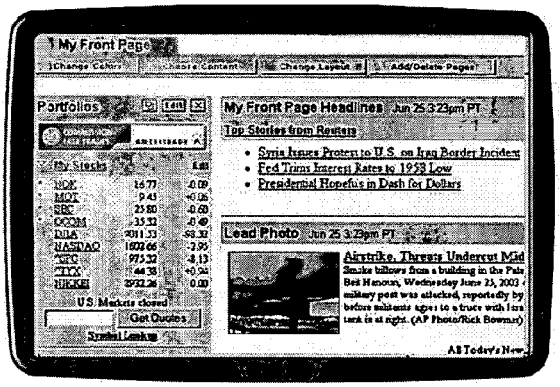
Top view
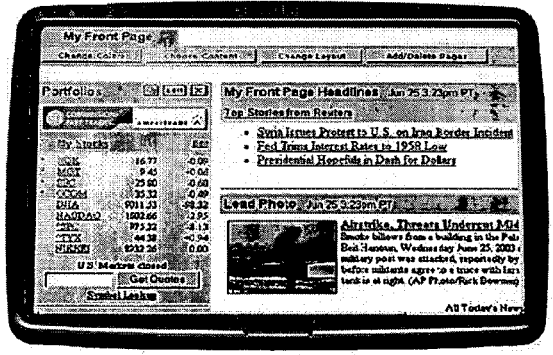
Tilted back slightly, to see more of bottom

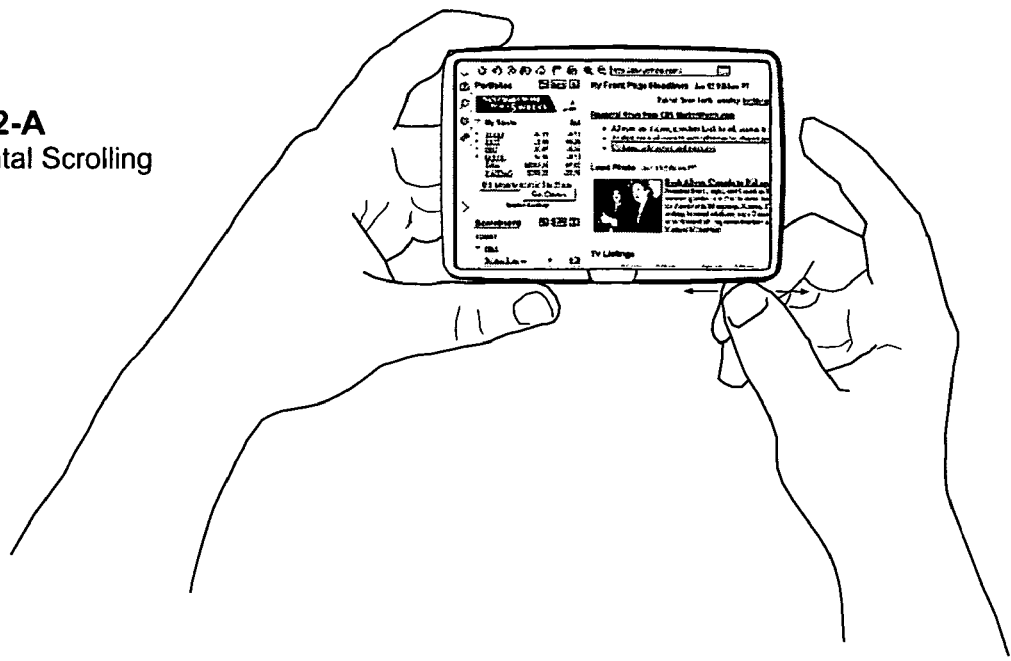
Fig. 22-A
Horizontal Scrolling
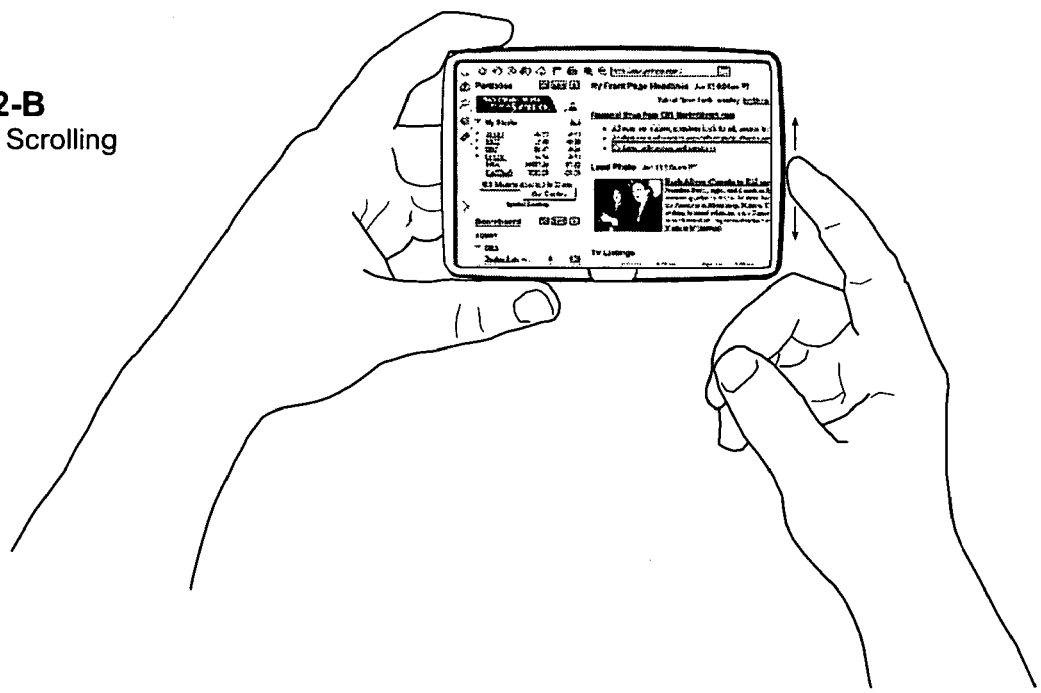
Fig. 22-B
Vertical Scrolling Tapping**

SYSTEM AND METHOD FOR A PORTABLE MULTIMEDIA CLIENT

CROSS-REFERENCE TO RELATED APPLICATIONS

Provisional Application No. 60/487,020 filed on Jul. 14, 2003 Provisional Application No. 60/508,980 filed on Oct. 6, 2003 Provisional Application No. 60/535,486 filed on Jan. 9, 2004

FIELD OF THE INVENTION

The invention generally relates to hand-held electronic devices, and more specifically to mobile wireless devices used to access information servers such as local area networks and the World Wide Web (i.e. "the Web") and mobile devices used to run software applications commonly run on desktop and notebook computers (such as Web browsers, spreadsheets, word processors, calculators, photo and video editors and viewers, stock tracking, accounting, etc.). Some aspects of the present invention also are applicable to mobile devices used to access portable television, digital content and multimedia (including electronic books [sometimes called e-Books], digital cameras, digital music or video players), hand-held electronic tools (including measurement tools), or electronic-mechanical tools (such as electronic drilling tools), among other types of hand-held devices.

BACKGROUND OF THE INVENTION

Major wireless service providers such as Sprint PCS, Verizon, and many others around the world, have spent tens of billions of dollars over the last several years upgrading their network infrastructure (and licensing spectrum) so that they can offer mobile Web services in addition to mobile voice services.

However, a much discussed problem within the mobile device and wireless service industries is that the "mobile Web" user experience on today's conventional pocketsize mobile devices (e.g. PDAs and smart-phones) is generally much less compelling, useful, and enjoyable than the "real Web" enjoyed regularly by nearly a billion people around the world on personal computers.

The mobile phone industry learned long ago that devices must be pocketsize and relatively affordable to become widely adopted by mobile service subscribers. However, because of display and man-machine-interface limitations of today's conventional pocketsize devices, most people consider the mobile Web experience on today's conventional pocketsize devices to be clunky, constrained, tedious, and scraped-down compared to the real Web experienced on desktop and notebook computers.

This problem is contributing to much slower adoption of mobile Web services than has occurred with mobile voice services over the last several years. (Some alternative mobile data services, such as "text-messaging", have become popular, because those simple applications are not significantly constrained by the display and man-machine-interface limitations of today's pocketsize mobile devices. Web access is a more demanding application.)

A typical wireless mobile device contains a radio, which allows Internet data to be transmitted to the device, and a display that can present content on an active surface of the display. The displays are controlled by a display controller unit that may be implemented by readily available general or special purpose computers, whereby the implementation details are well known to those skilled in the art. Most Web pages are designed to be about 800 pixels wide. And on desktop computer monitors and laptop displays, users typically open their Web browsers to be around 800 pixels wide or wider and around 600 pixels tall. (Herein, a display, image or window that is 800 pixels wide by 600 pixels tall shall be referred to as 800×600 pixel.) But to keep mobile devices "pocket-size", most of today's mobile devices (such as data-enabled mobile phones and PDAs) use displays that are 320× 480 pixel or smaller, which is too small to display more than about ⅓ of the 800×600 pixel area that people are used to seeing on desktop computers. That leads to an unsatisfying Web browsing experience, because users have to constantly scroll to get to the information they want. The low pixel count makes it hard for users to orient themselves and figure out where the information they want is hiding on a Web page since they can only look at the page "through a straw" (i.e. through a tiny window). This is why, in a review of a popular brand of hand-held computer with a 240×320 pixel display, in the Jul. 7, 2003, edition of eWeek, the reviewer noted that the device "still suffers (along with the rest of the hand-held browser world) from the fact that Web pages are not designed for low-resolution displays."

In a few cases, mobile device makers have tried to address this problem, while still keeping the device pocket-size, by using displays with very high pixel densities (i.e. very small pixels)—pixel densities over 175 pixels-per-inch (which is refered to by the nomenclature of 175 pixels-per-inch, 175 ppi, 175 dots-per-inch, or 175 dpi). But displays with pixel densities that high tend to make it very hard to read Web page content (particularly text) when the content is simply squeezed onto those displays because some text can become too tiny to read comfortably, if at all.

Some device makers use larger displays that have readable pixel densities (well under 175 ppi) and plenty of pixels (sometimes 800×600 pixel or more), but their devices (which typically include buttons and controls on the frames surrounding the displays) are too big to be considered "pocket size"—well over 6 inches in width or height or both.

Table 1 lists some examples of known hand-held devices, their display pixel counts, approximate pixel densities, and approximate display sizes (measured diagonally in inches). This list includes the approximate size and pixel density of each device's display only, not the full size of the complete device. The full size of each device is generally considerably larger than the display size, since the devices generally include frames with buttons, controls and other components embedded. For example, the Casio MPC-501 Mini-Tablet's display is 6.7" diagonal, and its frame includes many buttons to the right of the display, so the full device is 8.2 inches wide by 5.2 inches tall—much too big to be considered "pocket-size," by many users.

TABLE 1

Some examples of known hand-held devices and their respective display configurations.

| Device: | pixel count | pixel density | display size (diagonal inches) |
| --- | --- | --- | --- |
| IPM Myfriend eBook | 640 × 960 | 150 ppi | 7.7" |
| Millitech Saturn PDA | 640 × 480 | 200 ppi | 4.0" |
| Pogo nVoy Communicator | 320 × 240 | 114 ppi | 3.5" |
| Cyberbank PC-e Phone | 640 × 480 | 200 ppi | 4.0" |
| Fujitsu LOOX T5/53W | 1280 × 600 | 141 ppi | 10.0" |
| e-Lab p40 IA Pad | 1024 × 768 | 202 ppi | 6.4" |
| Sony Clie PEG-NX80V | 320 × 480 | 152 ppi | 3.8" |

TABLE 1-continued

Some examples of known hand-held devices and their respective display configurations.

| Device: | pixel count | pixel density | display size (diagonal inches) |
|---|---|---|---|
| Samsung iTodo Mega-PDA | 800 × 480 | 187 ppi | 5" |
| Aqcess Tablet PC | 768 × 1024 | 123 ppi | 10.4" |
| Casio MPC-501 Mini-Tablet | 800 × 600 | 149 ppi | 6.7" |
| Palm Tungsten C | 320 × 320 | 150 ppi | 3" |
| HP iPaq H5550 | 240 × 320 | 105 ppi | 3.8" |
| Nokia 7650 data-enabled phone | 176 × 208 | 128 ppi | 2.1" |
| T-Mobile Sidekick(by Danger Inc.) | 240 × 160 | 115 ppi | 2.5" |
| Nokia Communicator 9110 | 640 × 200 | 150 ppi | 4.4" |
| DataWind Web access device | 640 × 240 | 128 ppi | 5.34" |

Each of the mobile devices above and all known conventional hand-held mobile devices today have some attribute that makes Web access on that device uncomfortable for most people or that makes the device too big to fit comfortably in most people's pockets. For example, the devices with displays whose pixel counts are 320×480 pixel or smaller simply cannot display enough of a Web page: User's have to scroll too much, and they suffer from the disorienting "looking through a straw" phenomenon. On the devices with pixel densities over 175 pixels-per-inch (175 ppi), Web pages are rendered to small for most people to comfortably read smaller text on most pages (if they can read the text at all). The devices that are over 6 inches (in width or height) are too big to fit comfortably in most people's pockets. Known devices using conventional displays are often larger in width or height than the diagonal length of the displays, since the frames around the devices often are made large enough to hold buttons and controls. The "Pogo" device's frame does not include buttons or controls, but the Pogo device's display is only 320×240 pixel.)

Most of today's mobile devices also have displays that are taller than they are wide (sometimes referred to as "portrait" orientation rather than "landscape" orientation). So, for example, the Sony CLIE device mentioned above is only 320 pixels wide, which means less than 40% of a typical Web page's width is visible at any give time. As noted above, the resulting experience with these devices is that the user feels like they are looking at Web pages "through a straw", seeing just a small portion at a time, with extensive scrolling required to browse the full page. This effect may be simulated by opening a Web page on a desktop computer monitor and shrinking the Web browser window so that only a small portion is visible.

Even if the Sony CLIE with its 320×480 pixel display were changed to display Web pages in landscape orientation—480 pixels wide by 320 pixels tall—the portion of a Web page visible at any given time is still too small to result in satisfying general purpose Web browsing, in our experience. Such a device could only display ⅓ the number of pixels that a user typically views on a desktop computer (e.g. ⅓ of 800×600 pixel). More importantly, such a device is only 60% the width of a typical 800 pixel wide Web page. That would certainly be better than trying to browse a Web page on a device with a 160×160 pixel or 240×320 pixel display, but our experiments (using Web browser windows shrunk to various pixel dimensions) indicate that browsing with a 480×320 pixel wide display (let alone all the current devices that have even smaller pixel counts) is too limiting to allow for satisfying general Web access over extended periods of use. It still requires too much scrolling and it still feels like "looking through a straw" at the Web pages.

There exist unresolved needs of many companies in the wireless service and mobile device industries. Among these needs is the need to significantly improve the mobile Web user experience on pocketsize devices, in order to attract more subscribers to emerging mobile Web services. Several early mobile Web services failed in large part because potential subscribers did not find the service compelling enough given the limitation of conventional pocketsize devices, and they did not want to carry around non-pocketsize devices. (Examples of these unsuccessful early mobile Web services include Monet Mobile, Omnisky, GoAmerica, and Metricom's Ricochet service.)

Some companies (such as Danger Inc.) offer services that attempt to shrink Web content into a format more suitable for low-resolution displays (such as the 240×160 pixel displays in devices designed by Danger Inc. for T-Mobile and other wireless operators). However, most Web content is designed for much larger displays, and accessing shrunk or transformed versions of most pages leads to display or interaction problems (ranging from ugly formatting to broken interaction features) and results in a Web access experience that most people find far less satisfying than accessing the Web on a desktop or notebook computer. This, along with the "looking through a straw" phenomenon discussed above, are among the reasons that very few people use today's hand-held devices to access the Web, even though wireless Internet networks are now widely available (for example, from service providers such as Sprint PCS, Verizon, T-Mobile, and AT&T Wireless in the U.S., as well as most wireless operators in Europe and Asia). Today's "wireless Web", accessed through today's hand-held devices, is simply nothing like the real Web that hundreds of millions of people enjoy accessing on their desktop and notebook computers.

One device that takes a different approach than most others is the PC-EPhone by a company named Cyberbank. The PC-Ephone uses a 4" diagonal display that is 640×480 pixels. That is enough pixels to display most of the width of a typical Web page, which is a step in the right direction. However, to keep the device small, Cyberbank's device squeezes all of those pixels onto a display that is only about 4" diagonal, making the display's pixel density about 200 dots per inch (ppi). That means that about 80% of a typical web page's width (i.e. 640 pixels of a typical Web page's 800 pixel width) is displayed on a display that is less than 3.5 inches across. That makes the Web pages uncomfortably small for most people, particularly when trying to read the text on most Web pages: Print on typical web pages appears exceedingly tiny on the PC-EPhone device. Furthermore, even though Cyberbank used a display with very high pixel density (i.e. very small pixels), their device is fairly tall (127 mm tall) because it includes various buttons and controls on the face of the device below the display.

Device makers typically use traditional electrical-mechanical controls (referred to herein as "mechanical" controls), such as buttons, rollers, jog-dials, toggle switches, joy sticks, and so on, as a means for allowing users to control functions on a device. And many device makers have incorporated rollers or jog-dials to allow scrolling in at least one dimension (usually just vertically). When a device only allows vertical scrolling, then content that is wider than the display width (such as many Web pages) must be reformatted by the device or by a remote server to fit horizontally onto the device's display, and such reformatting always changes the look of the page and often changes the behavior of Web page elements. A company named DataWind (www.datawind.com) recently developed a Web browsing device with two roller controls for scrolling—one roller on the right side of the top edge of the device (for horizontal scrolling) and another roller on the right side of the device (for vertical scrolling)—and with a 640×240 pixel display. Having separate horizontal and vertical scroll controllers is an improvement compared to only having a vertical scroll controller. However, the DataWind's placement of the horizontal scroll controller along the top edge of the device (rather than the bottom edge) is inconvenient and unnatural to many users because, when holding a device that is wider than it is tall, such as the DataWind device, the user's thumbs tend to rest along the bottom of the device, not along the top of the device.

In view of the foregoing, there is a need for improved techniques for displaying and interacting with multimedia information on hand-held electronic devices.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1-A illustrates a front view of a portable electronic display device according to an embodiment of the present invention;

FIG. 1-B illustrates a left side view of the portable electronic display device whose front view is shown in FIG. 1-A;

FIG. 2-A illustrates a front view of a portable electronic display device according to an embodiment of the present invention, highlighting substantially independent touch sensitive areas along the right and bottom edges of the device which the user can use to scroll content vertically or horizontally simply by sliding a finger or hand along the side or bottom of the device;

FIG. 2-B and FIG. 2-C illustrate a right side view and bottom view, respectively, of the portable electronic display device shown in FIG. 2-A;

FIG. 2-D illustrates a front view of a portable electronic display device according to another embodiment of the present invention. It highlights substantially independent touch sensitive areas along the right, left, top, and bottom edges of the device, which the user can use to control aspects of the device;

FIGS. 3-A and 3-B illustrate a front view and bottom view, respectively, of a portable electronic display device according to an embodiment of the present invention that uses a touch sensitive strip comprised of a fairly large number of small neighboring independent sensors;

FIG. 4-A illustrates the portion of a Web page viewable on a portable electronic display device according to an embodiment of the present invention at the display's native resolution;

FIG. 4-B illustrates preferred effective pixel resolutions for a portion of a Web page that the present display device can display, according to an embodiment of the present invention.

FIG. 5 illustrates a 600×400 pixel portion of a Web page rendered at a preferred 144 pixels-per-inch (ppi) pixel density compared to the same portion rendered at 190 ppi;

FIGS. 10-A and 10-B illustrate a front view and bottom view, respectively, of a portable electronic display device according to another embodiment of the present invention, highlighting the incorporation of two touch sensitive areas along the bottom edge and two along the top edge, as well as touch sensitive areas on the left and right edges—with all of the touch sensitive areas being substantially independent from one another;

FIGS. 12-A and 12-B illustrate a front view and bottom view, respectively, of a portable electronic display device according to another embodiment of the present invention, in which, in addition to six substantially independent touch sensitive areas along the edges (for sensing sliding or taping by a users hands), the device also incorporates a modifier spot;

FIG. 13-A illustrates a front view of a portable electronic display device according to a preferred embodiment of the present invention. This preferred embodiment has two touch sensitive areas along the bottom of the device, one on the left side, and one on the right side, each of which is substantially independent of the others and each of which enables the device to detect the direction and approximate speed of a finger or hand sliding along that touch sensitive area, so that the device can translate that into horizontal or vertical scrolling of content being displayed on the device. This embodiment also incorporates a modifier spot centered below the display, as well as a touch screen display;

FIGS. 13-B, 13-C, and 13-D illustrate the bottom view, top view, and right side view, respectively, of the portable electronic display device preferred embodiment shown in front-view in FIG. 13-A;

FIG. 14-A shows a user clicking on a displayed item while simultaneously pressing the modifier spot with a thumb according to a preferred embodiment of the present invention;

FIG. 14-B shows the screen view of FIG. 14-A after a context sensitive menu appears;

FIG. 15-A shows the use of a modifier spot as a shift key while typing on a virtual keyboard on a portable electronic display device according to a preferred embodiment of the present invention;

FIG. 15-B shows a typical virtual keyboard layout, including a "done" key that a user can click when they want the device to stop displaying the virtual keyboard;

FIG. 16-A illustrates a front view of a portable electronic display device according to another preferred embodiment of the present invention that is similar to the preferred embodiment discussed for FIG. 13-A above but that also includes two additional touch sensitive areas on the top edge of the device;

FIGS. 16-B, 16-C, and 16-D illustrate the bottom view, top view, and right side view, respectively, of the portable electronic display device preferred embodiment shown in front-view in FIG. 16-A;

FIGS. 17-A, 17-B, and 17-C illustrate the front view, bottom view, and right side view, respectively, of a portable electronic display device according to another embodiment of the present invention, with mechanical controls along the right and bottom edges used for vertical and horizontal scrolling, respectively;

FIGS. 18-A, 18-B, 18-C, and 18-D illustrate the front view, back view, top view, and right side view, respectively, of a portable electronic display device according to another embodiment of the present invention. This embodiment includes a touch pad on the back of the device that is used to scroll or pan displayed content in two dimensions by moving a finger around the touch pad;

FIGS. 19-A, 19-B, 19-C, and 19-D illustrate the front view, back view, top view, and right side view, respectively, of a portable electronic display device according to another embodiment of the present invention. This embodiment includes a touch pad on the back of the device (as in the embodiment illustrated in FIG. 18) as well as multiple touch sensitive areas along some or all of the edges, and a modifier spot on the bottom edge;

FIG. 20-A illustrates the right side view of a portable electronic display device according to another embodiment of the present invention. This embodiment includes a screen cover that can flip open, and a touch pad (item 1810) positioned on the inside of the screen cover when the screen cover is closed.

FIG. 20-B illustrates the same embodiment with the screen cover opened slightly, and FIG. 20-C illustrates the embodiment with the screen cover completely open and flipped around to the back of the device with the touch pad exposed out the back and the display 101 exposed out the front. In that "open" configuration, a user can use the touch pad, for example, to scroll or pan content being displayed.

FIG. 21 illustrates a perspective view from the upper right, a top view, and perspective view from slightly below one preferred embodiment of the present invention.

FIG. 22-A illustrates a user scrolling content horizontally by sliding their thumb along the bottom edge of a portable electronic display device, according to a preferred embodiment of the present invention.

FIG. 22-B illustrates a user scrolling content vertically by sliding their finger up or down a side edge of a portable electronic display device, according to a preferred embodiment of the present invention.

Figure 11:
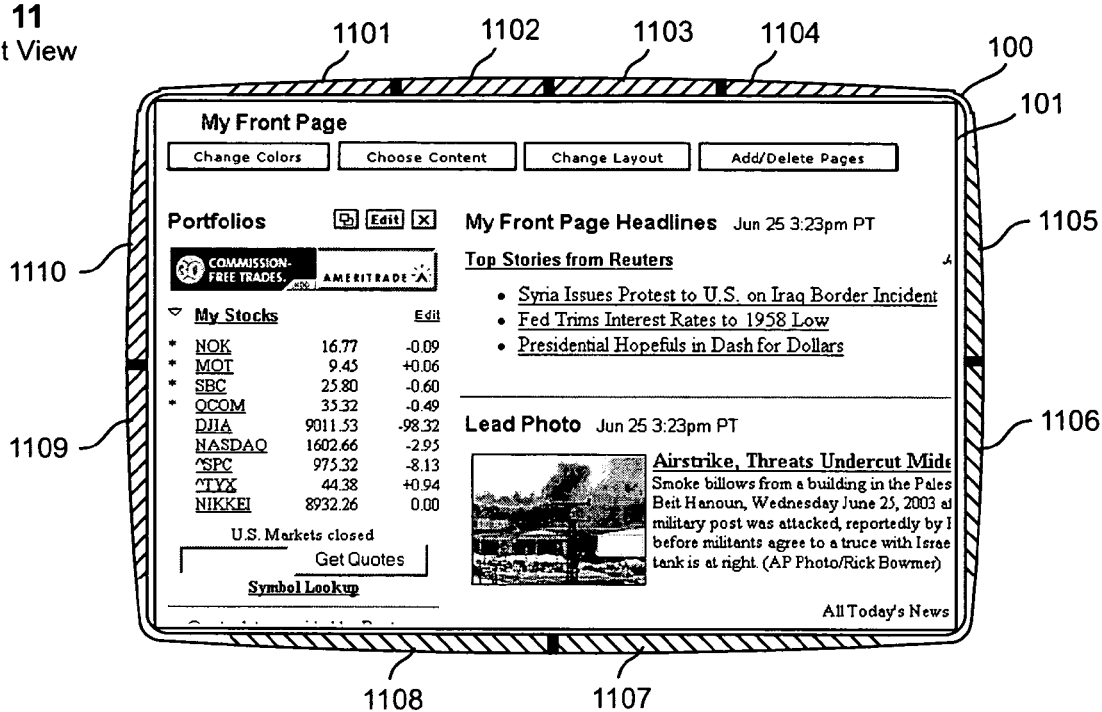
FIG. 11 illustrates a front view of a portable electronic display device according to another embodiment of the present invention. In this case, the illustrated device uses four substantially independent touch sensitive areas on the top edge, two on each side, and two on the bottom.

Unless otherwise indicated illustrations in the figures are not necessarily drawn to scale.

SUMMARY OF THE INVENTION

To achieve the forgoing and other objects and in accordance with the purpose of the invention, a variety of techniques related to an optimal method and device for portably displaying information are described.

Means are provided to achieve a portable electronic display device for displaying information, which include means for displaying information content, touch sensor means for detecting a first pattern of touch, and means for detecting patterns of touch to either control functions the portable electronic display device or to change the content displayed in the display means.

One aspect of the present invention provides for portable electronic display devices for displaying information in a display, which display device are configured according to certain principles that tend to make more pleasurable the viewing of content in the display. One embodiment of such a display device includes an outer casing that is effectively sized to be at most 5.75 inches in a first dimension and at most 4.5 inches in a second dimension, and a visible display in the enclosure, which is sized to have an effective pixel count of at least 520 effective pixels in the first dimension and an effective pixel count of at least 320 effective pixels in the second dimension, the display also has an effective pixel density of at most 175 effective pixels-per-inch (ppi) in the first and second dimensions. A multiplicity of sub ranges within the above the ranges are also efficaciously employed.

Yet other embodiments, are configured such that the effective pixel count in the first dimension is inclusively between 520 and 720 effective pixels, and the effective pixel count in the second dimension is inclusively between 360 and 440 effective pixels, and the effective pixel density is inclusively between 130 and 162 effective ppi, and the enclosure is effectively sized to be at most 5.0 inches in the first dimension and at most 3.5 inches in the second dimension. The enclosure is also sized substantially in the plane of the display, such that there is no more than 0.45 inches between an outer edge of the enclosure and an outer edge of the active surface. Likewise, a multiplicity of sub ranges within the above the ranges are also efficaciously employed.

In many applications, a preferred embodiment of the present invention the display device is designed within a plus or minus 15 percent range centered about the following center values of, for the enclosure, 4.6 inches in the first dimension, 3.1 inches in the second dimension, and, for the display, 600 effective pixels in the first dimension, 400 effective pixels in the second dimension, and the center value of 144 effective ppi for the effective pixel density.

Some of the foregoing embodiments also include at least one control operable to horizontally move content displayed and at least one control operable to vertically move content displayed, where the vertical and horizontal controls operate substantially independent of one another. In some these embodiments, at least one of the at least one the vertical controls is located at a right or left edge of the enclosure, and at least one horizontal control is located at a bottom edge of the enclosure. Depending on the application these controls may be touch sensors and/or mechanical controls. The touch sensors typically detect patterns of touch such as, but not limited to, sliding or tapping touch along at least a portion of the touch sensor. Embodiments may be configured such that engagement of the horizontal or vertical controls move the content displayed in the display, respectively, horizontally or vertically. In other embodiments, engagement of at least a portion of the horizontal or vertical controls, such as tapping or sliding on a touch sensor, controls a function of the portable electronic display device. In embodiments having a touch screen display, a function of the portable electronic display device may be similarly controlled. Typical functions controlled include scrolling and selecting displayed content.

Yet other embodiments of the present invention may include a touch-pad located on a back-side of the enclosure or on a pivoting joint joined to the enclosure. A cover may be joined to any of the foregoing embodiments, whereby the touch-pad, in some embodiments, is located, instead, upon an exposed side of the pivoting joint. The touch-pad may respond to touch patterns similar to the touch screen or touch sensors, in some applications.

The forgoing embodiments may also include a user engageable context modifier switch, which makes the display device responds differently to the first patterns of touch when a context modifier switch is engaged by the user. In some embodiments, a context modifier switch could be implemented as modifier spot in at least one portion of a touch sensor. Any practical number of modifier spots or context switches may be implemented, depending on the needs of the application. Other embodiments of the present invention exist that instead of including a display, use the prescribed touch sensor configuration aspects in a hand-held remote control, where any detected patterns of touch are communicated as control commands to a remote controlling means.

A method of implementing a mobile information service is also provided. One embodiment of the method includes the steps of providing to a customer the wireless enabled, hand-held electronic display device, where the service provider establishes wireless communications between the wireless hand-held device and an information server, which established wireless communications can communicate information from the information server to the wireless hand-held device. The service provider charges the customer an access fee for this service. Some other embodiments further include the steps of running a web browser on the wireless hand-held device for interacting with the information, and controlling a web browser function by engaging the at least one touch sensor. Additional steps, in alternative embodiments, include the step of charging to the customer an initial sign-up fee and/or a fee for the wireless hand-held device, and may also include the step of configuring the wireless hand-held device to automatically download the information from the information server, the information being available for later viewing by the customer.

A method for controlling displayed information on a portable electronic display device is also provided according to the principles of the present invention. An embodiment of the method includes the steps of configuring a touch sensor located at an edge of the portable electronic display device to detect a first pattern of touch, and detecting a pattern of touch and responding by either controlling a function of the portable electronic display device or by changing the content displayed in the display.

Alternative embodiments of the method further include the steps of detecting another pattern of touch on at least one portion of the touch sensor, and responding to the detection of the pattern of touch by controlling another function of the portable electronic display device or by changing the content displayed in the display. Typical functions include, for example, a web browser function.

Other features, advantages, and object of the present invention will become more apparent and be more readily understood from the following detailed description, which should be read in conjunction with the accompanying drawings.

DETAILED DESCRIPTION OF THE PREFERRED EMBODIMENTS

The present invention is best understood by reference to the detailed figures and description set forth herein. Embodiments of the invention are discussed below with reference to the Figures. However, those skilled in the art will readily appreciate that the detailed description given herein with respect to these figures is for explanatory purposes as the invention extends beyond these limited embodiments.

The embodiments of the present invention incorporate novel, carefully balanced combinations of pixel count ranges, pixel density ranges, and overall device size, as well as man-machine-interface innovations, so as to optimize the Web experience on pocketsize devices while keeping the devices relatively affordable.

Some "counter-common-wisdom" aspects of the present invention's display-related innovations are addressed first. The carefully balanced combinations of pixel count, pixel density, and device size introduced by the present invention allow users to see much more of a typical Web page in one glance than is possible on most of today's conventional hand-held devices—while still keeping the device pocket-size (i.e. as small as today's typical PDAs), still displaying Web page content crisply and at a large enough scale that even small text is legible (e.g. about as legible as it would be when rendered on a desktop computer monitor), and using relatively affordable display components. By contrast, all known conventional hand-held devices either display too little of a typical Web page (inducing a constrained "looking through a straw" experience), or they render Web content at a scale that makes text on many Web pages too small to comfortably read when displayed at the display's native resolution, or the device is too large to be considered pocketsize.

A generally accepted target window size for many Web content developers is 800×600 pixels, although Web pages are often somewhat wider and considerably taller. Almost anyone who has tried accessing the Web on a PDA with a 240×320 pixel display (which is a common PDA displays size) recognizes how frustrating it can be to access the Web on a device with a display that can only show a small fraction of a typical Web page at any given moment.

One might think that a simple solution for a device designer would be to incorporate a very high pixel-count display onto the device—such as 1000×1000 pixel display. However, contrary to common-wisdom, displaying more pixels (i.e. having a higher pixel count) does not necessarily improve image quality. In fact, having higher pixel counts can degrade image quality, depending on other characteristics of the display and device. For example, squeezing 1000×1000 pixels into a pocketsize device requires using a very high pixel density (i.e. very small pixels), but when content is rendered at the native resolution of a display with very high pixel density, content appears very small (so, for example, text on many Web pages will appear too small to comfortably read).

One might then assume that the device could simply display images at a larger scale (i.e. magnify it), at least when the user wanted to read smaller text. A scaling function is a useful feature in a Web browser, but there are two negative consequences to using a display with very high pixel counts and densities and then expecting the user to magnify images when they want to make pages legible:

First, bitmapped images on Web pages (such as photographs) degrade when magnified at a non-integer multiple (such as at 1.3-times scale [i.e. 130%] rather than 2-times scale [i.e. 200%]), because the magnification algorithm must interpolate the color of the fractional pixels. For example, if a two-pixel snippet of an image consists of a black pixel next to a white pixel, and that image is scaled by 50%, those two pixels become three pixels—e.g. one black pixel, one white pixel, and a third pixel whose color must be determined by the scaling algorithm. Regardless of the algorithm's choice of color for the third pixel, the magnified snippet will not look like the original snippet, because by definition the display cannot render half of that third pixel black and half of it white. The third pixel will have to be all black or all white (making the snippet unevenly colored compared to the original snippet), or the pixel will have to be some other color that was not in the original snippet. Users tend to perceive these transformations as making the new image blurry compared to the original, especially when the original bitmapped image includes text (as is common on many Web pages today). One can verify this with many image editing programs by scaling a crisp photograph or poster by a non-integer multiple. For text rendered by the device using fonts, intelligent font-size substitution may allow more graceful scaling, but it will generally still be imperfect because (as Web developers know well) not every size of every font renders equally well.

Second, the net result of this approach will be that users will generally scale Web pages on displays that use very high pixel counts and densities so they can read text better, attempting (imperfectly) to simulate a display with a more moderate pixel count and pixel density. However, everything else being equal, displays with higher pixel counts and densities cost more than displays with lower pixel counts and densities (often substantially more), and displays can represent a large portion of the overall device's cost, so using a display with very high pixel counts and densities would make the device less affordable without necessarily improving the user experience (and in many cases, degrading the user experience.)

Based on these considerations and significant experimentation using accurate simulations of ranges of display counts, display densities, and overall device sizes, it is observed that the careful balance of display characteristics of the embodiments of the present invention result in a substantially better Web experience on pocketsize devices than today's conventional pocket size devices while optimizing device costs as well. To optimize Web access while keeping the device pocketsize, pixel counts and pixel densities must be substantially higher than found on most of today's conventional pocketsize hand-held devices, but substantially lower than found on larger-than-pocketsize tablets or on the few high-end PocketPCs that have not used pixel counts and densities that are too low.

Some novel and "counter-common-wisdom" aspects of the present invention's man-machine-interface innovations are addressed next. Most conventional hand-held devices borrow a "desktop" user-interface metaphor form personal computers, where the user uses a stylus (or a finger) to select and move items; and the user generally scrolls content by either manipulating tiny scroll bars displayed on the device, or by operating a tiny roller or switch (generally only able to scroll in a single dimension).

Several of the embodiments of the present invention relate to the use of touch sensors along edges or back of the device (used for scrolling) and the incorporation of modifier spots (which can be operated while simultaneously clicking a displayed item on the touch screen to generate a different result than would occur if that item were clicked without simultaneously pressing the modifier spot). These types of device design elements are referred to herein as man-machine-interface elements.

As with the display related elements of the present invention, the man-machine-interface innovations of the present invention substantially improve the user experience when accessing content (particularly Web content) on hand-held devices, compared to today's conventional hand-held devices. The modifier spot elements allow users to instantly access features that would otherwise require extra clicks or steps to access. The edge- or back-located touch sensor elements allow users to sweep around Web pages almost as effortlessly as sweeping one's eyes around a printed page, simply by sliding fingers along the edges or back of the device—while also improving the device aesthetics and feel, and leaving more room on the surface of the device for a larger display. These man-machine-interface innovations help move from a desktop metaphor to a handheld-tool metaphor, which is more appropriate for handheld devices.

Note throughout that with respect to pixel counts, the relevant characteristic thereof is the pixel count at which images (such as Web page content) are effectively displayed and viewable. For example, a device with a 200 ppi, 800×600 pixel display can easily render Web page content at 100 ppi by "binning" the 200 ppi pixels into 2×2 squares and treating each little 2×2 square as a single "virtual" pixel: But then the device would only effectively be displaying 400×300 pixels—too small to display a full Web page. (This is sometimes referred to as "driving" the high-resolution display at a lower resolution. In this example, the effective pixel count would be 400×300 and the effective pixel density would be 100 dpi.) It should be noted that when a display with a given pixel count and pixel density is referred to, it is intended to include displays that are driven to effectively display content at that pixel count and pixel density (even if the method for doing this involves binning groups of smaller pixels together), with each effective pixel (however it is generated) being roughly square. Hence, the terms "effective pixel count" and "effective pixel density" shall mean, respectively, the resultant pixel count and resultant pixel density that an observer sees, independent of how the display (in hardware or software) is configured to render the resultant visual effect. (Ideally each pixel's height is exactly the same as that pixel's width, but if the pixels are not perfectly square then preferably they should be fairly close to square.) For example, if it herein said that one embodiment of the invention includes a 600×400 pixel 144 ppi display, it is intended to mean the inclusion of devices with 1200×800 pixel 288 ppi displays (or other high counts and densities) driven to present content at 600×400 pixel 144 ppi. Similarly, a device could have a display with 600 horizontal pixels and 800 vertical pixels where each pixel is twice as tall as it is wide, and that device could "bin" the pixels 2×1 to drive the display at 600×400 fairly square "virtual" pixels, and it would be considered an example of a 600×400 display for the purposes of this document.

One aspect of the present invention is to find a balance of pixel dimension range, pixel density range, and overall device size that allows users to see a substantial enough portion of a typical Web page so that scrolling does not become tedious, while still keeping the device pocket-size and easy to use even when standing, and while still making the pixel density low enough (i.e., making the pixels large enough) so that most people can still comfortably read the text and view images on typical Web pages. Also, displays with fewer pixels are generally less expensive than displays with more pixels, everything else being equal, so using enough pixels to make Web access comfortable, but not so many pixels that Web pages have to be magnified to be legible, optimizes the cost of the display while also optimizing the user experience. (In hand-held devices, a good color display can represent a substantial portion of the overall cost of the device, so lowering the cost of the display also lowers the cost of the entire device.) The present invention sets forth several new classes of devices with displays that have a balanced range of pixel dimensions and pixel densities that are unique among known hand-held mobile devices, particularly Web-enabled hand-held wireless devices.

The present invention also exemplifies variations on these new classes of hand-held mobile devices with unique features that help minimize the device size—particularly the extent to which the device body, enclosure, or "frame" extends beyond the sides of the display—while making the Web access user experience more fun and intuitive. It should be noted that when a device "body" or "frame" is referred to (e.g. 6×5 inches), it is meant that a rectangle that is 6 inches on one side and 5 inches on the other could fit around the device, not necessarily counting any antenna, or display cover, or case that the device might have, thereby defining what is referred to as an effective size; e.g., an effective size of 6×5 inches exclusive of protruding or (re)movable members, including but not limited to, antennas, covers, cases, or keyboards.

FIG. 1-A illustrates a front view of a portable electronic display device according to an embodiment of the present invention. Its display pixel count, display pixel density, and overall size, are carefully balanced to optimize viewing content such as Web pages while keeping the device pocket size. It lets users see enough content at any given time to avoid feeling constrained, without squeezing so much content in the given space that content becomes too small to comfortably read. And by not squeezing more pixels than are optimal into the display, the cost of the display is kept to a minimum too.

FIG. 1-B illustrates a left side view of the portable electronic display device whose front view is shown in FIG. 1-A.

Shown in the Figure is a device 100 with a display 101 that is 600×400 pixel, 144 ppi., and where the frame surrounding the display is relatively narrow all the way around the display—less than 0.16 inch in this example. The display is 4.167 wide by 2.778 tall (i.e. 5 inches diagonally), and yet the entire exemplary device illustrated in FIG. 1 is less than 4.5 inches wide (i.e., less than the 4.167-inch-wide screen plus a frame that extends no more than 0.16 inch to the left and right of the display at the widest part of the device) and less than 3.1 inches tall (i.e., less than the 2.778 display height plus a frame that extends no more than 0.16 inch above and below the display at the tallest part of the device). It should be noted that the foregoing balance of pixel count and pixel density is one not found on known mobile Web-enabled devices.

This device example illustrated in FIG. 1 has no moving electrical-mechanical buttons or controls on the front surface of the frame surrounding the display, which allows the frame to be narrow around the display. (Herein the terms "electrical-mechanical" and "mechanical" will be used interchangeably unless otherwise noted.) Of course, users need ways to interact with content displayed on their mobile devices. Usually device makers add electrical-mechanical controls to the frame surrounding the display (i.e., controls such as dials, jog-dials [where a jog-dial is basically a roller controller that can also be pressed to make a selection], joy sticks, buttons, and so on, that have moving parts that get translated into electrical signals that the device's electronics, firmware and software interpret as user interaction with that content). In at least one case, the "nVoy Communicator" device made by Pogo, the device maker did not include any electrical-mechanical controls, and instead has the user interact with the content by using a stylus on a touch-sensitive display as on most PDAs. By not including controls around the display, the frame around the display of the Pogo device can be relatively narrow (roughly 0.3 inch) all the way around the display, including below the display, keeping the overall device smaller than it would be if they added controls. (Unfortunately, the Pogo device's 3.5-inch diagonal display is only 320×240 pixel, so the device suffers from the inability to allow users to comfortably access real Web content, as described earlier.)

The present invention reduces a user's feeling the aforementioned "looking through a straw" effect. One reason for occurrence of this feeling is that, by the time a user scrolls from the left side of a typical Web page to the right side, little if any of the page that was visible when looking at the left side remains visible when looking at the right side, so the user tends to lose their place while scrolling. (In the case of 320-pixel wide display, none of a typical 800-pixel-3 wide Web page that is visible when viewing the left side of the page is visible once the user has scrolled far enough to see the right edge of the page. Even if a device were made with a 480-pixel wide display, then only 160 pixels (at most) that are visible when viewing the left side of a typical 800-pixel wide page remain visible once the user has scrolled far enough to view the right side of that page: That is, the "overlap" is 160. With overlaps this small or smaller, it becomes hard for the user to picture the layout of the full page in their mind. This makes it hard to navigate a Web page while "looking through the straw" of the low-resolution displays in today's mobile devices. However, in one aspect of the present invention, the observation is made that if a pocket-size mobile device's display's horizontal pixel dimensions are raised to the point where the "overlap" (i.e. the part of a typical 800-pixel wide Web page that remains visible as the user scrolls from the left side of the page to the point where they can see the right edge of the page) is at least 240 horizontal pixels (significantly higher than the overlap of today's mobile devices as noted above)—and if the vertical pixel count is also sufficiently high (at least 320 pixels), but preferably no higher than the display's horizontal pixel count—then a display pixel-count threshold is crossed such that the portions of typical Web pages visible at any time remain large enough to enjoy comfortable general Web access. While a 240-pixel overlap is the minimum required to cross this user-acceptability threshold if the vertical pixel count is as low as 320 pixels, an overlap of at least 400 horizontal pixels (half the width of a typical 800-pixel Web page) achieves better results in many applications. To get a 240-pixel overlap, a display would have to be at least 520 pixels wide. (520+520−800=240.) And to get a more ideal 400-pixel horizontal overlap, a display would have to be 600 pixels wide: That is, the middle 400 pixels of an 800-pixel Web page would remain continuously visible on a 600-pixel-wide display as a user scrolls from the left edge of the page to the point where the right edge of the page becomes visible. The horizontal and pixel counts embodied in the present invention shall be explained in more detail below.

Based on experimentation using accurate simulations of ranges of display counts, display densities, and overall device sizes, the observation is made that an ideal balance of characteristics for a pocket-size hand-held device used for general Web access (i.e. herein referred to as "mobile Web access") is as follows: a horizontal effective pixel count of 600, a vertical effective pixel count of 400, an effective pixel density of 144 pixels-per-inch both horizontally and vertically, and an overall device size of 4.6×3.1 inches. It is also observed that the further from this set of characteristics a device gets, the less ideal it is as a pocket-size hand-held device to be used for general Web access, but that devices whose respective characteristics come within plus or minus 15% of each of those ideal display counts, display densities, and overall device size, are better suited for Web access than any known conventional hand-held mobile devices today. This is because when a device's characteristics fall within plus or minus 15% of these carefully balanced ranges, the device size remains small enough to fit comfortably in most pockets and hands; yet enough pixels are visible to avoid the constraining "looking through a straw" phenomenon; and the pixel density is low enough that Web content that would be comfortable to view on a typical notebook computer at about 18-21 inches (with a typical notebook computer display pixel density of about 96 ppi) can be comfortably viewed on the device from a typical hand-held-device viewing distance of about 12-14 inches, without requiring magnification and without some content appearing uncomfortably small. Also the display cost (often a major part of the device's bill of materials) is optimized by not using substantially more pixels than is necessary to provide this optimal Web viewing experience on a hand-held pocket-size device.

Note that 600 horizontal pixels minus 15% is 510 horizontal pixels, which is slightly less than the 520 minimum horizontal pixel count referred to in the earlier guideline that was combined with a minimum vertical pixel count of 320. As noted above, it is observed that this slightly lower minimum of 510 horizontal pixel count is acceptable when balanced with a slightly higher minimum vertical pixel count of 340 pixels (which is 400 vertical pixels minus 15%) as well as a pixel density range of 144 ppi plus or minus 15%. The 520×320 pixel portion of a Web page (166,400 total pixels) referred to in the earlier guideline is a smaller portion of a page than a 510×340 pixel portion (173,400 total pixels), so the 520×320 pixel portion is referred to herein as the recommended minimum portion of a Web page that a portable electronic display device (particularly one used for Web access) should be able to display at native resolution.

FIG. 4-A illustrates the portion of a Web page (i.e. 600×400 pixels) viewable on a portable electronic display device according to an embodiment of the present invention at the display's native resolution, in comparison to the viewable portion of Web page on some other types of devices. FIG. 4-B illustrates a 520×320 pixel portion of a Web page (item 405), which is the recommended minimum portion of a Web page that a portable electronic display device should be able to display at native resolution; and it illustrates a 600×400 pixel portion of a Web page (101), which is a recommended ideal portion of a Web page a portable electronic display device should be able to display, according to an embodiment of the present invention. Moreover, FIG. 4-A and FIG. 4-B illustrate some of the foregoing points. Suppose, for example, the dotted outline 404 were the frame of a typical 800-pixel wide 600-pixel tall Web browser window. The small square 402 shows the portion of that Web page that could be seen through a 160×160 pixel window (which is the pixel count dimensions used-on many Palm OS devices). The slightly larger rectangle 403 shows the portion of that Web page that could be seen through a 240×320 pixel window (which is the pixel count dimensions of many hand-held computers that run Microsoft's PocketPC operating system, for example). Both of these windows 402 and 403 are just too small to enable decent general purpose Web access. As noted, an aspect of the present invention is the observation that the minimum portion of a Web page that a user needs to be able to see for reasonably enjoyable general purpose Web access on a pocket-size handheld device is 520×320 pixels, as shown by rectangle 405 in FIG. 4-B. In many embodiments of the present invention, a preferred pixel count dimension—one where it is observed that most users can become quite comfortable accessing Web pages—is around 600×400 pixels, as shown by rectangle 101 in both FIG. 4-A and FIG. 4-B. (A 600×400 pixel window happens to show exactly half the number of pixels as the typical 800×600 desktop Web browser window size previously referred to, and is three fourths as wide and two thirds as tall as the 800×600 window size.)

FIG. 5 illustrates a 600×400 pixel portion of a Web page rendered at a preferred 144 pixels-per-inch (ppi) pixel density (item 501), as compared to the same portion of that Web page rendered at about 190 pixels-per-inch (item 502). Most people find the sample text on this page too small to comfortably read when rendered at 190 pixels-per-inch. This FIG. illustrates why pixel count is just one element of optimizing a display for a portable electronic display device: The display's pixel density (and overall size) also must be carefully chosen. Based on a survey of the field, it appears that no display maker yet makes a display with 600×400 pixels at 144 pixels-per-inch, or within 15% of any of those dimensions—let alone one that fits into a preferred pocket-size form-factor of about 4.6×3.1 inches, plus or minus about 15% in each dimension.

In accordance with the principles of the present invention, if the display pixel dimensions exceeds certain thresholds, scrolling requirements are reduced enough (and the overlap described above grows large enough) that the "looking through a straw" phenomenon described above is mitigated enough to allow for enjoyable Web access on a pocket-size device. But to keep the device small enough to be considered pocketsize, yet keep displayed content large enough to be readable, the display's pixel density also has to be constrained to a certain range. After all, if the device's display had a pixel density of (for example) 72 dots-per-inch (ppi), then a display that is (for example) 600 pixels across would have to be over eight inches wide—too wide to be considered "pocket-size". On the other hand, if the pixel density were (for example) 190 dots-per-inch, then 600 pixels (which is three quarters of a typical 800-pixel-wide page) would get squeezed into barely more than 3 inches across—too small for comfortable reading of text on most Web pages. For example, FIG. 5 shows one portion of a Web page rendered at approximately 144 dpi in box 501 and that same portion of a Web page rendered at approximately 190 dpi in box 502. For many people (perhaps most people), much of the text on Web pages like this becomes too small to read comfortably at 190 dpi, where as it is small but readable at 144 dpi. For example, compare the text to the right of the small photograph in box 501 to that same text in box 502. Hence, for a pocketsize mobile device to enable sustained enjoyable general Web access, then in addition to having a display whose horizontal and vertical pixel counts fall into certain ranges, the display's pixel density (i.e. the pixels-per-inch) must also fall into certain ranges. The present invention covers, among other things, hand-held mobile devices (particularly devices used for Web access) whose displays embody specific ranges (one might call them specific balances) of pixel counts and pixel densities.

Embodiments involving touch sensitive areas are discussed below. Many hand-held devices have a touch sensitive area over the device's display, referred to as a touch screen. (Note that, throughout this document, the terms "touch-sensitive screen", "touch-sensitive display", "touch screen", "touch screen display", and "touch display" are interchangeably used, whereby all are referring to the use of electronic components that allow a device to detect where and when a user touches a spot on the display.) The present invention also includes embodiments with other types of touch sensitive areas that are positioned on the edges or back of the device, rather than just over the display. Logically, a device controller chip (where an application processor resides) will generally communicate with any touch sensitive areas through one or more touch detector units (i.e. the circuitry, firmware, and/or software used to either detect a pattern of touch on a touch sensitive area or to convert signals from a touch sensitive area into a form that the controller can interpret). Those skilled in the art will readily recognize how to use off-the-shelf solutions to implement the one or more touch detector units used with the various types of touch sensitive areas employed by the present invention. Depending on the application, for example, a touch detector unit can be incorporated into a device's main controller chip (e.g. using system on a chip [SOC] technology), integrated into a module that includes an application processor, implemented as a separate ASIC, integrated into the touch display's electronics, or implemented in other ways. A multiplicity of known architectures exists to carry out the touch detection aspect of the present invention.

The present invention defines a new approach for enabling users to interact with content such as Web pages on hand-held devices. This approach enables more elegant looking devices that are expected to be more fun and intuitive to use than other devices (particularly when accessing content presented by Web browsers and other applications commonly used on desktop and notebook computers, when this approach is combined with the carefully balanced ranges of pixel counts and pixel densities called for in the other embodiments described in this description of the present invention). Moreover, this new approach can allow the device maker to minimize the overall device size by keeping the entire device so it is not much larger than the size of the display.

A characteristic of this new approach is to include one or more touch-sensitive areas on or near the edges, such as, by way of example, and not limitation, the ends or sides, of the body of the device (preferably strips along the bottom, left, and right edges of the device, and possibly along the top edge as well) on which the user can tap or swipe a finger to control the device in various ways. For example, since a typical Web page is over 600 pixels wide and over 400 pixels tall, then when the page is displayed at full scale on a display that is 600×400 pixels, then only part of the page will be visible on the display at any given time—just like viewing the Web page in a 600×400 pixel window on a computer. The same is true for other types of content, such as spreadsheets and word processor documents. (FIG. 4 helps illustrate this: The outline 404 suggests the full 800 pixel width of a typical Web page, compared to a display 101 that shows 600 pixels across.)

While scrolling on most small devices is tedious (sometimes involving manipulating tiny scroll bars displayed on the screen), scrolling or panning content on a device with touch-sensitive edges can be much more efficient and enjoyable. A device that has touch-sensitive edges can be programmed to scroll or pan content (including Web pages) when the user simply slides their finger along the touch-sensitive edges— e.g. scrolling vertically when the user slides a finger along a touch-sensitive area running along a vertically oriented edge of the device body (see item 201 in FIG. 2-A and see FIG. 22-B), or scrolling horizontally by sliding a finger along a touch-sensitive area running along a horizontally oriented edge of the device body (see item 202 in FIG. 2-A and see FIG. 22-A), or even allowing the user to simultaneously scroll horizontally and vertically by simultaneously sliding fingers along both horizontal and vertical edges.

Figure 23:
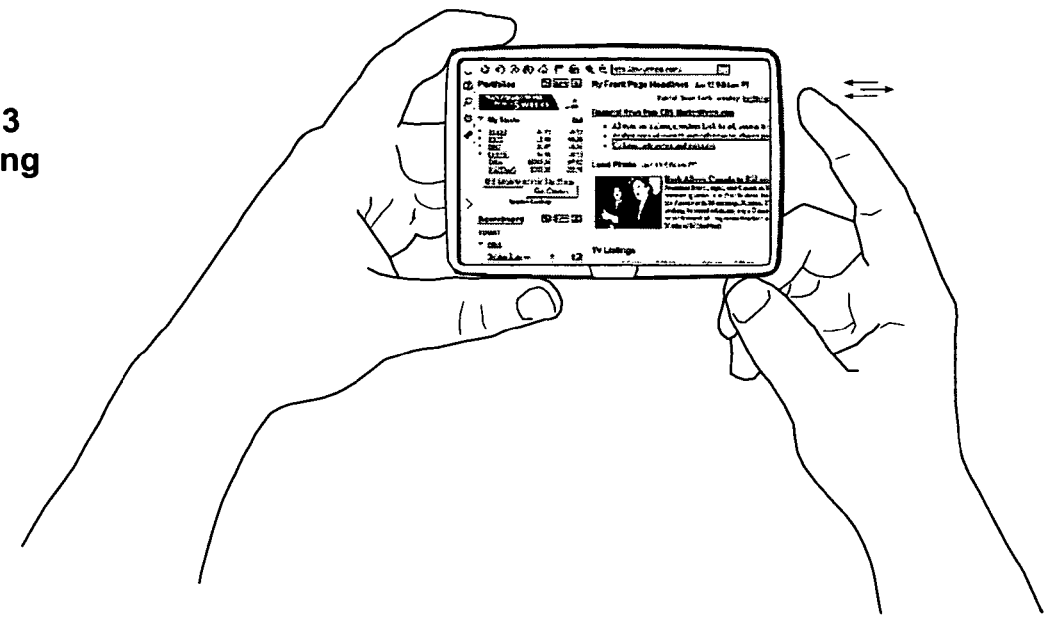
FIG. 23 illustrates a user causing a portable electronic display device to perform some function by tapping a finger on the device's edge, according to a preferred embodiment of the present invention.

A preferred embodiment of this type of device could (and should) still include a touch-sensitive display (like most PDAs), but with this new approach some of the most common functions a user does when interacting with a content-viewing device (such as turning it on and off, bringing up common menus, and scrolling content, among other possible functions) could be done more efficiently (and more enjoyably) by tapping or sliding fingers on the edges of the device. One useful function on a device used for Web browsing would be to let the user show or hide a URL text box (which shows the current Web page URL and allows the user to type a new URL) or other non-Web-page items (such as a palette of icons, menus, text representing common Web browser commands such as "Back"—to go back to the previous page, and so on) when the user taps or double-taps on a spot on a device. The device can fill its display with Web content most of the time, and then when the user needs the URL box or one of the other hidden items, the user could just tap the top of device (for example) to make those items appear. When the user is done using those items, another tap can hide them again. This makes optimal use of the relatively limited display real estate on pocketsize devices. A few related preferred device and method embodiments will be described below. FIG. 23 illustrates a person tapping on the side of a device with a touch sensitive area on its side.

Generally, when a user interface is designed to encourage users to view some action (such as sliding a finger along a touch sensor or manipulating some other control) as moving the display frame over a fixed page of content behind the display then that movement is referred to as "panning"; and when a user interface is designed to encourage users to view some action as moving the page of content behind a fixed display frame then that movement is referred to as "scrolling". In general, in contexts where panning or scrolling is appropriate, preferred embodiments of the devices described in this description of the present invention that have touch-sensitive edges should be programmed to "pan" the frame in the direction that the finger moves along a touch sensitive edge (which would make the content appear to move in the opposite direction of the finger's movement) rather than appearing to scroll content in the same direction that a user slides their finger, because "panning" will be more intuitive than "scrolling" on these types of devices. But a designer can choose to support either panning or scrolling or both. When scrolling being enabled by some mechanism is referred to herein, it is implicitly meant that panning could also be enabled by that mechanism, at least because it is just a matter of the device designer programming the device to move the content in the reverse direction. Furthermore, wherever a single term such as "scrolling", "scroll", "panning", "pan", and so on is employed, then unless otherwise explicitly stated, the term is intended to broadly mean either scrolling or panning—i.e., movement of the content within the frame in whichever direction the device maker prefers for the given context. Since this "touch-sensitive edges" concept can benefit interaction with a wide range of mobile devices, the present invention includes coverage of mobile devices enhanced with touch-sensitive edges even when those devices contain displays whose pixel counts and densities are not in the ranges preferred for Web access devices, discussed above. For example, even a messaging device with a 320×240 pixel display could benefit from the touch-sensitive edges invention described in this description of the present invention.

FIG. 2-A illustrates a front view of a portable electronic display device according to an embodiment of the present invention, highlighting substantially independent touch sensitive areas along the right and bottom edges of the device which the user can use to scroll content vertically or horizontally simply by sliding a finger or hand along the side or bottom of the device. FIG. 2-B and FIG. 2-C illustrate a right side view and bottom view, respectively, of the portable electronic display device shown in FIG. 2-A. FIG. 2-D illustrates a front view of a portable electronic display device according to another embodiment of the present invention. It highlights substantially independent touch sensitive areas along the right, left, top, and bottom edges of the device, which the user can use to control aspects of the device (such as scrolling content or making items appear or disappear on the display) by sliding or tapping on the touch sensitive areas.

Sensor technologies are often designed to only detect a single point of contact on the sensor at any given moment. Such touch sensors are referred to herein as "simple" touch sensors. Note that, herein, such a "simple" touch sensor could either merely be capable of detecting whether it is being touched or not, or it could be capable of identifying the position along the sensor where it is being touched at any given moment (or the direction and/or speed of a finger sliding along the sensor). The term "simple" is used herein only in reference to such sensors being unable to identify two or more simultaneous points of contact along the sensor at a given moment.

FIGS. 10-A and 10-B illustrate a front view and bottom view, respectively, of a portable electronic display device according to another embodiment of the present invention, highlighting the incorporation of two touch sensitive areas along the bottom edge and two along the top edge, as well as touch sensitive areas on the left and right edges—with all of the touch sensitive areas being substantially independent from one another. Even if all of these touch sensitive areas were implemented using simple touch sensors (as defined above), with this positioning of substantially independent touch sensitive areas, if a person were to hold onto this device with their left hand (as illustrated in FIG. 22-A), the person's left hand can stay in contact with touch sensitive areas on the top-left, left, and bottom-left edges without affecting the ability of the touch sensitive areas on the top-right, right, and bottom-right edges to sense sliding or tapping. Similarly, if a person were to hold the device with their right hand, coming in contact with the right side touch sensitive areas, the device could still detect taps and slides on the left-side sensors.

Note that throughout the present detailed description the terms "edge" and "edges" are used somewhat broadly. For example, these touch-sensitive areas could cover parts of the front surface around the display near the edges of the device body (as illustrated, for example, by touch-sensitive areas 1001 and 1005 in FIG. 10-A and FIG. 10-B), or they could cover areas on the left, right, top, or bottom sides of the device without extending onto the front surface of the device (as illustrated, for example, by touch-sensitive areas 1001 and 1005 in FIGS. 13-A, -B, and -D), or they could cover areas on the front surface of the device that are near the edges (without actually extending over the edges), or they could cover areas on edges of the device connecting the back surface to the sides, or they could cover various combinations or subsets of these areas or areas on or near the sides and edges of the device. If the device is designed to let the user hold one part of the device while operating the device and viewing content on the display, while the display itself perhaps extends away from the part being held (e.g. on a hinge or slider or some other means), then the edges that this document is referring to are the edges along that part of the device that the user normally holds when operating the device. Ideally, to maximize the front surface area of the device that can be dedicated to the display (i.e., to minimize the overall device size while maximizing the display size), not much of the device's front surface should be set aside for these (non-display) touch-sensitive areas.

Note that one benefit to placing part or all of each edge sensor on the side, top, or bottom of the device (as opposed to on the edge of the front surface of the device) is that when the user presses on the sensor, it tends to push the device into the other hand (the hand holding the device) rather than out of the hand—especially when operating a sensor on the right or left side of the device. It should be noted that these touch-sensitive areas along the device's edges are herein sometimes referred to as touch-sensitive "strips". It should be also noted that in cases where there are two adjacent touch-sensitive strips (such as those illustrated in FIG. 13-B items 1001 and 1002) a device maker may choose to have the right side of one strip (such as item 1001 in FIG. 10-B) almost touch the left side of the adjacent strip (such as item 1002 in FIG. 10-B); or the device maker may choose to leave a substantial gap between the two adjacent strips (as illustrated in FIG. 13-B by the gap between the left touch strip 1001 and the right touch strip 1002 running along the bottom of the device). Also note that when the position of a "touch sensor" or "touch-sensitive area" is described as "on the edge" or "on the surface" (or similar terms), it is intended to mean the area on the surface of the device where contact is detected by a sensor responsible for detecting the position of contact within that area (e.g. so the device can respond to tapping, sliding a finger, or other contact on that area). It should be noted that the actual touch-sensitive electronic component responsible for sensing touches on that area could be embedded below the surface of the device (for example, using a capacitance sensor or other type of electronic sensor that can sense contact and contact position through a surface material). Those skilled in the art will readily recognize how to use existing technologies to implement the touch sensitive areas used in the various embodiments of the present invention.

Also, note that the term "scroll" is broadly used here, so as to allow for whatever type of content movement across a display that a device maker or software engineer wants the user to be able to control in a given context (e.g. "scrolling", "panning", "dragging", "dragging a selection area", and so on). The main point here is that the device includes touch sensitive areas on the surface of the device other than the display that can allow the user to control the device and content displayed on the device in various fun and interesting ways.

In some preferred embodiments, the touch sensitive areas would be placed along edges (preferably rounded or beveled so they feel good on the finger) that transition from the device's front surface over to the sides of the device. For example, FIG. 2-A and FIG. 2-B illustrate a device 100 with a vertically oriented touch-sensitive strip 201 that extends from the surface area of the device body to the right of the display 101 to partway down the right side of the device (see item 201 in FIG. 2-B)—covering much of the rounded edge that connects the surface to the side of the device. Similarly, FIG. 2-A and FIG. 2-C illustrate a horizontally oriented touch-sensitive strip 202 that extends from the surface area of the device frame just below the display 101 to partway down the bottom of the device (see item 202 in FIG. 2-C). FIG. 2-D illustrates a preferred embodiment that places touch-sensitive strips on the top 203 and left 204 front edges of the device, as well as the right 201 and bottom 203 front edges shown in FIGS. 2-A, 2-B, and 2-C.

Various embodiments of this new approach shall be explained in more detail below. Various kinds of touch-sensitive sensor components have been used in electronic devices, including various types of capacitive sensors, resistive sensors, and electro-magnetic sensors, among others. Most notebook computers include small touch-pads that allow users to move the cursor around. 3M Corporation is a leading maker of capacitive and resistive sensor components and materials that are integrated into electronic devices to let users control aspects of those devices by moving their finger across the sensor material. Apple Computer makes a line of "iPod" music players, including models that use touch sensitive dials and buttons on the face of the device.

Some of the new types of devices described in this description of the present invention incorporate touch-sensitive areas along the edges (e.g. on or near the sides) of their device bodies (i.e. enclosures). Since these are mobile devices, the user is often going to hold a given device in his or her hand. So parts of the users hands are likely to be in contact with parts of those touch sensitive areas of the device even as the user uses a free finger (or whatever) to tap or swipe on other parts of those touch sensitive areas of the device. Even when some parts of a touch-sensitive edge are being touched by the hands that are holding the device, these devices should be able to detect when the user taps or swipes a finger along another part of that edge.

As noted earlier, the present detailed description of the invention includes descriptions of devices that include two or more independent touch sensors positioned around the device in ways that allow a user to control the device in various ways by touching (e.g. tapping, sliding a finger along, or touching in some other way) some sensor (or sensors) while the device has the ability to ignore one or more other sensors that might happen to be simultaneously in contact with the user, where each of said sensors can be (but does not necessarily have to be) a "simple" touch sensor. Again, the term "simple" is used here to refer to a sensor that can only detect contact at one point at a time along the sensor (rather than being able to simultaneously detect and report contact at two or more spots on that sensor at a given time).

Note that a device maker can provide a means for a user to explicitly indicate whether some sensors should be ignored (such as a menu or other software user interface element, or even a button or switch in device embodiments that allow for extra controls): A right-handed user could hold the left side of the device illustrated in FIG. 13-A with their left hand while using their right hand to click on items on the display's touch screen and to tap or slide fingers on the touch sensors 1002 and 1005 on the right side of the device, so that user could choose to have the device ignore the touch sensors 1006 and 1001 on the left side—just to be sure the device does not interpret incidental contact by the left hand on the left-side sensors 1006 and 1001 as attempts to scroll or otherwise operate the device. An alternative to providing a means for explicit specification of which sensors to ignore is to use software that automatically ignores contact other than taps and slides (e.g. contact that hasn't changed for the last fraction of a second), so that contact with a hand that is merely holding the device will automatically be ignored. In this alternative scenario, the device may occasionally misinterpret contact with the hand holding the device as a tap or a slide, but generally the effects will be minimal—e.g. a bit of inadvertent scrolling or a URL bar appearing or hiding—and generally another fairly effortless movement by the user can undo the inadvertent action.

Another aspect of the present invention relates to a "modifier spot" as described below. Most computer keyboards include useful "modifier" keys or buttons. (Herein the terms "key" and "button" are used interchangeably.) A modifier button is a button that is held down at the same time that another key is typed, to change the resulting action or behavior that would normally occur when that other key is typed without the modifier key also being held down. For example, the "Shift" key found on most keyboards is a modifier button: When the "A" key is typed alone, the lower-case letter "a" is usually typed; but when the "A" key is typed while the "Shift" modifier key is being held down, the upper-case letter "A" is typed. Other modifier keys found on some keyboards include a "Control" key (sometimes labeled "Ctrl"), an "Alternate" key (sometimes labeled "Alt"), and an "option" key, among others. In addition, one can think of the right-click button found on the "mouse" peripheral attached to many modern computers (particularly computers running the Windows OS operating system) as a modifier button. For example, when a user clicks on a link in a Web browser, by using the mouse to move the cursor over that link and pressing the left mouse button, then typically the Web browser simply loads the Web page (or other content) to which that link refers; but when a user "right clicks" on that link, by using the mouse to move the cursor over that link and pressing the right mouse button, then the Web browser generally behaves differently than it would with a left-click—such as popping up a menu of commands that are relevant for the current context (e.g. a "context-sensitive menu" that could contain commands such as "open link in new window", "bookmark this link . . . " and "email this link . . . "). Therefore, the right mouse button modifies the behavior that occurs when the user clicks on an item displayed on the screen, compared to what would happen when the user left-clicks on that item.

The present aspect of the present invention arises from the observation that hand-held devices with touch screens (i.e., displays that let people click on displayed links or buttons just by pressing on them with a stylus or a finger) should also include at least one modifier button outside of the display such that a behavior can be produced when the user simultaneously presses a modifier button and a spot on the touch screen (see FIG. 14-A and FIG. 15-A) that is different than the behavior that would be produced when the user touched that spot on the touch screen without simultaneously pressing the modifier button.

Modifier buttons are also referred to herein as "modifier spots" or "modifier switch" or "context modifier switch". No known conventional hand-held mobile device today incorporates modifier spots.

In the present invention, each modifier button can be implemented using either a physical electrical-mechanical switch (which also are herein referred to as a "mechanical switch", "mechanical button", or "mechanical control", since it has moving parts), or using a touch-sensitive electronic component (i.e. a touch sensor) with no moving parts (e.g. using a resistive or capacitance sensor).

In particular, embodiments of the present invention that use touch-sensitive edges (to ease scrolling), are expected to benefit further by including an additional modifier spot below the display, centered horizontally. FIG. 12-A and FIG. 13-A illustrate a couple preferred embodiments that include "modifier spots" 1201. (These preferred embodiments will be described in more detail below.)

Note that when the phrase "no moving parts" is used herein, it refers to no significant perceptible movement—i.e., so the user generally cannot see or feel the movement. It should be appreciated that some types of touch sensor electronic components that are here considered to have "no moving parts" actually have elements that are separated by a very small distance and that come together when the user presses on the touch sensor—but the distance is designed to be so small that the user generally does not see or feel that movement. In this sense, most touch sensors, such as those sold by Synaptics and Quantum Research Group, are considered to have "no moving parts". By comparison, the types of electrical mechanical switch buttons used on most hand-held devices—such as the row of buttons at the bottom of the front surface of Palm Vx PDAs—are designed to provide significant tactile feedback and to travel a distance that the user can see and feel, whereby such buttons are here considered to have moving parts.

FIG. 14-A shows a user clicking on a displayed item while simultaneously pressing the modifier spot with a thumb according to a preferred embodiment of the present invention. In a preferred embodiment of the present invention, this can result in a context-sensitive menu appearing, as illustrated in FIG. 14-B. This is analogous to what happens when a user of a standard Windows PC "right-clicks" on an item (i.e. positions the cursor over a displayed item and "clicks" with the right button of the mouse). In particular, FIG. 14-A illustrates how a user could use a thumb to touch a modifier spot 1201 on one of our preferred embodiments while simultaneously using a finger to click on a link 1401 displayed on a touch screen 101, so as to modify the behavior that would occur if the user had clicked on that link without simultaneously touching the modifier spot. As illustrated in FIG. 14-B, a device designer should program the device to pop up a menu 1402 (preferably a context-sensitive menu), in appropriate contexts, when the user "clicks" on an item on the display (i.e., touches that item with a finger or a stylus) while simultaneously pressing the modifier spot with another finger.

Note that FIG. 14-A and FIG. 15-A shows a user pressing the modifier spot with the thumb of the same hand that is clicking on a displayed item, as appropriate for the preferred embodiment illustrated in FIG. 14-A and FIG. 15-A. But the user could press the modifier spot with any finger or thumb of either hand. In particular, for some embodiments, if the user were using a stylus to click on displayed items, the user might prefer to use a finger of the hand holding the device to press the modifier spot, particularly if the modifier spot were implemented as a mechanical button and located at a position on the device's edge where the user could easily depress the modifier button with a finger or thumb of the hand that is holding the device.

FIG. 15-A shows the use of a modifier spot 1201 as a shift key while typing on a virtual keyboard on a portable electronic display device according to a preferred embodiment of the present invention. It is analogous to using a standard computer keyboard: When a key on the virtual keyboard is clicked without simultaneously pressing the modifier spot, the lower case version of the character corresponding to that key is typed. But when the key is clicked while simultaneously pressing the modifier spot (which is acting like a shift key in this context), the upper case version of that character is typed. Referring to It is fairly common for devices with touchscreens to be able to display a "virtual" keyboard on which the user can "type" by clicking on displayed character keys. FIG. 15-A shows a virtual keyboard 1501 as it might appear on one of the preferred embodiments in the present invention. In this example, the display 101 presents the virtual keyboard so it appears on top of a Web page with a text box 1502. The user is using the virtual keyboard to type text into that text box. In this context, it is a good idea for the device's modifier spot to act as a "Shift" key. If the user clicks on, say, the "U" key on the virtual keyboard 1501 without simultaneously pressing the modifier spot, then the lower case letter "u" should get typed in the text box. But if the user clicks on the "U" key while simultaneously using a different finger (on either hand) to press the modifier spot 1201, then the upper case letter "U" should be typed. In this context, it is desirable for the device to display the label "shift" 1503 (or display a symbol representing "shift", such as an up arrow) right above the modifier spot.

FIG. 15-B shows a typical virtual keyboard layout, including a "done" key that a user can click when they want the device to stop displaying the virtual keyboard. The Figure illustrates one example of a virtual keyboard that can be displayed on the touch screen of a device, to allow typing. (Since a virtual keyboard is merely an image displayed on the screen, it is relatively easy for device makers to program the device to display virtual keyboards of various sizes, colors, shapes, configurations, supported languages, and so on. A device can also be programmed so as to allow a user to choose from a several virtual keyboard options.) It is useful to include a key that the user can type to indicate when they are finished using the virtual keyboard—such as the key labeled "done" 1504 in this example. For example, when a user clicks in a text box, such as item 1502 in FIG. 15-A, the device can display the virtual keyboard 1501 to allow typing. After the user has typed some characters, then when the user types the "done" key 1504 (in FIG. 15-B), the device can hide the virtual keyboard until it is needed again.

It should be noted that embodiments of the present invention that include touch-sensitive edges but which do not include an explicitly designated modifier spot could still support modifier spots. For example, such a device could be programmed to modify the behavior of a click on a point on the touch-sensitive display when the user simultaneously touches one or more of the touch-sensitive edges in some way defined by the device maker. But the feature is easier for users to understand and remember if the device has a clearly identified modifier spot.

In embodiments of the present invention that include touch sensitive edges (e.g. used for scrolling) and a modifier spot, it is preferable that the modifier spot also be implemented using a touch sensor (independent from the touch sensitive edges). In these embodiments, the touch sensitive edges would be implemented using touch sensors that are capable of detecting sliding (e.g. the position or direction of a finger sliding along the sensor), whereas a modifier spot could optionally be implemented using a touch sensor that can merely detect whether or not it is being touched at a given moment (which may be slightly less expensive than sensor components capable of detecting sliding).

FIGS. 18-A, 18-B, 18-C, and 18-D illustrate the front view, back view, top view, and right side view, respectively, of a portable electronic display device according to another embodiment of the present invention. This embodiment includes a touch pad on the back of the device that is used to scroll or pan displayed content in two dimensions by moving a finger around the touch pad. The touch pad on the back of the device is independent of any touch screen on the front of the device over the display. The touch pad on the back of the device can be used to scroll or pan content while the touch screen on the front of the device can be used to select displayed items. As shown, the device 100 has a display 101 on its front surface, like other embodiments discussed in this description of the present invention. And that display would have a transparent touch screen over it, like other embodiments discussed here (and like touch screens found over the displays on most PDAs), which a user can use to select a link, button or other displayed item simply by touching the displayed item (e.g. with a finger or stylus). What differentiates this design, illustrated in FIG. 18, is an additional touch-pad 1810 on the back of the device that is used to scroll or pan displayed content in two dimensions (and optionally used to move a cursor) but that is not used to select items: Items may be selected using the separate touch screen that is on top of the display 101 on the front of the device (or by other means that a device maker may choose to implement such as one or more extra buttons or other types of controls used for item selection). By separating the content movement control from the content selection control, and by enabling movement of the content in substantially any direction (e.g. along angles as well as up or down) by simply moving a finger along a touch-pad 1810 in the direction one wants to move the content, a device can enable very quick and intuitive navigation and interaction with Web pages and other content.

FIGS. 19-A, 19-B, 19-C, and 19-D illustrate the front view, back view, top view, and right side view, respectively, of a portable electronic display device according to another embodiment of the present invention. This embodiment includes a touch pad on the back of the device (as in the embodiment illustrated in FIG. 18) as well as multiple touch sensitive areas along some or all of the edges, and a modifier spot on the bottom edge.

FIG. 19 illustrates an exemplary device that, in addition to the back touch pad 1810, has several touch sensitive areas 1903, 1904, 1905, and 1906 that can be used to sense tapping or touching, so the device can respond by performing certain functions in response to a tap, double-tap, or other simple types of touching on one or more of those touch-sensitive spots. For example, a tap on item 1904 or item 1903 in a device like that shown in FIG. 19 could make a URL box and a palette of icons representing common Web browser functions appear or disappear; and a double-tap on item 1905 or item 1906 could turn the device on or off (e.g. toggle between "awake" and "asleep"). (Note that, unlike the touch-strips on some of the other devices described in this description of the present invention, the touch-sensitive areas discussed here, and illustrated by item 1903, 1904, 1905, and 1906 in the embodiment illustrated in FIG. 19, do not necessarily have to sense sliding since the back touch-pad can be used for scrolling: To sense tapping and related simple "on-off" or "off-on" transitions, the side sensors just have to sense whether they are being touched or not. That may allow device developers to use slightly less expensive sensor technology.) FIG. 19 shows just one configuration of such touch sensitive areas: Their could be more or fewer of those touch sensitive areas, and they could be placed in other positions on the device, so long as (for these embodiments) the device also has a touch pad on the back and a display with a touch screen on the front. Such devices can also include one or more "modifier" spots 1201 (which is another use of a simple touch sensitive area that just needs to sense "off-on" and "on-off" transitions) that works in the same way as discussed above when FIG. 12 and FIG. 13 were described.

FIG. 20-A illustrates the right side view of a portable electronic display device 100 according to another embodiment of the present invention. This embodiment includes a display cover 2001 that can rotate open on a hinge 2002, and a touch pad 1810 positioned on the inside of the display cover when the display cover is closed over the display 101. FIG. 20-B illustrates the same embodiment with the screen cover opened slightly, and FIG. 20-C illustrates the embodiment with the screen cover completely open and flipped around to the back of the device with the touch pad exposed out the back and the display 101 exposed out the front. In that "open" configuration, a user can use the touch pad, for example, to scroll or pan content being displayed.

To optimize the ergonomics of these devices that have a back touch pad (e.g. item 1810 in both FIG. 18 and FIG. 19), these devices should generally be programmed to respond to movement of the user's finger on the back touch-pad by moving displayed content in the same directions as the finger moves, whether that's up, down, left, right, on an angle, in circles, or along essentially any other path: In this way, the user feels as if they are just pushing the "page" of content around within the frame of the device. For example, if the user is looking at a Web page that is too large to display all at once at normal scale given the device's pixel count, and the user wants to take a look at content that is off to the lower right of the lower-right corner of the frame, then the user can slide their finger along the back touch-pad toward the upper left of the device, and the content would pan in that direction, revealing that content.

Note that one alternative way to allow scrolling of displayed content (which is not incompatible with those covered here) is to let the user move the content around simply by touching a point on the touch screen over any part of the displayed content that is not a link, button, or other selectable item, and then dragging their finger as though they are dragging the content around within the frame. However, that can lead to users accidentally clicking on selectable items when the user really just wanted to move the content. Therefore, for embodiments of the present invention that include touch sensitive areas along the edges or back, it is generally preferable to use those touch sensitive areas to move content while a touch screen (over the display) is used to select displayed items.

Among companies that sell touch sensitive components and technologies that can be used in devices described in this description of the present invention are Quantum Research Group (based in Hamble, England) and Synaptics (based in San Jose, Calif., U.S.A.). Companies such as these have basic capacitive and resistive sensors for sensing whether an area is being touched, and slider sensors for sensing where along a strip a user is touching, and two-dimensional touch pads for sensing where in a two dimensional area a user is touching. Some of these components have the nice characteristic that they can be placed beneath the surface of the device and still work, so a device designer can make the sensors invisible or seamless, if they want.

Note that in all the device embodiments described here, the devices can include extra elements or components not covered here. For example, the device illustrated in FIG. 13-A, includes a card slot 1310 for adding memory or i/o devices (such as a plug-in bluetooth radio or a camera). Embodiments could contain multiple slots, as well as a wide variety of other types of ports (such as headset jacks or battery-recharge power plugs) or other extra features (such as speakers, LEDs that indicate whether the device is within range of a radio transmitter, and more).

Obviously all device embodiments can also optionally include a display cover. The cover could, for example, be attached by a hinge (attached at a number of places on the device), or it could snap on, or slide on, or connect to the device in any number of ways. Note also that terms such as "program", "programmed", and "programming" are used broadly herein when referring to means a device maker uses to store instructions that define the behavior of the device in response to the user manipulating controls on the device (including controls with no moving parts, such as touch sensors and touch screens). In this sense, a device maker can "program" the device using any combination of software, firmware, programmable logic chips, application-specific integrated chips (ASICs), RAM, ROM, flash memory, or any other means with which hardware and software engineers are familiar.

Note also that certain aspects of the present invention—including those that allow a user to control some behavior of a device by sliding a finger along touch-sensitive surface areas on the sides of that device—can be used in a wide range of devices, including electronic books (e.g. e-Books), digital cameras, digital music players, digital video players, portable television, remote controls, and hand-held electronic tools (including measurement tools) and electronic-mechanical tools (such as electronic drilling tools). That is why the most of the embodiments described below refer broadly to "devices" (rather than just to hand-held computers or PDAs). An application for these new classes of devices is for Web access devices—which can be referred to as "personal Web" or "pocket Web" clients or devices. (Such personal Web devices can optionally include other features, of course—such as cameras, TV receivers, global-positioning capabilities, and so on.)

A wireless service provider could create and offer a mobile Web service specifically targeting devices with the display and control characteristics of the device embodiments of the present invention. For example, a particularly compelling new type of mobile Web service involves distributing pocket-size hand-held devices to subscribers, where the devices have, for example, local-area radios (such as Wi-Fi radios) or wide-area-radios (such as 3G cell radios) or both types of radios, and the devices have touch-sensitive displays that show between 480 and 800 pixels horizontally (inclusive) and between 320 and 600 pixels vertically (inclusive), and the devices have touch sensitive edges (and optionally touch-sensitive backs) for controlling the device (as described earlier), and the devices have a Web browser application. In the present embodiment, the service provider charges the subscribers a monthly fee (and optionally charge an initial sign up fee or a charge for the device hardware, or both). Since this service embodiment uses the device embodiments of the present invention, this service allows users to get better access to the Web than they can from other pocket-size devices (such as cell phones or PDAs with smaller screens) in a large number of places (at home, at work, or on the road), while still keeping the device to a small size. A few embodiments of this proposed mobile Web service will be described in some detail below.

A small hand-held device with a relatively high-resolution display and easy to use input mechanisms, such as the devices embodied by the present invention, is suitable as a general-purpose remote control. A few embodiments of this remote-control system shall also be described in some detail below.

Note that wireless versions of any of the device embodiments discussed here could be implemented with any type of wireless transceiver, including Wi-Fi, WiMax, Bluetooth, Utrawideband, cellular, infrared, other types, or a combination of multiple types of transceivers. Device makers could even implement the device embodiments described in this description of the present invention without any built-in radio (e.g. when making a standalone PDA or other device that need not necessarily have wireless access), although that makes the device less compelling than wireless-enabled devices.

FIGS. 17-A, 17-B, and 17-C illustrate the front view, bottom view, and right side view, respectively, of a portable electronic display device according to another embodiment of the present invention. This embodiment includes one mechanical control (e.g. a roller control) along the bottom edge for controlling horizontal scrolling of content being displayed and a second substantially independent mechanical control along the right edge for controlling vertical scrolling of that content.

Having separate horizontal and vertical scroll controllers is an improvement compared to only having a vertical scroll controller. If a device designer wants to use multiple mechanical controls for scrolling (e.g. one for vertical scrolling and one for horizontal scrolling), then, in many applications, the horizontal scroll control is suitably placed on the bottom of the device (as illustrated in FIG. 17-A, item 1702). This placement allows the user to hold the device naturally, with thumbs supporting the device from the bottom, and still comfortably operate the horizontal control 1702 with a thumb and the vertical control 1705 with a finger. By contrast, when the horizontal control is placed on the top edge of the device, then it becomes more awkward to switch between operating the horizontal control and operating the vertical control. So in addition to the main innovations documented here (involving touch sensitive controls), a small class of improvements for designs using these kinds of mechanical scroll controls will also be described in some detail below.

It should also be noted that, for many applications, the use of touch sensitive strips is expected to make scrolling easier and more precise than using mechanical controls such as rollers and buttons. In part, this is because, with a touch strip, a user can slide their finger all the way up and down (or back and forth) along the touch strip and the device can map that full movement to scrolling content from one end of a Web page's scrolling range to the other; whereas with a roller control (particularly a small one like those found on typical mobile devices that use roller controls), the user can only roll the roller about the width of the roller—usually less—before having to lift their finger to reposition it on the roller in order to roll the roller some more. As a result, it usually requires many of these roll-and-reposition-and-roll-some-more sequences to scroll through a Web page, which can get tiresome.

The present invention additionally covers variations on the embodiments covered here that add components such as speakers, microphones, headset jacks, camera jacks, power jacks, vibration motors, LEDs, extra little displays or LEDs (e.g. to signal strength, battery power left, time, or other information), and other ports, connectors, controls, or components typically found on smart-phones or PDAs, except (of course) when an embodiment description explicitly exclude such a feature. One natural extension of these devices is to make them cell phones (as well as best-of-breed Web and multimedia viewing devices). Some of the embodiments described below relate to this extension.

The first class of embodiments of the present invention to be discussed here has the following characteristics: Each device that is a member of this class of embodiment has overall body (i.e. enclosure) dimensions within plus or minus 15% of 4.6 inches in a first dimension (e.g. horizontally) and within plus or minus 15% of 3.1 inches in a second dimension (e.g. vertically); its display has an effective pixel count within plus or minus 15% of 600 effective pixels in a first dimension and within plus or minus 15% of 400 effective pixels in a second dimension; and its display has an effective pixel density within plus or minus 15% of 144 effective pixels-per-inch (ppi) in each dimension.

(For example, a device whose front view is 4.7×2.8 inches, with a 640×360 pixel 150 ppi display, would fit within this first class of embodiments; and so would a device that is 4.6×3.1 inches with a 600×400 pixel 144 ppi display.)

The next class of embodiments of the present invention has the following characteristics: Each device that is a member of this class of embodiments has a display that presents content at a horizontal pixel count of 520 or more pixels and at a vertical pixel count of 320 or more pixels, and at a maximum pixel density of 175 ppi; and the device's overall body dimensions are no more than 5.75 inches in one dimension (i.e., height or width) and no more than 4.5 inches in the other dimension (i.e., width or height). Note that in this description of the present invention, when referring to a hand-held device being A inches in one dimension and B inches in the other dimension, or A×B inches, then unless otherwise specified, it is referring to the largest two dimension of the device, which are generally the vertical and horizontal dimensions (i.e. how tall and wide the device is) when looking at the surface of the device that contains the main display. In many of the embodiment descriptions herein, the third dimension of the device—the device's thickness—is not explicitly limited because it is generally assumed to be relatively small compared to the other dimensions of the device (e.g. less than 2 inches) unless otherwise specified.

The 5.75×4.5 inch dimensions are considered by the present invention to be an upper bound to keeping the mobile devices "pocket-size", although preferred embodiments would be smaller than that maximum (e.g. closer to 4.6×3.1 inches, which could be considered "palm-size").

Before describing the next class of embodiments of the present invention a few points should be clarified as follows. As with all the new embodiments and classes of devices disclosed in this description of the present invention, the devices in this first class of devices can optionally have one or more additional smaller displays, as long as the main display used for displaying content conforms to the constraints described for that embodiment and class of devices and as long as the overall device dimensions conform to the constraints described for that embodiment and class of devices. In each of the descriptions of embodiments and new classes of devices in this device, when the description refers to "the display", it is referring to the device's main display. On devices with just one display, the "main display" is that one display. On devices with more than one display, the main display is generally significantly larger than any other displays on the device, since the main display is the display that is designed to be used most often for displaying the richest content that that device can display. As an example of a device that includes multiple displays, quite a few "flip-style" mobile phones today have a small display on their outside that can present the time, date, incoming caller ID, and sometimes even small images, without the user having to open up the flip-phone to turn on and look at the main display.

It is not uncommon for mobile devices to have physical features (such as keypads, controls, displays, or other types of features) that can slide, flip, rotate, or swing on hinges, so that the device can have multiple configurations. The term "content-access configuration", as used below, is meant to refer to any configuration in which a given device can be when that device is being used to access content on its main display. If a given device, in any of its content-access configurations, falls within the constraints of any of the descriptions of new classes of devices or embodiments in this description of the present invention, then that device is covered by the present invention, even if the device can also be used or stored in other configurations that are not covered by the present invention.

In all descriptions of new classes of devices and embodiments in this description of the present invention, the overall device measurement constraints in these descriptions must account for the device's main display and for any of the device's control features that are used to interact with the device when the device is being used to access and interact with content on its main display (e.g. buttons, joy sticks, keypads, keyboards, or other controls). However, in all descriptions of new classes of devices and embodiments in this description of the present invention, the overall device body measurement constraints described are not meant necessarily to account for antennas or for parts of the body surface that exist primarily to accommodate antennas. (For example, a device whose dimensions otherwise comply with one of the embodiments of the present invention, but which includes a big extra bump to accommodate an antenna, still complies with the given invention embodiment.) The overall device body measurement constraints in these descriptions are also not meant necessarily to account for simple display covers. For example, if a device designer includes a simple display cover that swings or slides out to the side of the display when the user wants to use the display, then the extent to which the cover sticks out to the side of (or above or below) the rest of the device when the cover is open does not have to be factored into the overall device body measurement constraints referred to in these descriptions. The overall device body measurements are also not meant necessarily to account for peripheral or accessory features (i.e., features other than the main display and control features) that are easily extended, retracted, or removed by the user, such as styluses, memory and i/o cards, leather device cases, and so on.

The displays in the new classes of devices and embodiments described herein can be touch-sensitive if the device maker chooses, just as the displays on most PDAs today are touch-sensitive (i.e. touch screens). (That is, the displays can have touch-sensitive surface elements that detect when and where the user touches the display with a stylus or a finger, so the user can, for example, select displayed items like button images and Web page links.) Preferred embodiments of all of the device embodiments covered in the present invention include touch-sensitive displays, but an embodiment of the present invention is not required to include a touch-sensitive display unless otherwise specified in the description of that embodiment.

Notice that a given device's size constraints, combined with its display's pixel density limitations, can imply upper bounds on the display's horizontal and vertical pixel counts. For example, a device whose overall body width is 5.75 inches (e.g. in any configuration where the display is being used to access rich content such as Web pages), and whose display's pixel density is 175 ppi, could have no more than 5.75×175=1006 pixels across that display, since by our definition the device's body completely contains the device's display.

The next class of embodiments of the present invention has the following characteristics (a subset of the previous class): Each device in this class of embodiments has a display with a horizontal pixel count between 520 and 800 pixels and a vertical pixel count between 320 and 600, and a maximum pixel density of 168 ppi, and overall body dimensions no more than 5.25 inches in one dimension and no more than 4 inches in the other dimension.

Note that throughout this document, when a range such as "between X and Y" is specified then the reader should assume that the range is inclusive of X and Y unless stated otherwise. For example, in the device class description just described, the pixel horizontal count is between 520 and 800 inclusive.

The next class of embodiments of the present invention has the following characteristics (a subset of the previous class): Each device in this class of embodiments has a display with an effective horizontal pixel count between 520 and 800 effective pixels, and an effective vertical pixel count between 360 and 600 effective pixels, and an effective pixel density between 122 and 166 effective ppi; and the device's enclosure dimensions are no more than 5.2 inches in one dimension and no more than 3.8 inches in the other dimension.

The next class of embodiments of the present invention has the following characteristics: Each device in this class of embodiments has display characteristics fitting one or more of the classes of embodiments described above, and (in addition) has at least one horizontal scroll control, and at least one vertical scroll control, where the vertical and horizontal scroll controls are substantially independent from one another.

The next class of embodiments of the present invention has the following characteristics: Each device in this subclass of embodiments has the same characteristics as the previous class of embodiments described above, and (in addition) has at least one horizontal scroll control along the bottom edge of the device, and at least one vertical scroll control along the right or left edges of the device (which could include a vertical scroll control on both the right and the left edges), where the vertical and horizontal scroll controls are substantially independent from one another.

A notable subclass of this class of embodiments of the present invention has the following characteristics: Each device in this subclass of embodiments has the same characteristics as the previous class of embodiments described above, and in addition, at least one of the horizontal and one of the vertical scroll controls are implemented using touch sensors instead of mechanical controls.

Another class of embodiments of the present invention has the following characteristics: Each device in this class of embodiments has a color display with a horizontal pixel count between 550 and 780 pixels and a vertical pixel count between 350 and 550, and a maximum pixel density of 160 ppi, and overall body dimensions no more than 5.25 inches in one dimension and no more than 3.875 inches in the other dimension.

Another class of embodiments of the present invention has the following characteristics: Each device in this class of embodiments has a color display with horizontal pixel count between 560 and 720 pixels and a vertical pixel count between 350 and 520, and a maximum pixel density of 155 ppi, and overall body dimensions no more than 5.1 inches in one dimension and no more than 3.75 inches in the other dimension.

Another class of embodiments of the present invention has the following characteristics: Each device in this class of embodiments has a color display with horizontal pixel count between 560 and 640 pixels and a vertical pixel count between 360 and 480, and a maximum pixel density of 152 ppi; and overall body dimensions no more than 4.95 inches in one dimension and no more than 3.7 inches in the other dimension.

Another class of embodiments of the present invention has the following characteristics: Each device in this class of embodiments has a display that presents content at a horizontal pixel count between 520 and 640 and at a vertical pixel count between 320 and 480, and at a pixel density between 110 ppi and 160 ppi.

Another class of embodiments of the present invention has the following characteristics: Each device in this class of embodiments has a display that presents content at a horizontal pixel count between 520 and 620 and at a vertical pixel count between 340 and 440, and at a pixel density between 110 ppi and 175 ppi.

Another class of embodiments of the present invention has the following characteristics: Each device in this class of embodiments has a display with a horizontal pixel count between 560 and 640 pixels and a vertical pixel count between 360 and 480, and a maximum pixel density of 172 ppi; and the frame (i.e., the part of the device body surrounding the display) extends up, left, and right beyond the display edges by no more than 0.5 inch and extends down beyond the display's bottom edge by no more than 2 inches.

Herein, when it is said that the frame surrounding the display extends no more than a given distance beyond a given edge of the display, it is meant that there is no more than that given distance between the outer edge of the device's enclosure (i.e. body) on that side of the display and the outer edge of the active area of the display on that side of the display (where the "active area" is the part of the display component that can present changeable image pixels visible to the user). The term "active surface" and "active area" are used interchangeably herein.

Another class of embodiments of the present invention has the following characteristics: Each device in this class of embodiments has a display with a horizontal pixel count between 560 and 640 pixels and a vertical pixel count between 360 and 480, and a maximum pixel density of 172 ppi and a minimum pixel density of 135 ppi; and the frame (i.e., the part of the device body surrounding the display) extends up, down, and left beyond the display edges by no more than 0.5 inch and extends right beyond the display's right edge by no more than 1.5 inches.

Another class of embodiments of the present invention has the following characteristics: Each device in this class of embodiments has a display with a horizontal pixel count between 560 and 640 pixels and a vertical pixel count between 360 and 480, and a maximum pixel density of 172 ppi and a minimum pixel density of 135 ppi; and the frame extends up, down, and right beyond the display edges by no more than 0.5 inch and extends left beyond the display's left edge by no more than 1.5 inches.

Another class of embodiments of the present invention has the following characteristics: Each device in this class of embodiments has a color display with a horizontal pixel count between 560 and 640 pixels and a vertical pixel count between 360 and 480, and a maximum pixel density of 152 ppi; and the frame extends up, left, and right beyond the display edges by no more than 0.5 inch and extends down beyond the display's bottom edge by no more than 1 inch.

Another class of embodiments of the present invention has the following characteristics: Each device in this class of embodiments has a color display with a horizontal pixel count between 560 and 640 pixels and a vertical pixel count between 360 and 480, and a maximum pixel density of 152 ppi; and the frame extends up, left, and right beyond the display edges by no more than 0.3 inch and extends down beyond the display's bottom edge by no more than 0.75 inch.

Another class of embodiments of the present invention has the following characteristics: Each device in this class of embodiments has a color display with a horizontal pixel count between 560 and 640 pixels and a vertical pixel count between 360 and 480, and a maximum pixel density of 160 ppi; and the frame surrounding the display extends above, below, left, and right of the display edges by no more than 0.5 inch. That is, the entire frame around the display extends less than 0.5 inch beyond the outer edge of the display's active area, along each edge of the display. One way to minimize the need for large frames is to include few or no buttons or other controls on the device's frame. Some of the embodiments described below discuss this more.

Note that throughout this document, when a description says something like "the frame surrounding the display extends below the device [or in some other given direction] by no more than X inches", that means the entire body of the device extends no further than X inches beyond the bottom edge of the active area of the display [or whatever the corresponding display edge is for the given direction], for at least one configuration in which the device can operate when the user is accessing content on the display. FIG. 1-A illustrates a device where the frame surrounding the display (i.e., the body of the device) may extend less than 0.2 inch above, below, left, and right of the display. (A device like the one illustrated in FIG. 1-A could conceivably include a keyboard or keypad that can slide out from behind the display as needed and stick out below the device by an inch or more. But as long as the user can also access content on the display when that keyboard or keypad is retracted behind the display, then for the purpose of the invention descriptions in this description of the present invention, the device's frame can be said to extend left, right, above, and below the display edges by no more than 0.2 inch [in at least one relevant configuration of the device].)

Another class of embodiments of the present invention has the following characteristics: Each device in this class of embodiments has a color display with a horizontal pixel counts between 560 and 620 pixels and a vertical pixel count between 360 and 440, and a maximum pixel density of 152 ppi; and the frame surrounding the display extends above, below, left, and right of the display edges by no more than 0.5 inch. That is, the entire frame around the display is less than 0.5 inch beyond the display's edge, along each edge of the display.

Another class of embodiments of the present invention has the following characteristics: Each device in this class of embodiments has a color display with a horizontal pixel count between 520 and 900 pixels and a vertical pixel count between 320 and 700, and a maximum pixel density of 175 ppi; and the frame surrounding the display extends above, below, left, and right of the display edges by no more than 0.33 inch.

Another class of embodiments of the present invention has the following characteristics: Each device in this class of embodiments has a display with a horizontal pixel count between 520 and 900 pixels and a vertical pixel count between 320 and 700, and a maximum pixel density of 175 ppi; and the frame surrounding the display extends above, below, left, and right of the display edges by no more than 0.2 inch.

Another class of embodiments of the present invention has the following characteristics: Each device in this class of embodiments has a color display with a horizontal pixel count between 520 and 640 pixels and a vertical pixel count between 320 and 480, and a maximum pixel density of 165 ppi; and the frame surrounding the display extends above, below, left, and right of the display edges by no more than 0.35 inch.

Another class of embodiments of the present invention has the following characteristics: Each device in this class of embodiments has a display with a horizontal pixel count between 540 and 640 pixels and a vertical pixel count between 360 and 480, and a maximum pixel density of 166 ppi and a minimum pixel density of 125 ppi; and the frame surrounding the display extends above, below, left, and right of the display edges by no more than 0.33 inch.

Another class of embodiments of the present invention has the following characteristics: Each device in this class of embodiments has a display with a horizontal pixel count between 520 and 720 pixels and a vertical pixel count between 360 and 440, and a pixel density between 130 and 162 ppi; and the device body (i.e. enclosure) is at most 5.0× 3.5 inches, and the frame surrounding the display's active area extends above, below, left, and right of the display edges by no more than 0.45 inch.

Another class of embodiments of the present invention has the following characteristics: Each device in this class of embodiments has a display with a horizontal pixel count between 600 and 640 pixels and a vertical pixel count between 360 and 440, and a pixel density between 140 and 148 ppi; and the device body (i.e. enclosure) is at most 4.75 inches in one dimension, 3.25 inches in a second dimension, and 3.25, and 1.5 inches in a third dimension; and the frame surrounding the display's active area extends above, below, left, and right of the display edges by no more than 0.33 inch. (As noted above, this refers to the edges of the active area of the display, not to the entire display component.)

Another class of embodiments of the present invention has the following characteristics: Each device in this class of embodiments has a color display with a horizontal pixel count between 540 and 620 pixels and a vertical pixel count between 360 and 440, and a maximum pixel density of 158 ppi; and the frame surrounding the display extends above, below, left, and right of the display edges by no more than 0.33 inch.

Another class of embodiments of the present invention has the following characteristics: Each device in this class of embodiments has a display with a horizontal pixel count between 520 and 620 pixels and a vertical pixel count between 340 and 480, and a maximum pixel density of 160 ppi and a minimum pixel density of 100 ppi; and the frame surrounding the display extends above, below, left, and right of the display edges by no more than 0.33 inch.

Another class of embodiments of the present invention has the following characteristics: Each device in this class of embodiments has a display with a horizontal pixel count between 520 and 624 pixels and a vertical pixel count between 336 and 464, and a maximum pixel density of 160 ppi and a minimum pixel density of 100 ppi; and the frame surrounding the display extends above, below, left, and right of the display edges by no more than 0.25 inch.

Another class of embodiments of the present invention has the following characteristics: Each device in this class of embodiments has a color display with a horizontal pixel count between 520 and 620 pixels and a vertical pixel count between 360 and 440, and a maximum pixel density of 148 ppi and a minimum pixel density of 122 ppi; and the frame surrounding the display extends above, below, left, and right of the display edges by no more than 0.2 inch.

Another class of embodiments of the present invention has the following characteristics: Each device in this class of embodiments has a display with a horizontal pixel count between 520 and 850 pixels and a vertical pixel count between 336 and 650, and a maximum pixel density of 175 ppi; and the overall body dimensions of the device are no more than 5.5 inches in one dimension and no more than 3.8 inches in the other dimension.

Another class of embodiments of the present invention has the following characteristics: Each device in this class of embodiments has a display with a horizontal pixel count between 520 and 620 pixels and vertical pixel count between 380 and 440, and a maximum pixel density of 160 ppi; and the overall body dimensions of the device are no more than 4.85 inches in one dimension and no more than 3.65 inches in the other dimension.

Another class of embodiments of the present invention has the following characteristics: Each device in this class of embodiments has a color display with a horizontal pixel count between 520 and 620 pixels and a vertical pixel count between 380 and 440, and a maximum pixel density of 148 ppi and a minimum pixel density of 118 ppi; and the overall body dimensions of the device are no more than 4.75 inches in one dimension and no more than 3.50 inches in the other dimension.

Another class of embodiments of the present invention has the following characteristics: Each device in this class of embodiments has a color display with a horizontal pixel count between 520 and 800 and a vertical pixel count between 320 and 480, and a maximum pixel density of 158 ppi and a minimum pixel density of 100 ppi; and the overall body dimensions of the device are no more than 5.5 inches in one dimension and no more than 3.7 inches in the other dimension.

Another class of embodiments of the present invention has the following characteristics: Each device in this class of embodiments has a color display with a horizontal pixel count between 520 and 760 and a vertical pixel count between 350 and 460, and a maximum pixel density of 158 ppi and a minimum pixel density of 100 ppi; and the overall body dimensions of the device are no more than 5.4 inches in one dimension and no more than 3.7 inches in the other dimension.

Another class of embodiments of the present invention has the following characteristics: Each device in this class of embodiments has a color display with a horizontal pixel count between 560 and 624 and a vertical pixel count between 360 and 440, and a maximum pixel density of 158 ppi and a minimum pixel density of 128 ppi; and the overall body dimensions of the device are no more than 5 inches in one dimension and no more than 3.7 inches in the other dimension.

The next new class of devices defined by class of embodiments of the present invention has the following characteristics: Each device in this class of devices in this class of embodiments has a color display with a horizontal pixel count of 600 and a vertical pixel count of 400, and a maximum pixel density of 150 ppi and a minimum pixel density of 135 ppi; and the overall body dimensions of the device are no more than 4.9 inches in one dimension and no more than 3.7 inches in the other dimension.

Yet another preferred embodiment of the present invention is a device with a 640×400 pixel display whose pixel density is no more than 164 ppi and whose frame around the display extends beyond the edges of the displays (when looking straight toward the display) by no more than 0.4 inch on every side of the display.

Yet another preferred embodiment of the present invention is a device with a 640×480 pixel display whose pixel density is no more than 165 ppi and whose frame around the display extends beyond the edges of the displays (when looking straight toward the display) by no more than 0.36 inch on every side of the display.

Some of the devices covered by the above descriptions have very narrow frames around the displays, which allows the overall device size to be minimized for a given size display. As noted earlier, a good way to minimize the size of the frames surrounding displays is to eliminate (or at least minimize) electrical-mechanical controls (i.e., controls with moving parts, like the buttons found on most devices), at least from the front surface of the device. Some of the following embodiments descriptions describe new ways to allow users to control the device with components that have no moving parts and that blend into the device body, so that the need for electrical-mechanical controls is reduced.

Another class of embodiments of the present invention has the following characteristics: Each device in this class of embodiments has a display, and includes one or more touch sensitive areas running along one or more of the edges of the device (outside of the display), and the device includes electronics and software which work together to detect certain types of contact by a user's finger or hand on those touch sensitive areas and responds by controlling the device in some way.

A preferred embodiment of this class includes one or more of these touch-sensitive areas on one or more sides of the device that do not include a display.

Another preferred embodiment of this class would include one or more of these touch-sensitive areas on two or more sides of the device that do not include a display.

Yet another preferred embodiment of this class of devices would have no electronic-mechanical controls with moving parts whatsoever (i.e., no buttons, switches, joy sticks, keypad, etc.)—not even an on/off switch. Instead, the user would use means other than an electronic-mechanical on/off switch or button to turn the device on and off and to control the device.

Yet another preferred embodiment of this class of devices would have just one electronic-mechanical control with moving parts—an on/off switch or power button somewhere on the device (preferably on the top of the right side or on the right of the top side of the device).

Another more general embodiment of the class of devices would have no more than three controls with moving parts. The type of each control could be anything that fits on the sides (including the top, bottom, left, or right sides) or back of the device, including electronic-mechanical buttons, dials, jog-dials, toggle switches, and so on.

Yet another preferred embodiment of this class of devices would have a touch sensitive display (in addition to the touch-sensitive device edges) and would have at least one electronic-mechanical control with moving parts. And one of this device's electronic-mechanical controls would be a "shift" button placed somewhere on the device (preferably on the top or bottom side of the device) where a user can depress that "shift" button with a finger or thumb of the hand that is holding the device while using the other hand (or a stylus held by the other hand) to tap on a virtual board key displayed on the device's touch-sensitive display. A common feature on PDAs is the ability to type by tapping keys on a virtual keyboard displayed on the PDA's touch sensitive display. But switching between lower and upper case to type a single upper case letter usually requires tapping on a shift-lock button (usually just labeled "shift" or labeled with an up-arrow logo) on the virtual keyboard, tapping the desired letter, and then tapping the shift-lock button again—a three-step process. With the preferred embodiment just described, the user could simply tap on the desired letter with one hand while pressing the electrical-mechanical "shift" button with the other hand, which is quicker than the three-step process required on most PDAs.

Note that, as discussed earlier, any of the embodiments covered in this description of the present invention can (and preferably do) include a touch-sensitive display like those in most PDAs and hand-held computers. On the devices covered in the present invention, users could use touch-sensitive displays for many interactions, such as selecting images of buttons, menu items, Web page links, or other items presented on the display. But in preferred embodiments of the present invention, users would find it easier and more fun to control some aspects of the device by using the touch-sensitive areas along the edges of the device.

A device with no electronic-mechanical controls (or very few) can look and feel quite elegant compared to device with a bunch of controls, and it can allow fun and intuitive interaction with rich content such as Web pages, when combined with the touch-sensitive edges in the present invention. This is suggested by some of the following embodiments and examples.

One preferred embodiment of this class of devices is a device that includes the touch sensitive areas along at least one vertically oriented edge of the device and at least one horizontally oriented edge of the device (see FIG. 2 as an example) and which can scroll Web pages and other content vertically when the user swipes a finger up or down along one of the vertically oriented touch sensitive areas and can scroll that content horizontally when the user swipes a finger left or right along one of the horizontally oriented touch sensitive areas.

Again, the term "edge" is used somewhat broadly here, as described earlier, since a given device designer may choose to run the touch-sensitive area along the sides, top, or bottom of the device, or along the edge of the front surface, or along a curved or sloped surface area that serves as a transition from the edge of the front surface to the sides, top, or bottom, or along the edges of the back of the device, and so on.)

A preferred embodiment of this class of devices is a device that includes the touch sensitive areas along at least one edge of the device and which can move the highlighted item in a list or array of displayed items forward or backward through that list or array of displayed items in response to the user sliding or moving a finger back and forth along the touch-sensitive edge. (For example, the device could display an alphabetized list of names in an address book with one name highlighted, and when the user slides their finger up or down the touch-sensitive edge, the highlight moves up or down the list of names until the name corresponding to the address the user wants is highlighted.) And additional preferred embodiment that extends this concept is to then allow the user to select the highlighted item by tapping on the touch-sensitive edge: So, for example, scrolling through a list and selecting a name could involve dimply sliding a finger up and down a touch-sensitive edge until the desired item is highlighted, then lifting that finger and letting it rest back down on the edge of the device.

Yet another preferred embodiment would be a device that can sense when the user taps a certain number of times in approximately the same spot on a given edge of the device and respond with a given action.

Device designers have freedom to define what constitutes a "single tap", "double tap", "triple-tap", "swipe", and so on. For example, a "single tap" could be defined as the user touching a given spot on a touch-sensitive area briefly (for example, for less than a certain amount of time such as 0.3 second or less) before raising the finger off that touch-sensitive area and keeping it raised for more than some minimum duration (for example 0.2 sec, or some appropriate duration that helps distinguish the lifting of the finger from an inadvertent "bounce" of the finger), and then optionally allowing the finger to rest back down on the device (e.g. for more than the 0.3 second minimum duration mentioned above, to distinguish the "rest back down" from a double-tap). A "double tap" could be defined as the user briefly touching the finger on a given spot, lifting it briefly, again briefly touching sufficiently near the first tap spot (e.g. within 0.1 inch), lifting the finger again for the minimum lift time (e.g. the 0.2 sec mentioned above), before optionally allowing the finger to rest back down on the device. A "triple-tap" would be analogous, with one more touching and lifting of the finger in the sequence. A "swipe" could be defined as the user moving a finger in one of a limited set of directions across some minimum length of a touch-sensitive area along an edge of the device, and the speed and direction of a "swipe" could be used to determine how the device responds to that device—for example, scrolling some content in a direction and at a speed that correspond to the direction and speed of a swipe.

One preferred embodiment of this class of embodiments would be a device that turns the display (and optionally other electronic components in the device) on or off when the user triple-taps on an edge of the device (or on some specific part of a specific edge). Another embodiment could turn the display on or off when the user double-taps (rather than triple-taps).

Note that some touch sensor technologies consume much less power than a typical display (especially medium- or high-resolution color displays), so a device maker can leave on the touch-sensitive strips along the edges without draining the battery too quickly, while leaving the display off until the user chooses to turn the display on by tapping on the touch-sensitive edges. Also note that a device maker can implement the embodiments of the present invention so that the devices automatically periodically turn on some components—such as turning on a radio periodically to fetch an update to a Web page that a user checks often, then turning the radio off again until the next time it is scheduled to wake.

Yet another preferred embodiment of this class of embodiments would be a device that is programmed to allow the user to zoom in or out of the displayed content (e.g. enlarge or shrink it) by sliding a finger or hand along some touch-sensitive edge of the device, at least in certain contexts. A "zoom" feature is available in several Web browser software applications (such as the Web browser made by Opera Software ASA of Norway, for example). The present invention simply introduces an intuitive way to control that feature using the physical action of sliding a finger or hand along an edge of the device.

Another embodiment of this class of embodiments would be a device that is programmed to allow the user to move the "focus" through the set of selectable items on a page of content (such as a Web page or a menu) simply by sliding on or more fingers (or other parts of the users hands) along one or more touch-sensitive edges of the device, at least in certain contexts. In many computer Web browser applications, a selectable item that is in "focus" is highlighted by a light outline, and a user can tell the browser to select that item (as if the user clicked on it with the mouse) by typing a keyboard key (such as the space bar or the Enter key). These Web browsers generally let users move the focus from one selectable item to another selectable item by typing a key (such as the Tab key) on the keyboard. Some Web browsers (such as the one made by Opera Software ASA) also let a user move the focus up, down, left, or right, using keyboard commands. The present invention introduces an intuitive way to control that feature using the physical action of sliding fingers or hands along edges of the device.

Yet another preferred embodiment of this class of embodiments would be a device that is programmed to allow the user to switch which of several open pages of content (such as open Web pages) is in front, cycling through each page one by one (bringing each to the front, in turn) as the user slides a finger along one of the touch-sensitive edges (preferably the top edge if the top edge has a touch-sensitive strip), at least in certain contexts. Many computer Web browsers let users have several Web pages open at once, and let users switch which page is in front using some command key or by clicking on a displayed label, tab, or menu item corresponding to each page. The present invention introduces an intuitive way to control that feature using the physical action of sliding a finger or hand along an edge of the device.

Yet another preferred embodiment would be a device that makes a menu or array of items appear on the display when the user double-taps on an edge of the device. (This menu or array of items could be analogous to the menu that appears when a user presses the "menu" button found on many cell phones, or to the array of items that appear when one presses the Home button on some PDAs. On those devices, it is generally a default set of commands, functions, applications, data sources, or other items, from which a user can choose, to tell the device what the user wants to do next with the device.)

Yet another preferred embodiment could interpret double-tapping on an edge as one function and interpret triple-tapping as another function, or interpret double-tapping (or triple-tapping) on one edge differently than double-tapping (or triple-tapping) on a different edge. For example, an embodiment might interpret double-tapping on the right side of the device as the instruction to make a given menu appear, and interpret double-tapping on the top edge of the device as an instruction to make a given Web page appear.

Yet another preferred embodiment could interpret swiping a given edge in one direction (right to left) as the "Back" function commonly used in most Web browsers (to take the user back to the previous Web page they were looking at before bringing up the current Web page). And an embodiment could also interpret swiping that given edge in the other direction (e.g. left to right) as the "Forward" function commonly used in most Web browsers (to take the user forward to the Web page they were looking at before they invoked the Back function).

In a preferred embodiment, the touch sensitive areas would be placed along front edges that are beveled or rounded (so they feel good on the finger), and that transition from the device's front surface near the edge over to the sides of the device. FIG. 2-A and FIG. 2-B illustrate a device 100 corresponding to a preferred embodiment, with a vertically oriented touch-sensitive strip 201 that extends from the front surface area of the device body just to the right of the display 101 to partway down the right side of the device (see item 201 in FIG. 2-B)—covering much of the rounded edge that connects the surface to the side of the device. Similarly, FIG. 2-A and FIG. 2-C illustrate a horizontally oriented touch-sensitive strip 202 that extends from the surface area of the device frame just below the display 101 to partway down the bottom of the device (see item 202 in FIG. 2-C). FIG. 2-D illustrates a preferred embodiment that places touch-sensitive strips on the top 203 and left 204 front edges of the device, as well as the right 201 and bottom 203 front edges shown in FIGS. 2-A, 2-B, and 2-C.

Another embodiment could limit the touch-sensitive strips so they run along the sides of the device (without covering any part of the front surface of the device's body). Another embodiment could have a completely rounded edge—i.e., the surface of the device next to the display would curve around to gracefully become the side of the device—and the touch sensitive strips could run along some length of that rounded side of the device.

In a preferred embodiment, users would be able to simultaneously scroll displayed content vertically and horizontally by simultaneously swiping fingers along touch-sensitive vertically oriented and horizontally oriented edges of the device (when in a context where it makes sense for the content to scroll both horizontally and vertically, such as when a Web page appears to extend beyond both horizontal and vertical edges of the display). For example, the user could hold the device shown in FIG. 2-A or FIG. 2-D with their left hand and use the other hand to simultaneously swipe the right edge of the device with the index finger and swipe the bottom edge of the device with the thumb of that other hand.

As noted earlier, in most preferred embodiments, the device would also include a touch sensitive display, like most PDAs. The touch sensitive display would be used for text input (e.g. by tapping on a displayed image of a keypad or keyboard) and for selecting certain displayed items (such as selecting links, buttons, menu items, and other items on Web pages or in other applications). Ideally the touch-sensitive screen technology used would allow users to use their finger to select items displayed on the screen, rather than requiring the user to use a stylus.

Yet another class of embodiments of the present invention has the following characteristics: Each device in this class of embodiments has a display with a horizontal pixel count between 520 and 900 pixels and a vertical pixel count between 320 and 700, and a maximum pixel density of 175 ppi; and one or more of the edges of the device are touch sensitive using a sensor with no moving parts; and the device can detect when the user taps or swipes said one or more touch-sensitive edges and interpret that user action as a control input. A preferred embodiment of this class of embodiments has touch sensitive right and bottom edges. Yet another preferred embodiment of this class of embodiments has touch sensitive left, right, top, and bottom edges. And another preferred embodiment of this class of embodiments also includes a touch sensitive display.

Yet another class of embodiments of the present invention has the following characteristics: Each device in this class of embodiments has a color display that displays content at a horizontal pixel count between 480 and 900 pixels and a vertical pixel count between 320 and 640; and the frame surrounding the display extends above, below, left, and right of the display edges by no more than 0.36 inch; and one or more of the edges of the device are touch sensitive using a sensor with no moving parts; and the device can detect when the user taps or swipes said one or more touch-sensitive edges and interpret that user action as a control input. (Note the lack of a pixel density constraint with this class.) A preferred embodiment of this class of embodiments has two or more touch sensitive edges. Yet another preferred embodiment of this class of embodiments has touch sensitive right and bottom edges. Yet another preferred embodiment of this class of embodiments has touch sensitive left, right, and bottom edges. Yet another preferred embodiment of this class of embodiments has touch sensitive left, right, top and bottom edges. And another preferred embodiment of this class of embodiments also includes a touch sensitive display. Yet another preferred embodiment could distinguish between a tap and a swipe. Yet another preferred embodiment could additionally distinguish between a double-tap and a single-tap or swipe. Yet another preferred embodiment could additionally distinguish between a double-tap, a single-tap, and a swipe (and optionally other types of taps). A preferred embodiment of a device in this class that can detect a swipe is one that can also detect the direction and speed of the swipe along the touch-sensitive edge.

Note, the term "swipe" and "slide" are interchangeably used in this description of the present invention.

Yet another class of embodiments of the present invention has the following characteristics: Each device in this class of embodiments has a color display with a horizontal pixel count between 520 and 780 pixels and a vertical pixel count between 340 and 540, and a maximum pixel density of 168 ppi; and the frame surrounding the display extends above, below, left, and right of the display edges by no more than 0.33 inch; and one or more of the edges of the device are touch sensitive using a sensor with no moving parts; and the device can detect when the user taps or swipes one or more of said one or more touch-sensitive edges and interpret that user action as a control input.

As noted in the Background section above, even when some parts of a touch-sensitive edge are being touched by the hands that are holding a device, the device should be able to detect when the user taps or swipes a finger along another part of that edge. One way to enable this is to use a touch-sensitive sensor along that edge that is able to detect all the points along that edge that are being touched at any given moment (as well as all the points that are not being touched at that moment)—rather than only being able to detect a single contact point at a time. How this element is used shall be set forth shortly; however, first the basic mechanism for a touch-sensitive sensor that can carry this out will be described in some detail.

FIGS. 3-A and 3-B illustrate a front view and bottom view, respectively, of a portable electronic display device that uses a touch sensitive strip comprised of a fairly large number of small neighboring independent sensors—allowing the device to sense simultaneous contact at multiple positions along that strip.

A new class of touch-sensitive sensors defined by the present invention has the following characteristics: As illustrated in FIG. 3-B and FIG. 3-A, a touch sensitive component 301 in this class would be composed of many thin parallel electronically independent sub-sensors that line up perpendicularly to the orientation of the overall sensor. For example, in FIG. 3-B, the overall sensor runs horizontally along the bottom edge (or front-bottom edge) of the device 100 in FIGS. 3-A and 3-B, and the small, parallel, electronically independent sub-sensors all line up vertically next to one another in this illustration. Each of the small sub-sensors can merely detect whether or not any part of that sub-sensor is being touched or not—a simple detection problem which engineers familiar with touch-sensitive materials and electronics have solved in other contexts. (As one example, a version of Apple Computer's iPod music player uses touch-sensitive buttons instead of electric switches with moving parts—in addition to use a touch-sensitive "dial" control.)

The device and its software are configured to keep track of the state (e.g. "being touched" or "not being touched") of every one of the sub-sensors on all the device's sensors. (This can be done in a wide variety of ways. For example, the device could poll all the sub-sensors every ⅙₀th of a second or so to check each sub-sensor's status and update a data array used to track that status. Or the device could be implemented with interrupt mechanisms so that any change in a sub-component results in some software getting executed that updates the memory recording the status of the sub-sensors.)

Given this configuration, the device gains the ability to determine all of the points along the edge of a given sensor that are being touched (and all the points that are not being touched) at any given moment—to a spatial accuracy and resolution determined by the number and size of the sub-sensor strips and to a time accuracy and resolution determined by the frequency at which the device's electronics and software query or update all of the sub-sensors for their status (which can be quite frequent given the fast processors used in today's mobile electronic devices).

And given this data of which points (i.e., sub-sensors) along the edge are being touched or not at any given moment, most engineers skilled in the art of device control can come up with algorithms for interpreting the changing status of this data to detect (relatively quick) taps and swipes on some parts of the overall sensor while ignoring other parts of the sensors that appear to be in (relatively long duration) contact with the user's hand (or with other objects). For example, in most contexts, a device designer or sensor engineer could presume that points (i.e., individual sub-sensors) along a touch-sensitive edge that have been in continual contact with something (e.g. the hand of someone holding the device) for relatively long periods of time (e.g. more than 0.5 seconds) can be ignored for the purpose of detecting an upcoming tap or swipe on the device, since taps and swipes involve fairly quick transitions of the status of a sub-sensor from "not being touched" to "being touched" (often changing back to "not being touched" again fairly quickly). If the device temporarily ignores any sub-sensors that have been in a "being touched" state for more than 0.5 seconds (or some appropriate length of time), then the device can watch for tapping by watching for other subs-sensors (perhaps several sub-sensors clustered in a patch about as wide as a finger pad) that suddenly transition from "not being touched" to "being touched" and then transition back to "not being touched" within a short period of time. As described a few pages back, taps, double-taps, triple-taps, and more can be detected using heuristics like this. (Engineers skilled in the art of control input software engineering would typically implement the tap-sensing heuristics to accommodate slight shifts in patches of adjacent sub-sensors that get touched in a multiple tap detection algorithm.)

It is also fairly straightforward for an engineer to develop software (or firmware) that detects when the user is swiping a finger across this new type of sensor, software that distinguishes the swipe from a tap event, and software that determines the start and end positions of the swipe on the sensor as well as the speed of the swipe. For example, if a set of adjacent sub-sensors on the sensor (making up the patch of sub-sensors that is roughly the width of the pad of a person's finger) suddenly transitions from "not being touched" to "being touched", then a brief time later all of those sub-sensors suddenly transition back to "not being touched" and none of the adjacent sub-sensors change state, then the user probably tapped on that patch of sub-sensor. But if sub-sensors next to the patch suddenly register as "being touched" just when sub-sensors at the other end of the patch of sub-sensors transition back to "not being touched", and if a little later, sub-sensors a next to those newly touched sensors transition to "being touched" just when sub-sensors back a ways transition back to "not being touched", then the user is probably swiping a finger along that sensor. (This is analogous to a piano player dragging a hand up the keyboard of a piano: First one patch set of keys gets depressed, and as the user drags their hand up the piano, the next keys up the piano get depressed as previously depressed keys get released. The reader can look at FIG. 3-B and FIG. 3-A and picture the sub-sensors as piano keys while picturing the full sensor 301 as a piano. The sub-sensors don't move, but they do sense when they are touched.). The direction of the swipe quickly becomes clear from which sub-sensors are getting "pressed" as neighboring sub-sensors get "released". The distance between any two sub-sensors on a given sensor is fixed—determined by the sensor designer. So the speed of a swipe over a given period can be defined as the distance from the middle of the patch of sub-sensors that transitioned to "being touched" at the beginning of that period (or from one end of that patch if the designers prefers) to the middle of the patch of sub-sensors that transitioned to "being touched" at the end of that period (or to the other end of that second patch if the designer prefers), divided by the time elapsed during that period. (Speed equals distance divided by time.)

Given that capabilities of the new type of sensor defined here, it is fairly straight forward for engineers skilled in the art of control software and electronics (particularly when that experience is related to touch-sensitive components) to craft algorithms for detecting taps, swipes, and other touch-related interactions with the sensors. And device makers can then use this capability to allow users to control the devices in fun and useful new ways.

Note that these new types of sensors can also be used to detect when a user taps or touches or swipes two or more fingers at two or more spots on a given sensor at the same time (since the sub-sensors detect contact independently). A device designer could use this feature to allow a user to control the device in interesting new ways. For example, one could picture a device maker letting a user play music on a device by "playing chords" on a sensor on the device—simulating playing chords on a piano. Or one could picture enabling new typing mechanisms in which a user presses multiple spots along the surface or edge of a device simultaneously to type words or letters. Creative device designers can think of many other possible uses for this capability.

A generally representative list of some of the preferred embodiments of devices that make use of this new class of sensors follows.

Another class of embodiments of the present invention has the following characteristics: Each device in this class of embodiments has one or more touch-sensitive sensors made up of adjacent, parallel, independent sub-sensors, where each sub-sensor can detect whether any part of that sub-sensor is being touched.

Yet another class of embodiments of the present invention has the following characteristics: Each device in this class of embodiments has one or more touch-sensitive edges that use sensors that can distinguish between a finger tapping or swiping on a part of a given touch sensitive edge even when the user is holding the device in a way where parts of the user's hand or hands rest on other parts of the touch sensitive edge.

Yet another class of embodiments of the present invention has the following characteristics: Each device in this class of embodiments has a color display with a horizontal pixel count between 160 and 3200 pixels and a vertical pixel count between 160 and 3200; and one or more of the edges of the device are touch sensitive using a sensor with no moving parts; and the device can detect when the user taps, double-taps, triple-taps, or swipes said one or more touch-sensitive edges and interpret that user action as a control input, even if parts of one or both of the user's hands are resting on parts of the touch sensitive edges while the user uses other parts of one or both hands to tap or swipe other parts of the touch sensitive edges. A preferred embodiment can additionally distinguish between a double-tap and a single-tap. Yet another preferred embodiment could additionally distinguish between a triple-tap, a double-tap, and a single-tap. Preferred embodiments can detect the speed and direction of swipes, as well as when they occur and which touch-sensitive edge it occurred on. Yet another preferred embodiment could additionally determine where on the given touch-sensitive edge a given swipe began an ended (i.e., where the user's finger initiated and ended contact with the touch-sensitive edge.) Yet another preferred embodiment of this class of embodiments has two or more touch sensitive edges. Yet another preferred embodiment of this class of embodiments has touch sensitive right and bottom edges. Yet another preferred embodiment of this class of embodiments has touch sensitive left, right, and bottom edges. Yet another preferred embodiment of this class of embodiments has touch sensitive left, right, top, and bottom edges. A preferred embodiment can sense when a user simultaneously swipes two edges at the same time.

Yet another class of embodiments of the present invention has the following characteristics: Each device in this class of embodiments has a color display with a horizontal pixel count between 160 and 3200 pixels and a vertical pixel count between 160 and 3200; and the frame (that is the body of the device) surrounding the display extends above, below, left, and right of the display edges by no more than 0.4 inch; and one or more of the edges of the device are touch sensitive using a sensor with no moving parts; and the device can detect when the user taps, double-taps, triple-taps, or swipes said one or more touch-sensitive edges and interpret that user action as a control input, even if parts of one or both of the user's hands are resting on parts of the touch sensitive edges while the user uses other parts of one or both hands to tap or swipe other parts of the touch sensitive edges. A preferred embodiment can additionally distinguish between a double-tap and a single-tap. Yet another preferred embodiment could additionally distinguish between a triple-tap, a double-tap, and a single-tap. Preferred embodiments can detect the speed and direction of swipes, as well as when they occur and which touch-sensitive edge it occurred on. Yet another preferred embodiment could additionally determine where on the given touch-sensitive edge a given swipe began an ended (i.e., where the user's finger initiated and ended contact with the touch-sensitive edge.) Yet another preferred embodiment of this class of embodiments has two or more touch sensitive edges. Yet another preferred embodiment of this class of embodiments has touch sensitive right and bottom edges. Yet another preferred embodiment of this class of embodiments has touch sensitive left, right, and bottom edges. Yet another preferred embodiment of this class of embodiments has touch sensitive left, right, top, and bottom edges. A preferred embodiment can sense when a user simultaneously swipes two edges at the same time.

Yet another class of embodiments of the present invention has the following characteristics: Each device in this class of embodiments has a color display with a horizontal pixel count between 520 and 780 pixels and a vertical pixel count between 340 and 560, and a maximum pixel density of 175 ppi; and one or more of the edges of the device are touch sensitive using a sensor with no moving parts; and the device can detect when the user taps, double-taps, triple-taps, or swipes said one or more touch-sensitive edges and interpret that user action as a control input, even if parts of one or both of the user's hands are resting on parts of the touch sensitive edges while the user uses other parts of one or both hands to tap or swipe other parts of the touch sensitive edges. A preferred embodiment of this class of embodiments has touch sensitive right and bottom edges. Yet another preferred embodiment of this class of embodiments has touch sensitive left, right, top, and bottom edges. A preferred embodiment can sense when a user simultaneously swipes two edges at the same time.

Another embodiment of the present invention is a device that includes a keyboard or keypad that can extend out by sliding or rotating from behind the display, or retract back to remain substantially hidden, but that still fits the constraints of one or more of the class or embodiment descriptions described above either when the keyboard is substantially hidden or retracted (but not necessarily in both configurations). For example, a device with a retractable/extendable keyboard, and with a 600×400 pixel 144 ppi display where the body of the device is no more than 1.5 inches thick, and where the body is no more than 4.8 inches wide and no more than 3.55 inches tall when the keyboard is retracted, would fit one of the above embodiment's criteria, even if the size of the device exceeded the 3.55 inch height criteria of that embodiment when the device's keyboard is extended.

Above is described ways to make a new type of touch-sensitive sensor component that can simultaneously detect multiple points of contact. But the most common low-cost touch-sensing electronic components today are simple capacitance or resistance sensors—"simple" in that the sensor can only detect contact at one point on the sensor at a time. What follows is a description of embodiments of the present invention that use multiple independent simple sensors, positioned at different places around the edges of the device, so that even if one or more of the sensors is in contact with the user (such as one of the hands holding the device), then the user can still tap, swipe, or otherwise touch one or more of the other sensors to control the device. A device maker could program the device to either allow the user to explicitly indicate (e.g. through a preference setting) which sensors to ignore; or a device maker could program the device so it ignores sustained unmoving contact with the touch-sensitive strips and only treats dynamic contact on the touch-sensitive strips (such as tapping or sliding) as intentional control inputs from the user. Note also that the word "independent" here refers to the fact that the device can determine a position of contact on each sensor regardless of what is going on with any of the other sensors—so the device can detect contact (including tapping, sliding, and so on) on two or more of the simple independent sensors at the same time (even though a given simple sensor can only detect contact at one point on that sensor at any given time).

FIG. 10-A illustrates an embodiment of a device 100 with a display 101 (which can be touch sensitive) and with multiple simple sensors positioned around the edges of the device. In this example, the device has six independent touch sensitive areas—items 1001, 1002, 1003, 1004, 1005, and 1006—including two touch sensitive strips on the top edge (items 1003 and 1004) and two touch sensitive strips on the bottom edge (items 1001 and 1002), as well as one touch sensitive strip 1006 on the left edge and one touch sensitive strip 1005 on the right edge. FIG. 10-B illustrates the bottom view of the same device. If a user held this device in their left hand, with the person's palm or fingers in contact with touch-sensitive areas 1003, 1006, or 1001 (without coming in contact with areas 1002, 1004, or 1005), then the independent simple sensors corresponding to touch-sensitive areas 1002, 1004, or 1005 could still detect when the user taps or swipes one of those areas. (By contrast, suppose a user's hand were already in contact with part of touch-sensitive area 1006 when the user tapped on a different part of area 1006: The simple touch-sensitive sensor corresponding to area 1006 might not detect that tap, since the word "simple" is employed here to mean that the sensor can only detect contact at one point at a time.)

Other embodiments can use basic touch-sensitive sensors that merely sense whether or not a user is touching a given area, instead of touch-sensitive strips (i.e., sensors that sense what point the user is touching along that area and which can be used to sense sliding on the strip), for one or more of the touch sensitive areas illustrated in FIG. 10, FIG. 16, and related Figures here. For example, a device like that illustrated in FIG. 16-A could use basic touch-sensitive spots on the top edge (e.g. at the areas illustrated by item 1003 and item 1004) to perform certain functions when the user taps on those parts of the top edge of the device—perhaps showing or hiding a URL text box or a palette of Web browser commands, for example, while using touch-sensitive strips to sense sliding on the vertical edges (e.g. the areas illustrated by items 1005 and 1006) and the lower edge (e.g. the areas illustrated by items 1001 and 1002).

Note that while the example illustrated in FIG. 10-A shows just two adjacent touch-sensitive sensors on the bottom edge, a device could include more than two touch-sensitive sensors on the bottom edge or any other edge.

FIG. 11 illustrates a front view of a portable electronic display device according to another embodiment of the present invention. In this case, the illustrated device uses four substantially independent touch sensitive areas on the top edge, two on each side, and two on the bottom. The point of this illustration is just to show that a device designer could choose to implement any number of substantially independent touch sensitive areas along any given edge. The Figure illustrates a more "extreme" case of using multiple simple touch sensors around the edges of a device. The device illustrated in FIG. 11 has four simple touch sensors along the top edge (items 1101, 1102, 1103, and 1104), two along the right edge (1105 and 1006), two along the bottom edge (1107 and 1108), and two along the left edge (1110 and 1109). Several related additional embodiments of the present invention shall be defined in some detail below. It should be clear that this description does not exhaustively list every class of devices that embody the aspects of the present invention: Only a few representative classes of devices are described.

The present invention includes a news class of hand-held devices with the following characteristics: Each device in this class has two or more independent simple touch sensors, positioned along or near the edges of the device, as well as a display on the surface of the device.

An subclass of these hand-held devices is one in which each device in the subclass includes two or more simple touch sensors that are both positioned along the bottom edge (and, optionally, additional touch sensors elsewhere on the device). FIG. 10-A illustrates one device design that includes two simple touch sensors 1001 and 1002 that are both positioned on the bottom edge of the device.

Another subclass of these hand-held devices is one in which each device in the subclass includes two simple touch sensors along the bottom edge, and one simple touch sensor on the left edge, and one simple touch sensor on the right edge (and optionally additional touch sensors elsewhere on the device). One further subclass of this subclass is one in which each device in the subclass also includes one or more simple touch sensors on the top edge—as illustrated, for example, in FIG. 10-A (where items 1003 and 1004 refer to touch sensitive areas along the top edge).

An preferred embodiment is a hand-held device with exactly two adjacent simple touch sensors along the bottom edge, and one touch sensor along the left edge, and one touch sensor along the right edge. And a variation of this embodiment additionally includes a means for sensing where and when a user touches the display with a stylus or finger (e.g. a touch screen like those found on many PDAs).

For each of the above embodiments having one or more simple touch sensors along the edges (i.e., having touch-sensitive edges), a notable subclass is one in which each device in the subclass includes a display with between 320 and 800 pixels horizontally and between 240 and 600 pixels vertically.

And for each of the above embodiments having two or more touch sensors, a notable subclass is one in which each device in the subclass includes a display with between 480 and 764 pixels horizontally and between 320 and 480 pixels vertically, and where additionally the device's overall dimensions (i.e., in at least one configuration where the device can be operated and where content can be viewed on said display) are no more than 5.5 inches by 4 inches. And a notable subclass of this subclass is devices whose overall dimensions are no more than 5 inches by 3.5 inches.

For each of the above embodiments having two or more touch sensors, a subclass is one in which each device in the subclass has two independent simple touch sensors along the bottom edge, and at least one more touch sensor on at least one of the vertical edges (left or right), and includes a display with between 500 and 720 pixels horizontally and between 350 and 460 pixels vertically, and where additionally the device's overall dimensions (in at least one configuration where the device can be operated and where content can be viewed on said display) are no more than 5.25 inches by 3.6 inches.

As described earlier, it is also useful to include a "modifier spot" on hand-held devices. When a user presses the modifier spot (with a finger or thumb of either hand) while simultaneously clicking on an item displayed on the touch-screen (as illustrated in FIG. 14-A and FIG. 15-A), the device will do something different than it would if the user simply clicked on that item without simultaneously pressing the modifier spot.

FIGS. 12-A and 12-B illustrate a front view and bottom view, respectively, of a portable electronic display device according to another embodiment of the present invention, in which, in addition to six substantially independent touch sensitive areas along the edges (for sensing sliding or taping by a users hands), the device also incorporates a modifier spot (item 1201). Such a device would generally include a touch screen—a substantially clear touch sensor that sits over the display, allowing the device to detect when the user clicks on an item being displayed. If the modifier spot is pressed at the same time that a user touches a displayed item, the device can react in a different way than it would if the user touched that displayed item without simultaneously pressing the modifier spot. For example, a modifier spot can serve as a shift key when the user clicks keys on a virtual keyboard (as illustrated in FIG. 15-A). A device could have multiple modifier spots, although only one is included in the embodiment in this illustration. A modifier spot can be implemented using a mechanical switch (i.e. a "button"), but in a preferred embodiment it would be implemented as a simple touch sensitive spot.

The embodiment of FIGS. 12-A and B comprises modifier spot 1201, in which a single small touch-sensitive area 1201 is positioned just below the display, centered horizontally, with part of the touch-sensitive area extending over the edge onto the bottom side of the device as illustrated in FIG. 12-B item 1201. FIG. 13-A shows a slightly different modifier spot 1201 implementation, in which the touch-sensitive area is a flat area primarily on the front surface just below the display, centered horizontally, without extending much over the bottom edge of the device. In preferred embodiments, the touch-sensitive spot would be implemented without any moving parts (for example, using a resistive or capacitive touch-sensor electronic component). Of course, alternatively, embodiments could use a button with moving parts (such as the typical type of push-button switch found on many devices) for the modifier button.

So the "modifier spot" is a button or an area outside of the display that the user can press while simultaneously touching a point on the display with a finger or stylus, and thereby modify the way the device would have responded if the user had touched that point on the display without simultaneously pressing the modifier spot. Taking this element into account, here are a few more classes of devices defined by the present invention.

One class of embodiments of the present invention is one in which each device in the class includes a touch screen and additionally includes one or more modifier spots, where each modifier spot can be implemented as either a mechanical button (i.e., an electrical-mechanical switch with moving parts) or a touch sensor (i.e., with no significant perceptible moving parts). A notable subclass of this class in one in which at least one of the modifier spots in each device in the subclass can be used as a Shift key as the user clicks on keys displayed on a virtual keyboard on the device's display (at least in some situations). Another notable subclass of this class in one in which at least one of the modifier spots in each device in the subclass can be used to make a menu appear when the user clicks on an item on the screen while pressing that modifier spot (at least in some situations).

Any device embodiment of the present invention can furthermore include one or more modifier spots. For example, another class of embodiments of the present invention is one in which each device in the class includes a touch screen, one or more modifier buttons, a display whose active area includes between 480 and 800 horizontal effective pixels and between 320 and 600 vertical effective pixels as well as a pixel density between 130 and 162 pixels inclusively, and where the device enclosure (when viewed from the top view looking down on the display) is at most 5.2 inches across horizontally and at most 3.7 inches vertically, and there is no more than 0.5 inches between three outer edges of the enclosure and the corresponding outer edges of the active surface of the display, and no more than 1 inch between a forth outer edge of the enclosure and the corresponding outer edge of the active surface, and in where the device additionally has at least two substantially independent touch sensitive areas on which the user can slide or tap fingers to control the device in some way.

Another class of embodiments of the present invention is one in which each device in the class includes one or more modifier spots, where at least one of the modifier spots is implemented with a touch sensor (i.e., without moving parts, which is also referred to here as a touch-sensitive modifier spot).

Another class of embodiments of the present invention is one in which each device in the class includes a touch screen, and additionally includes one or more touch-sensitive modifier spots, and additionally includes one or more touch sensitive edges (which can be used for scrolling and other functions, as described earlier).

Another class of embodiments of the present invention is one in which each device in the class includes a touch screen, and additionally includes exactly one modifier spot (either mechanical or touch-sensitive).

Another class of embodiments of the present invention is one in which each device in the class includes a touch screen, and additionally includes exactly one touch-sensitive modifier spot.

Another class of embodiments of the present invention is one in which each device in the class includes a touch screen, and additionally includes exactly one modifier spot (either mechanical or touch-sensitive), and additionally includes one or more touch sensitive edges.

Another class of embodiments of the present invention is one in which each device in the class includes a touch screen, and additionally includes exactly one touch-sensitive modifier spot, and additionally includes one or more touch sensitive edges.

FIG. 13-A illustrates a front view of a portable electronic display device according to a preferred embodiment of the present invention. This preferred embodiment has two touch sensitive areas along the bottom of the device, one on the left side, and one on the right side, each of which is substantially independent of the others and each of which enables the device to detect the direction and approximate speed of a finger or hand sliding along that touch sensitive area, so that the device can translate that into horizontal or vertical scrolling of content being displayed on the device. And this preferred embodiment also includes a modifier spot. This preferred embodiment also includes a display and a touch screen (for detecting clicks on items displayed on the display). And this preferred embodiment can optionally include one or more expansion slots (as illustrated by item 1310) for memory cards or input-output peripherals such as cameras or radios. FIGS. 13-B, 13-C, and 13-D illustrate the bottom view, top view, and right side view, respectively, of the portable electronic display device preferred embodiment shown in front-view in FIG. 13-A.

Another class of embodiments of the present invention is one in which each device in the class includes a touch screen, and additionally includes exactly one touch-sensitive modifier spot, and additionally includes two adjacent touch sensitive strips along the bottom edge, and at least one additional touch sensitive area along either the left edge or the right edge or both (as illustrated in FIG. 13-A). A notable subclass of this class of devices is one in which each device in the class has a display with between 320 and 800 horizontal pixels and between 240 and 600 vertical pixels. Another notable subclass of this class of devices is one in which each device in the class has a display with between 480 and 760 horizontal pixels and between 320 and 500 vertical pixels and a pixel density no greater than 175 points-per-inch, and where the device's overall dimensions are no more than 5.5 inches by 4 inches.

A preferred embodiment of the present invention is one that includes a touch screen that can display between 500 and 700 horizontal pixels and between 360 and 440 vertical pixels, as well as exactly one touch-sensitive modifier button centered horizontally beneath the display (as illustrated in FIG. 13-A, item 1201), as well one touch-sensitive strip along the left edge (as illustrated in FIG. 13-A, item 1006) and one touch-sensitive strip along the right edge (as illustrated in FIG. 13-A, item 1005), as well as two adjacent touch-sensitive strips along the bottom edge (as illustrated in FIG. 13-B, item 1001 and item 1002), and where the overall device dimensions (in at least one configuration in which the user operates the device while viewing content on said display) are no more than 5.2 inches wide and no more than 3.75 inches tall, and where the display's pixel density is no more than 164 pixels-per-inch and no less than 96 pixels per inch.

FIG. 16-A illustrates a front view of a portable electronic display device according to another preferred embodiment of the present invention that is just like the preferred embodiment discussed for FIG. 13-A above but that also includes two additional touch sensitive areas on the top edge of the device. Those touch sensitive areas on the top edge of the device could optionally be implemented using simple touch sensor components that merely detect taps (contact or non-contact over time) rather than being able to also detect sliding direction and speed like the touch sensitive areas along the sides and bottom of this preferred embodiment. FIGS. 16-B, 16-C, and 16-D illustrate the bottom view, top view, and right side view, respectively, of the portable electronic display device preferred embodiment shown in front-view in FIG. 16-A.

For each embodiment discussed above in connection with FIG. 13, additional preferred embodiments would also include one or more touch sensitive areas on the top of the device as illustrated by items 1003 and 1004 in FIG. 16-A and FIG. 16-C. These could be either basic touch-sensitive spots (i.e., basic in that they just detect whether that area is being touched or not, so the can be used to sense taps for example), or they could be touch-sensitive strips that sense what point on the strip is being touched so they can be used to sense sliding along that strip (similar to the touch-sensitive strips on 1005 and 1005 in FIG. 13-A and FIG. 16-A).

As noted earlier, constraints on overall device dimensions specified in some of these embodiment descriptions are not meant to necessarily account for covers, cases, antennas, or peripherals that can be attached to the devices. When those extra items are included in the measurements, the overall dimensions can be larger.

The foregoing defined a class of devices in which each device has a display, and includes one or more touch sensitive areas running along one or more of the edges of the device (outside of the display), and the device includes electronics and software which work together to detect certain types of contact by a user's finger or hand on those touch sensitive areas and responds by controlling the device in some way. A subclass of this class of devices is one in which each device in the subclass includes a TV receiver—so that the device is capable of displaying live TV stations. And a further subclass would be on in which each device in the further subclass would additionally have a wireless radio (either local-area such as a WiFi radio, or wide-area such as a cell phone radio) so that they are capable of both displaying live TV as well as allowing the user to view and interact with Web content. Indeed, any of the embodiments described earlier could include one or more of these types of radios.

Another class of embodiments of the present invention is one in which each device in the class has a display that fills at least 80% of the front surface of the device in at least one configuration in which the device can be operated while viewing content on said display, and where the device has one or more touch sensitive edges. A subclass of this class is one in which each device in the subclass includes a wireless radio (either local-area or wide-area). Another subclass is one in which each device in the subclass includes two or more touch-sensitive strips along its edges.

As noted in the Background section above, FIG. 18 illustrates another class of embodiments of the present invention, involving another novel use of touch sensitive components. Each embodiment of this class of devices has a display 101 with a touch screen on its front surface, and a separate touch-pad 1810 on the back of the device, where the touch-pad 1810 can be used for scrolling, panning, or otherwise moving displayed content—but the touch-pad 1810 is not used for selecting displayed selectable items (such as links, buttons, or other selectable items on Web pages or applications), while the touch-screen over the display 101 (or one or more extra controls that the device maker may include on the device) can be used for selecting items. Preferred embodiments of this class of devices would generally be programmed to respond to movement of the user's finger on the back touch-pad 1810 by moving displayed content in the same directions as the finger moves, whether that's up, down, left, right, on any angle, in circles, or along essentially any other path: In this way, the user feels as if he or she is just pushing the "page" of content around within the frame of the device. For example, if the user is looking at a Web page that is too large to display all at once, and the user wants to quickly take a look at content that appears to the lower right of the lower-right corner of the frame, the user can slide their finger along the back touch-pad toward the upper left of the device, and the content would pan in that direction, revealing that content that had been off the edge of the frame to the lower right. A reasonable alternative embodiment would be to move the content in the opposite direction of the finger's movement across the touch-pad, as though the user is moving the frame around a fixed page (rather than moving the page beneath a fixed frame). Another embodiment would let the user choose (through a configuration setting) whether movement of a finger on the back touch-pad should move the content in the same direction as the finger or in the opposite direction.

Another alternative embodiment (perhaps less compelling, but one which is cover in the present invention anyway) would be to move a cursor around the display in the same direction as the user's finger on the touch-pad, and only scroll the content when the cursor gets to the edge of the device. As with other embodiments here, the scrolling mechanism and the selection mechanism are still separate in this embodiment. The user could move the cursor to a position, and then (as an example of one selection mechanism a device maker could implement) tap the device's side to select the item under the cursor.

In one of its simplest preferred embodiments, the device would just have a touch-screen and display 101 on the front, and an extra touch-pad 1810 on the back, with no extra controls—not even an on/off power button. Note that a device can be designed so that contact (or certain types of contact, such as a double-tap in a given amount of time) with the touch screen on the front or the touch pad on the back can turn the device on or off, so an on/off button may not be necessary. When the device is on, a "shut down" command (by any appropriate name) could be provided in a menu to allow turning the device off or putting it to sleep.

Yet another preferred embodiment that is nearly as simple would just add one button—an on/off power button (either mechanical or touch sensitive). For example, a power button could be placed on the top of the device or on one side.

Yet another preferred embodiment would be a class of devices in which each device in the class adds one or more touch sensitive areas, in addition to the touch pad 1810 on the back of the device and the touch screen & display 101 on the front of the device. And a particularly preferred embodiment of this class would be one with the four touch sensitive spots illustrated in FIG. 19 (items 1903, 1904, 1905, and 1906), and a modifier spot 1201 as discussed earlier. A preferred embodiment can also include extra items, such as a memory or I/O card slot 1310, as found on many PDAs.

FIG. 20 illustrates another preferred embodiment in which the touch-pad 1810 is placed on the inside of a display cover 2001 that can rotate on a hinge 2002 around to the back of the device 100 so that when the user is viewing content on the display 101 on the front of the device they can operate the touch-pad 1810 now exposed behind the device.

Notable subclasses of the preferred embodiments just discussed in association with FIG. 18, FIG. 19, and FIG. 20 are classes with devices with displays that have pixel counts between 240 and 600 pixels vertically and between 480 and 800 pixels horizontally and pixel densities between 100 and 200 pixels-per-inch. A notable smaller subclass consists of devices with pixel counts between 360 and 460 pixels tall and between 500 and 764 tall, with pixel densities between 130 and 168 pixels-per-inch, and where the devices are no more than 5.5 inches wide and no more than 4 inches tall.

An alternative and known way to allow scrolling of a displayed content (which is not incompatible with those covered here) is to let the user move the content around simply by touching any part of the displayed content that is not a link, button, or other selectable item, and then dragging their finger as though they are dragging the content around within the frame. Yet other embodiments of the present invention include devices that use this scrolling mechanism in combination with a display that is between 320 and 600 pixels tall and between 480 and 800 pixels wide, with a pixel density between 125 and 168 pixels-per-inch, and where the device is no more than 6 inches wide and no more than 4.4 inches tall. A relevant subclass consists of devices that are less than 5 inches wide and which have between 360 and 480 vertical pixels and between 500 and 760 horizontal, and a pixel density between 132 and 161 pixels-per-inch. (All ranges "inclusive".) Most users may find that using a back touch-pad as outlined in earlier embodiment descriptions is more intuitive.

As an improvement over current device designs that use mechanical controls, one class of embodiments also covered in this description of the present invention is one in which each device in the class has one or more mechanical controls along the bottom of the device (for horizontal scrolling and optionally other functions) and one or more mechanical controls along the side of the device (for vertical scrolling and optionally other functions). A notable subclass is one in which the device has one roller or jog-dial control on the bottom and one roller or jog-dial control on the side (as illustrated in FIG. 17-A), where the roller or jog-dial control on the bottom is used for horizontal scrolling and the roller or jog-dial control on the side is used for vertical scrolling. Another notable subclass of this class is one in which the device's display at 320 pixels tall and at least 480 pixels wide. A preferred subclass of the general class is one in which the display is between 500 and 760 pixels wide and between 360 and 480 pixels tall and the pixel count is between 132 and 172 pixels-per-inch inclusive.

One conceptually simple extension to any of the above device embodiments involves adding one or more speakers and one or more microphones to any of the above embodiments, as part of enabling a user to use the device as a cell phone. (Of course, appropriate transceiver and software would be required too, as found in smart-phones today.) In one preferred embodiment, a near-to-ear speaker (like those found at the top of most cell phones) would be placed on or near one side of the device, and a small microphone (like those found in most cell phones) would be placed on or near the other side of the device, so the user could hold the speaker to their ear and talk into the microphone at the other end of the device. In another embodiment, the speaker would be placed on the back of the device near one side (left or right) while the microphone is placed in the back of the device near the other side (right or left), so the user could hold the speaker on the back of the phone to their ear while talking into the microphone. In another embodiment, the speaker and microphone would be embedded in a display cover (such as the cover 2001 illustrated in FIG. 20): They could either be embedded on the outside of the cover, for use when the cover is closed, or embedded on the inside of the cover, for use when the cover is open. In another embodiment, the phone would have a headset jack, allowing the user to plug-in one of the common cell phone headsets and use that instead of holding the device to their ear. In yet another embodiment, the device would include a local-area-network transceiver (probably in addition to a separate transceiver used to access the voice network or Internet) that could communicate to a wireless headset that has it's own compatible local-area-network transceiver (which could be, for example, a Bluetooth transceiver, or another type). Still another embodiment of the device could include two or more of these mechanisms for conducting voice communications—for example, a speaker & microphone as well as a Bluetooth connection for talking to a Bluetooth headset. Any of these, in combination with the other novel device embodiment features described earlier, constitutes an embodiment covered by the present invention.

As noted earlier, a wireless service provider could create and offer a mobile Web service specifically targeting devices embodiments of the present invention. Any device embodiment of the present invention could be used. One preferred embodiment of such a mobile Web service involves distributing to subscribers hand-held devices where the devices would have local-area radios (such as WiFi radios) or wide-area-radios (such as 3G cell radios) or both types of radios, and the devices would have touch-sensitive displays that show between 480 and 800 pixels horizontally (inclusive) and between 320 and 600 pixels vertically (inclusive), and the devices would be able to run a Web browser application, and the devices would have one or more touch sensitive edge areas and/or a touch sensitive back on which a user can tap or slide fingers or hands to control one or more aspects of the device or the Web browser (such as scrolling Web pages as described earlier), and the service provider would charge each subscriber a monthly fee (and optionally charge an initial sign up fee or a charge for the device hardware, or both). Another embodiment would be the same, but would target devices that additionally include two or more touch-sensitive edges. Another embodiment would be the same, but would additionally have the device automatically periodically fetch certain content from a remote server (such as certain Web pages or data within certain Web pages), so the user can see that content quickly without having to wait for it to download at the moment the user wants to look at it. Another embodiment of this service would be the same but would additionally provide a means for the user to control one or more aspect of the service from the device (such as which Web pages or other content should be automatically periodically downloaded, and how often).

As noted earlier, hand-held devices embodied by the present invention would make very good general-purpose remote controls. A preferred embodiment of such a remote-control system would consist of one or more of the devices embodied by the present invention communicating to a hub (which could be a PC or a standalone piece of electrical equipment) that communicates to one or more other electronics products (such as a TV, a TV recorder, a stereo, an alarm system, etc.). The communication between the hand-held device and the hub could be through the Internet, with the device accessing the Internet wirelessly through a wireless access point (such as a Wi-Fi hotspot, a bluetooth access point, or a cellular tower, for example) using standard mechanisms used by data-enabled phones or wireless PDAs, and with the hub communicating with the other electronics products through a local area network (either wireless or wired). In this way, a user could control those remote electronic products from any place they can access the Internet using their hand-held device. Note that for electronic products that have their own connection to the Internet, the hand-held device can communicate through the Internet to those electronic products rather than going through a hub: This represents an alternative embodiment of this remote control system. In both of those remote-control system embodiments, a notable preferred embodiment would be one in which each of the electronics products being controlled has a Web-based interface (e.g. web pages made of HTML, JavaScript, Java or other Web-based software) that is either stored in the device or stored in the hub, so almost any remote Web browser (including browsers in devices described in this description of the present invention) can easily access that control interface as needed rather than having to embed the control interface in the hand-held device (with appropriate password protection or other security mechanisms to keep unauthorized people from controlling the remote device).

One class of methods covered by the present invention is the method by which a device's software makes changes in its user interface in response to the user tapping on a touch sensitive area on the edges of the device. A specific preferred method is one where, when the user taps or double-taps on a given touch sensitive area on the device (such as item 1003 or item 1004 shown in FIGS. 16-A and 16-A), the device responds by making a Web browser URL text box (and optionally other items) appear or disappear from view on the display. Most Web browsers can show a URL text box at the top of the browser window, showing the URL of the current Web page and allowing the user to enter a new URL into the text box. And a notable preferred device embodiment is one that implements this method, so the user can easily make a URL text box (and possibly other items) appear or disappear by simply tapping or double tapping on the top edge. The device maker can choose whether the method is invoked by a single tap or double tap, or the device maker can implement a means for allowing the user to specify their preference.

The present invention also covers the methods by which the device pans or scrolls content on the display in response to the user sliding parts of their hands (e.g. a finger or palm) on one or more of the touch sensitive areas on the sides or back of the device. For example, when the user slides their finger up or down item 1005 on the device illustrated in FIG. 16-A, the content displayed on a Web page would pan as described earlier. The device simply uses the sensor to track where the user's finger is on the sensor, and how it is moving, and translates that into movement of the Web page—much as many devices translate sliding a virtual scroll bar on a Web browser window into movement of the content. Similarly, in a device with a touch pad on the back, such as that illustrated by FIG. 18-A, the device would use a method that simply responds to movement of the user's finger around the touch pad 1810 by correspondingly panning the Web content around the display, as described earlier.

The foregoing description is not intended to be a complete list of the generalizations of the embodiments discussed in this description of the present invention that could be claimed as novel. Device designers and engineers skilled in the art of designing and developing hand-held electronic communication and computational devices will be able to develop devices incorporating the attendant features and principles described above.

Figure 24:
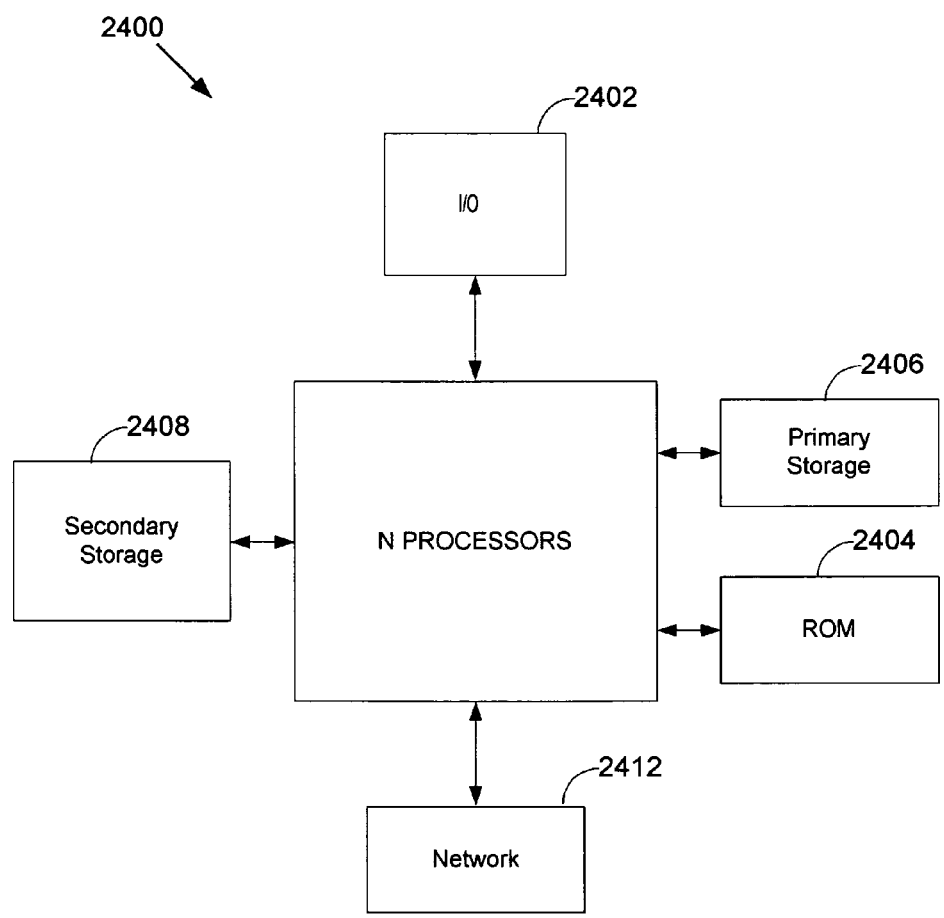

FIG. 24 illustrates a typical, potentially embedded, computer system that, when appropriately configured or designed, can serve as a computer system in which the invention may be embodied. The computer system 2400 includes any number of processors 2402 (also referred to as central processing units, or CPUs) that are coupled to storage devices including primary storage 2406 (typically a random access memory, or RAM), primary storage 2404 (typically a read only memory, or ROM). CPU 2402 may be of various types including microcontrollers and microprocessors such as programmable devices (e.g., CPLDs and FPGAs) and unprogrammable devices such as gate array ASICs or general purpose microprocessors. As is well known in the art, primary storage 2404 acts to transfer data and instructions uni-directionally to the CPU and primary storage 2406 is used typically to transfer data and instructions in a bi-directional manner. Both of these primary storage devices may include any suitable computer-readable media such as those described above. A mass storage device 2408 may also be coupled bi-directionally to CPU 2402 and provides additional data storage capacity and may include any of the computer-readable media described above. Mass storage device 2408 may be used to store programs, data and the like and is typically a secondary storage medium such as a hard disk. It will be appreciated that the information retained within the mass storage device 2408, may, in appropriate cases, be incorporated in standard fashion as part of primary storage 2406 as virtual memory. A specific mass storage device such as a CD-ROM 2414 may also pass data uni-directionally to the CPU.

CPU 2402 may also be coupled to an interface 2410 that connects to one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 2402 optionally may be coupled to an external device such as a database or a computer or telecommunications network using an external connection as shown generally at 2412. With such a connection, it is contemplated that the CPU might receive information from the network, or might output information to the network in the course of performing the method steps described herein.

It should be noted that no known companies have arrived at the forgoing innovations of the present invention, at least in part because they likely have not performed the detailed experimentation required to make the motivating observations.

Having fully described at least one embodiment of the present invention, other equivalent or alternative methods according to the present invention will be apparent to those skilled in the art. The invention has been described above by way of illustration, and the specific embodiments disclosed are not intended to limit the invention to the particular forms disclosed. The invention is thus to cover all modifications, equivalents, and alternatives falling within the spirit and scope of the following claims.

I claim:

1. A portable electronic device comprising:
an enclosure;
a display comprised in the enclosure such that an active surface of the display is visible;
one or more horizontal controls operable to horizontally move content displayed by the active surface of said display, wherein a first one of said one or more horizontal controls is disposed at a bottom edge of said enclosure;
one or more vertical controls operable to vertically move content displayed by the active surface of said display, wherein at least one of said one or more vertical controls is disposed at a right or left edge of said enclosure, and said at least one vertical control operates substantially independent of said one or more horizontal controls;
a context modifier switch disposed at an edge of said enclosure; and
a second one of said one or more horizontal controls also disposed at the bottom edge of said enclosure, the context modifier switch being disposed at least partially between the first and second horizontal controls.

2. A portable electronic device comprising:
an enclosure, which is effectively sized to be inclusively within a plus or minus 15% range of 4.6 inches in the first dimension and inclusively within a plus or minus 15% range of 3.1 inches in the second dimension;
a touch sensitive display joined to said enclosure such that an active surface of said display is visible, said display having an effective pixel count in a first dimension inclusively within a plus or minus 15% range of 600 effective pixels, and an effective pixel count in a second dimension inclusively within a plus or minus 15% range of 400 effective pixels, and an effective pixel density inclusively within a plus or minus 15% range of 144 effective ppi; and
wherein at least one of the effective pixel counts in a respective dimension is achieved by halving the native resolution of the touch sensitive display along the respective dimension.

* * * * *